US012591397B2

(12) United States Patent
Karr et al.

(10) Patent No.: US 12,591,397 B2
(45) Date of Patent: ***Mar. 31, 2026

(54) CONSTRUCTING VIRTUAL STORAGE SYSTEMS FROM A VARIETY OF COMPONENTS

(71) Applicant: PURE STORAGE, INC., Santa Clara, CA (US)

(72) Inventors: Ronald Karr, Palo Alto, CA (US); Par Botes, Atherton, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/821,618

(22) Filed: Aug. 30, 2024

(65) Prior Publication Data

US 2024/0419366 A1     Dec. 19, 2024

Related U.S. Application Data

(63) Continuation of application No. 17/732,226, filed on Apr. 28, 2022, now Pat. No. 12,079,520, which is a
(Continued)

(51) Int. Cl.
*G06F 12/08*          (2016.01)
*G06F 3/06*           (2006.01)

(52) U.S. Cl.
CPC .......... *G06F 3/0664* (2013.01); *G06F 3/0607* (2013.01); *G06F 3/0632* (2013.01);
(Continued)

(58) Field of Classification Search
CPC ............. G06F 11/1076; G06F 11/1092; G06F 11/1451; G06F 11/2023; G06F 11/2069;
(Continued)

(56) References Cited

U.S. PATENT DOCUMENTS

| 5,615,352 A | 3/1997 | Jacobson et al. |
| 7,793,307 B2 | 9/2010 | Gokhale et al. |
| | (Continued) | |

FOREIGN PATENT DOCUMENTS

| CN | 103034453 A | 4/2013 |
| CN | 104516768 A | 4/2015 |
| | (Continued) | |

OTHER PUBLICATIONS

Frakes Dan, "Up close with Mountain Lion: Power Nap (Frakes, Dan, Working Mac—Up close with Mountain Lion: Power Nap, Macworld.com,"Aug. 1, 2012, pp. 1-6.
(Continued)

*Primary Examiner* — Yong J Choe

(57) ABSTRACT

Replication between virtual storage systems includes: constructing a virtual storage system in which the one or more virtual storage devices are coupled to each of one or more virtual storage controllers and replicating a dataset from the virtual storage system to another virtual storage system, where at least one of the virtual storage systems is an on-premises virtual storage system utilizing on-premises physical storage resources.

20 Claims, 36 Drawing Sheets

Related U.S. Application Data continuation of application No. 17/070,372, filed on Oct. 14, 2020, now Pat. No. 11,422,751, which is a continuation-in-part of application No. 16/777,211, filed on Jan. 30, 2020, now Pat. No. 11,126,364.

(60) Provisional application No. 62/967,368, filed on Jan. 29, 2020, provisional application No. 62/900,998, filed on Sep. 16, 2019, provisional application No. 62/878,877, filed on Jul. 26, 2019, provisional application No. 62/875,947, filed on Jul. 18, 2019.

(52) U.S. Cl.
CPC .......... *G06F 3/0647* (2013.01); *G06F 3/0658* (2013.01); *G06F 3/0683* (2013.01)

(58) Field of Classification Search
CPC ............. G06F 11/2071; G06F 11/2094; G06F 11/2097; G06F 11/3006; G06F 11/3466; G06F 3/0605; G06F 3/0607; G06F 3/0611; G06F 3/0632; G06F 3/0647; G06F 3/0658; G06F 3/0664; G06F 3/067; G06F 3/0683; G06F 3/0688
See application file for complete search history.

(56) References Cited

U.S. PATENT DOCUMENTS

| | | | |
|---|---|---|---|
| 8,301,746 | B2 | 10/2012 | Head et al. |
| 8,706,914 | B2 | 4/2014 | Duchesneau |
| 8,918,478 | B2 | 12/2014 | Ozzie et al. |
| 9,275,063 | B1 | 3/2016 | Natanzon |
| 9,619,257 | B1 * | 4/2017 | Aron .................... G06F 9/45533 |
| 9,635,097 | B2 | 4/2017 | Wang et al. |
| 9,830,180 | B2 | 11/2017 | Tung et al. |
| 9,910,742 | B1 | 3/2018 | Faibish et al. |
| 9,986,033 | B2 * | 5/2018 | Bannister ............ H04L 61/5007 |
| 10,185,495 | B2 | 1/2019 | Katsuki |
| 11,210,009 | B1 | 12/2021 | Freilich et al. |
| 11,442,669 | B1 | 9/2022 | Frandzel et al. |
| 12,112,075 | B1 | 10/2024 | Krivenok et al. |
| 2005/0228835 | A1 | 10/2005 | Roa |
| 2010/0199276 | A1 | 8/2010 | Umbehocker |
| 2010/0235832 | A1 | 9/2010 | Rajagopal et al. |
| 2010/0274886 | A1 | 10/2010 | Nahum et al. |
| 2010/0306377 | A1 | 12/2010 | Dehaan et al. |
| 2011/0271062 | A1 | 11/2011 | Chen |
| 2011/0302415 | A1 | 12/2011 | Ahmad et al. |
| 2013/0117448 | A1 | 5/2013 | Nahum et al. |
| 2013/0159637 | A1 | 6/2013 | Forgette et al. |
| 2013/0166724 | A1 | 6/2013 | Bairavasundaram et al. |
| 2013/0212576 | A1 | 8/2013 | Huang et al. |
| 2014/0006354 | A1 | 1/2014 | Parkison et al. |
| 2015/0100746 | A1 | 4/2015 | Rychlik et al. |
| 2016/0142485 | A1 | 5/2016 | Mitkar et al. |
| 2017/0155713 | A1 | 6/2017 | Powell et al. |
| 2018/0074748 | A1 | 3/2018 | Makin et al. |
| 2018/0357017 | A1 | 12/2018 | Karr et al. |
| 2020/0159421 | A1 | 5/2020 | Karumbunathan et al. |
| 2022/0050858 | A1 | 2/2022 | Karr et al. |
| 2022/0156114 | A1 | 5/2022 | Nagpal et al. |

FOREIGN PATENT DOCUMENTS

| | | |
|---|---|---|
| CN | 106603665 A | 4/2017 |
| WO | WO-0213033 A1 | 2/2002 |
| WO | WO-2008103569 A1 | 8/2008 |

OTHER PUBLICATIONS

Hwang K., et al., "RAID-x: A New Distributed Disk Array for I/O-Centric Cluster Computing," Proceedings of the Ninth International Symposium on High-performance Distributed Computing, IEEE Computer Society, Los Alamitos, CA, Aug. 2000, pp. 279-286.

Kim J-K., et al., "Data Access Frequency Based Data Replication Method Using Erasure Codes in Cloud Storage System," Journal of the Institute of Electronics and Information Engineers, Feb. 2014, vol. 51, No. 2, pp. 85-91.

Schmid P., "RAID Scaling Charts, Part 3: 4-128 kB Stripes Compared," Tom's Hardware, Nov. 27, 2007, 24 Pages, XP055363126, Retrieved from URL: http://www.tomshardware.com/reviews/RAID-SCALING-CHARTS.1735-4.html.

Stalzer M.A., "FlashBlades: System Architecture and Applications," Proceedings of the 2nd Workshop on Architectures and Systems for Big Data, Association for Computing Machinery, New York, NY, 2012, pp. 10-14.

Storer M.W., et al., "Pergamum: Replacing Tape with Energy Efficient, Reliable, Disk-Based Archival Storage," 6th USENIX Conference on File and Storage Technologies (FAST'08), San Jose, CA, USA, Feb. 26-29, 2008, 16 Pages, ISBN 978-1-931971-56-0, XP002665467.

Wong T.M., et al., "Verifiable Secret Redistribution for Archive Systems," Proceedings on First International IEEE Security in Storage Workshop (SISW'02), IEEE Xplore, Dec. 2002, 12 pages, DOI: 10.1109/SISW.2002.1183515.

* cited by examiner

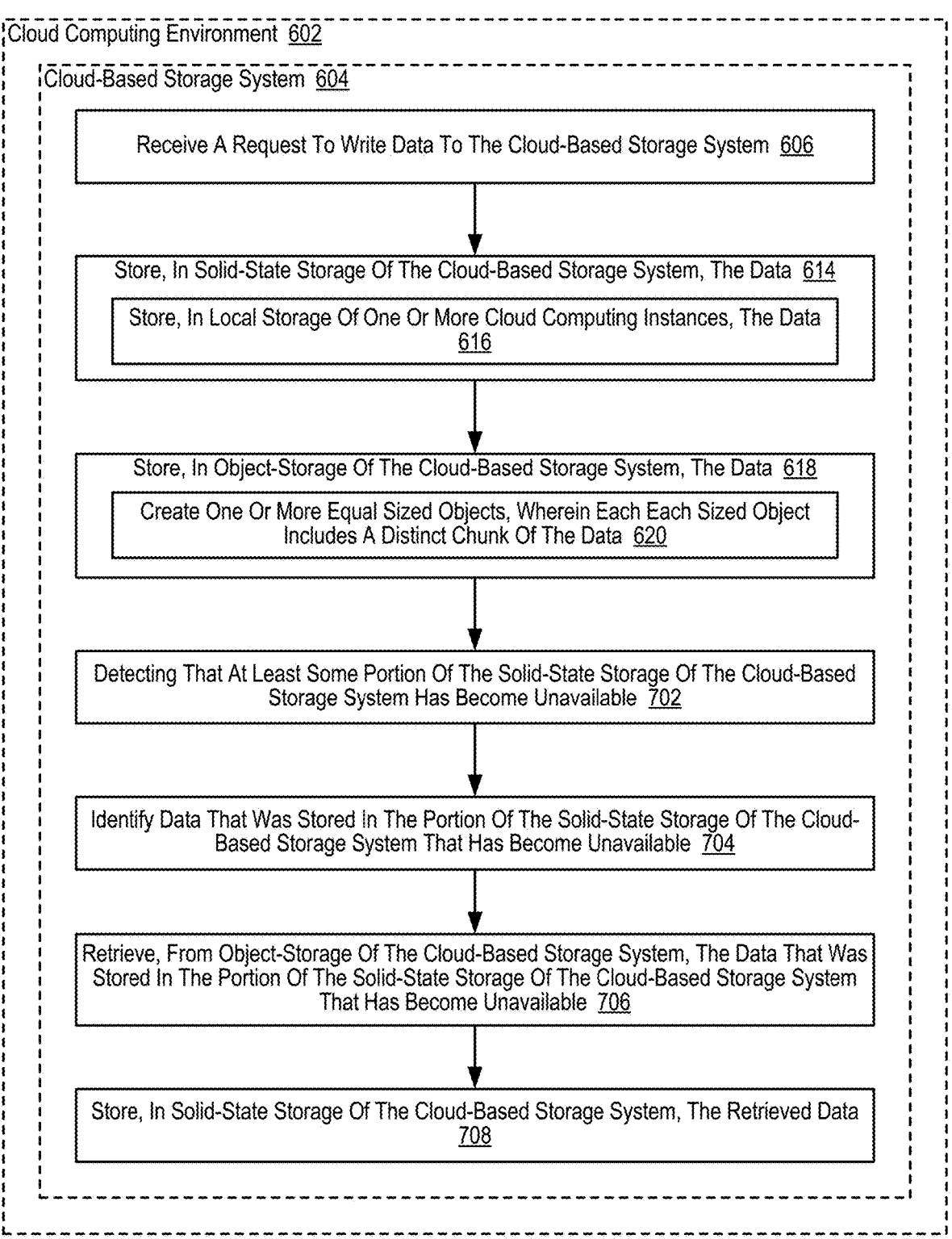

Cloud Computing Environment 602

Cloud-Based Storage System 604

Receive A Request To Write Data To The Cloud-Based Storage System 606

Store, In Solid-State Storage Of The Cloud-Based Storage System, The Data 614

Store, In Local Storage Of One Or More Cloud Computing Instances, The Data 616

Store, In Object-Storage Of The Cloud-Based Storage System, The Data 618

Create One Or More Equal Sized Objects, Wherein Each Each Sized Object Includes A Distinct Chunk Of The Data 620

Detecting That At Least Some Portion Of The Solid-State Storage Of The Cloud-Based Storage System Has Become Unavailable 702

Identify Data That Was Stored In The Portion Of The Solid-State Storage Of The Cloud-Based Storage System That Has Become Unavailable 704

Retrieve, From Object-Storage Of The Cloud-Based Storage System, The Data That Was Stored In The Portion Of The Solid-State Storage Of The Cloud-Based Storage System That Has Become Unavailable 706

Store, In Solid-State Storage Of The Cloud-Based Storage System, The Retrieved Data 708

FIG. 7

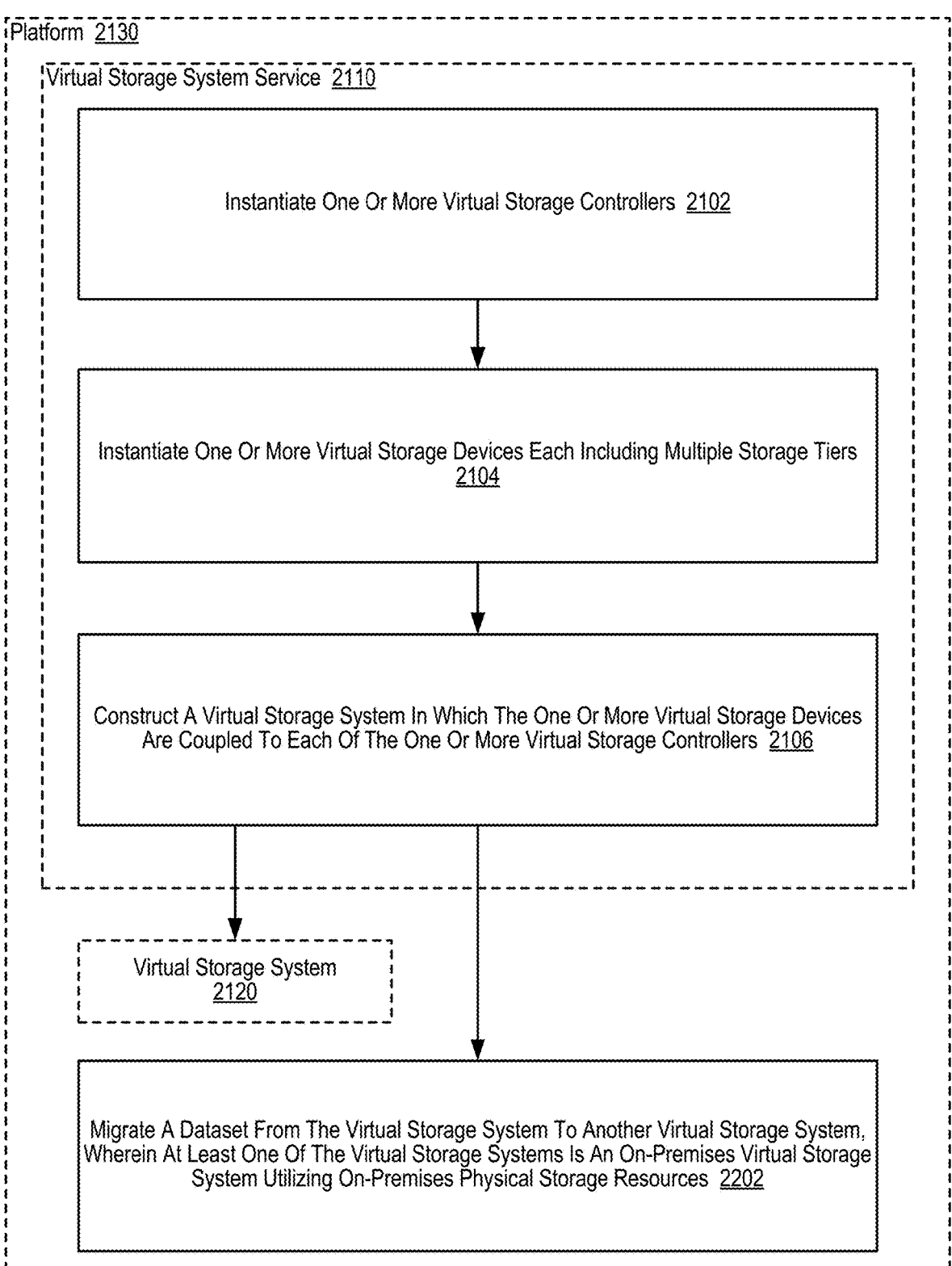

Platform 2130

Virtual Storage System Service 2110

Instantiate One Or More Virtual Storage Controllers 2102

Instantiate One Or More Virtual Storage Devices Each Including Multiple Storage Tiers 2104

Construct A Virtual Storage System In Which The One Or More Virtual Storage Devices Are Coupled To Each Of The One Or More Virtual Storage Controllers 2106

Virtual Storage System 2120

Migrate A Dataset From The Virtual Storage System To Another Virtual Storage System, Wherein At Least One Of The Virtual Storage Systems Is An On-Premises Virtual Storage System Utilizing On-Premises Physical Storage Resources 2202

FIG. 22

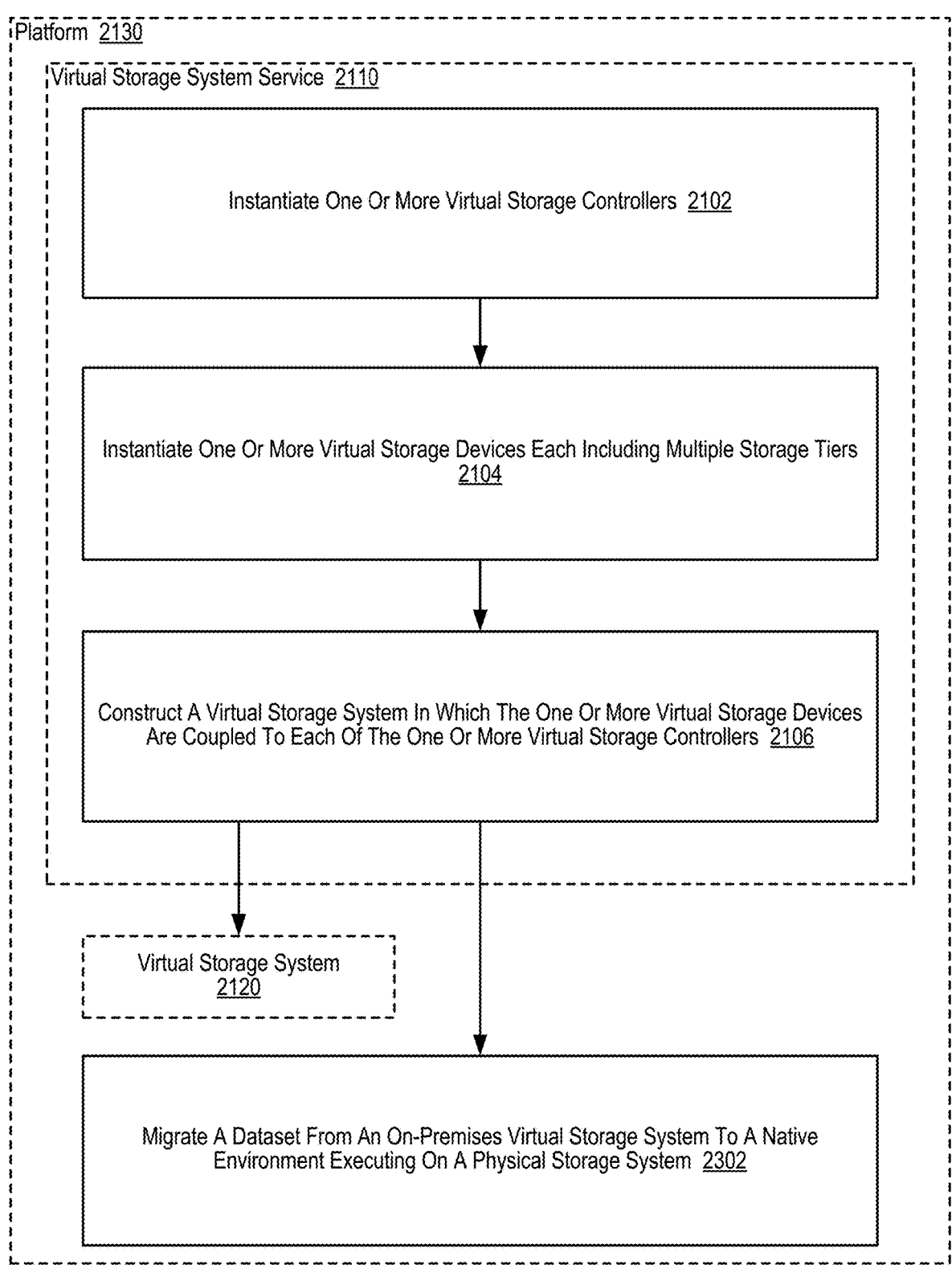

Platform 2130

Virtual Storage System Service 2110

Instantiate One Or More Virtual Storage Controllers 2102

Instantiate One Or More Virtual Storage Devices Each Including Multiple Storage Tiers 2104

Construct A Virtual Storage System In Which The One Or More Virtual Storage Devices Are Coupled To Each Of The One Or More Virtual Storage Controllers 2106

Virtual Storage System 2120

Migrate A Dataset From An On-Premises Virtual Storage System To A Native Environment Executing On A Physical Storage System 2302

FIG. 23

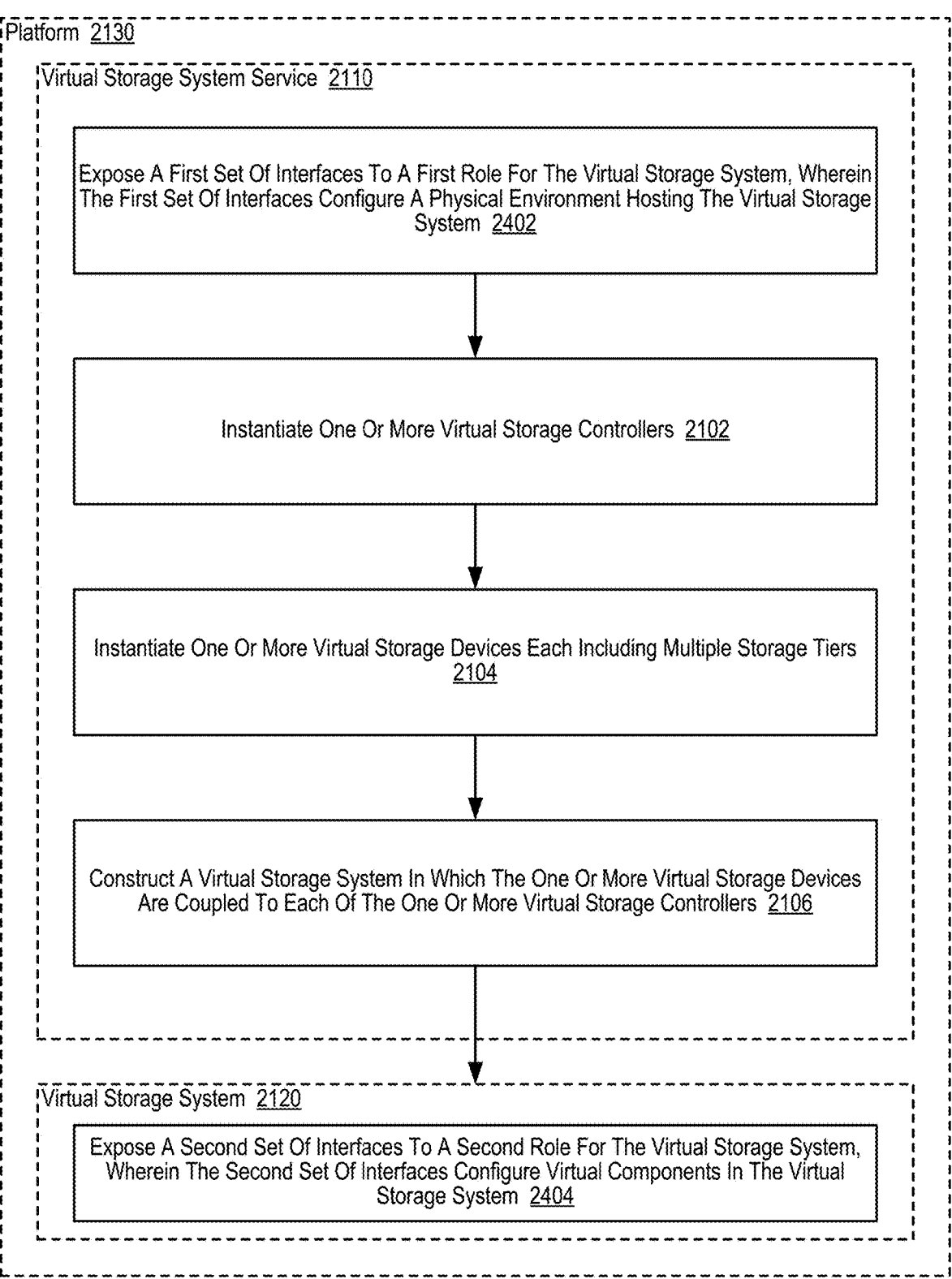

Platform 2130

Virtual Storage System Service 2110

Expose A First Set Of Interfaces To A First Role For The Virtual Storage System, Wherein The First Set Of Interfaces Configure A Physical Environment Hosting The Virtual Storage System 2402

Instantiate One Or More Virtual Storage Controllers 2102

Instantiate One Or More Virtual Storage Devices Each Including Multiple Storage Tiers 2104

Construct A Virtual Storage System In Which The One Or More Virtual Storage Devices Are Coupled To Each Of The One Or More Virtual Storage Controllers 2106

Virtual Storage System 2120

Expose A Second Set Of Interfaces To A Second Role For The Virtual Storage System, Wherein The Second Set Of Interfaces Configure Virtual Components In The Virtual Storage System 2404

FIG. 24

CONSTRUCTING VIRTUAL STORAGE SYSTEMS FROM A VARIETY OF COMPONENTS

This is a continuation application for patent entitled to a filing date and claiming the benefit of earlier-filed U.S. Pat. No. 12,079,520, issued Sep. 3, 2024, herein incorporated by reference in its entirety, which is a continuation of U.S. Pat. No. 11,442,751, issued Aug. 23, 2022, which is a continuation in-part of U.S. Pat. No. 11,126,364, issued Sep. 30, 2020, which claims priority from; U.S. Provisional Application No. 62/967,368, filed Jan. 29, 2020; U.S. Provisional Application No. 62/900,998, filed Sep. 16, 2019; U.S. Provisional Application No. 62/878,877, filed Jul. 26, 2019; and U.S. Provisional Application No. 62/875,947, filed Jul. 18, 2019. FIG. 1A illustrates a first example system for data storage in accordance with some implementations.

BRIEF DESCRIPTION OF DRAWINGS

FIG. 7 sets forth a flow chart illustrating an example method of servicing I/O operations in a cloud-based storage system.

FIG. 22 sets forth a flow chart illustrating an additional example method of creating a virtual storage system.

FIG. 23 sets forth a flow chart illustrating an additional example method of creating a virtual storage system.

FIG. 24 sets forth a flow chart illustrating an additional example method of creating a virtual storage system.

DESCRIPTION OF EMBODIMENTS

Figure 1A:
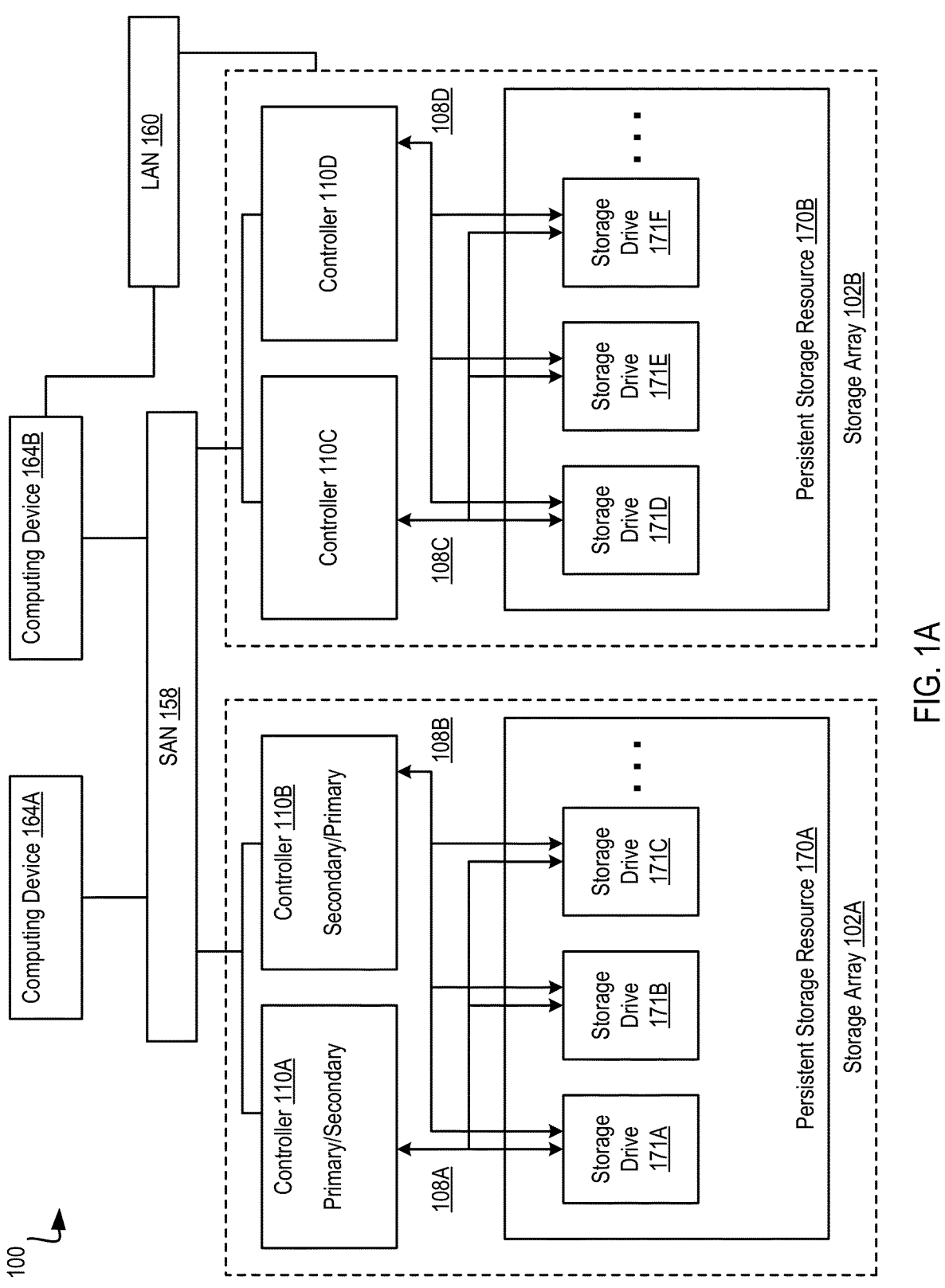
FIG. 1A illustrates a first example system for data storage in accordance with some implementations.

Example methods, apparatus, and products for virtual storage system architectures in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a note-book, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Chan-nel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustra-tion, rather than limitation. Other data communication cou-plings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data stor-age for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer soft-ware, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support com-munications via the SAN 158 or LAN 160. In some imple-mentations, storage array controller 110A-D may be inde-pendently coupled to the LAN 160. In implementations, storage array controller 110A-D may include an I/O con-troller or the like that couples the storage array controller 110A-D for data communications, through a midplane (not shown), to a persistent storage resource 170A-B (also referred to as a "storage resource" herein). The persistent storage resource 170A-B main include any number of stor-age drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers to a device's ability to maintain recorded data after loss of power. In some imple-mentations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device manage-ment responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implemen-tations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110B) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110B may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
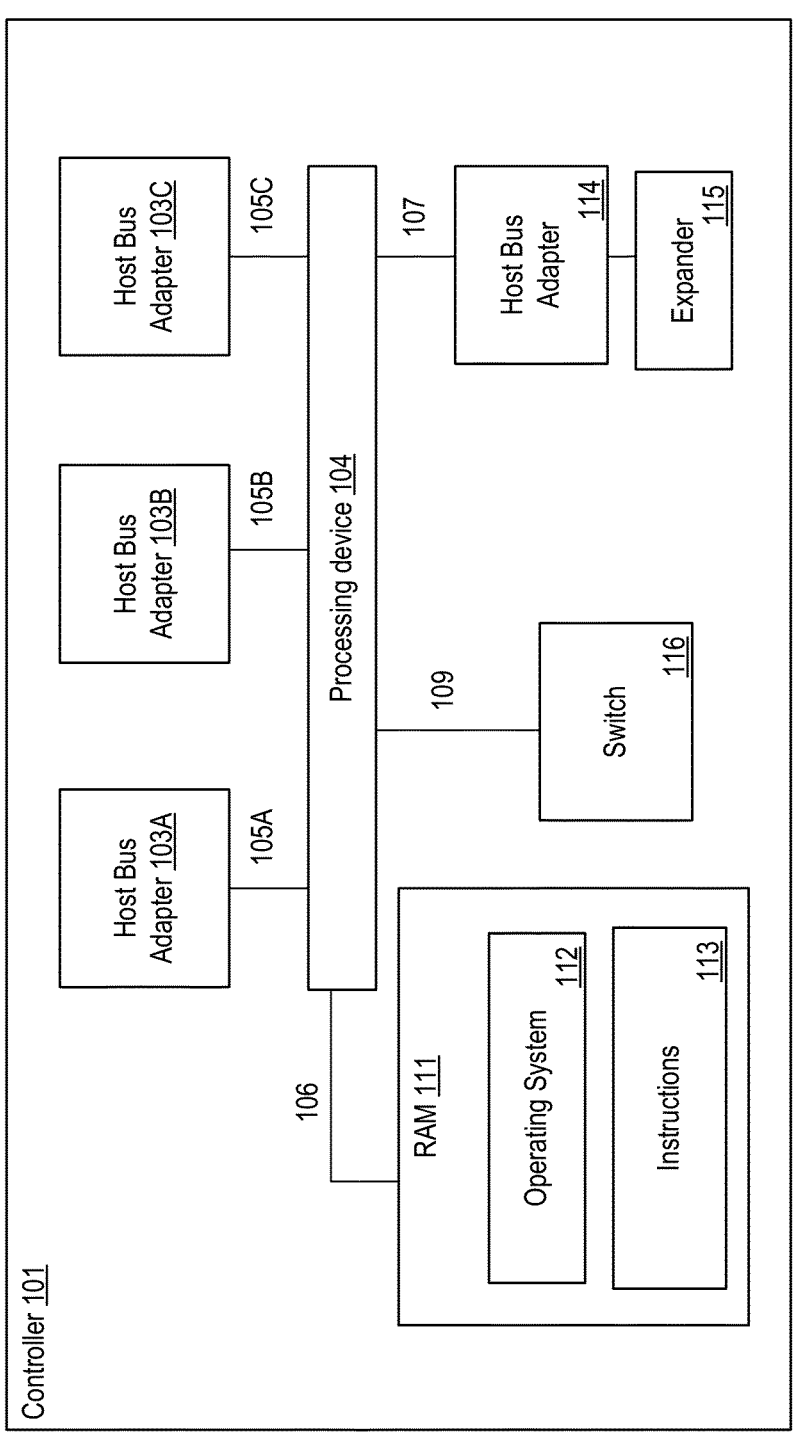
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an application specific integrated circuit ('ASIC'), a field programmable gate array ('FPGA'), a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in a direct-mapped flash storage system. In one embodiment, a direct-mapped flash storage system is one that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is in contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
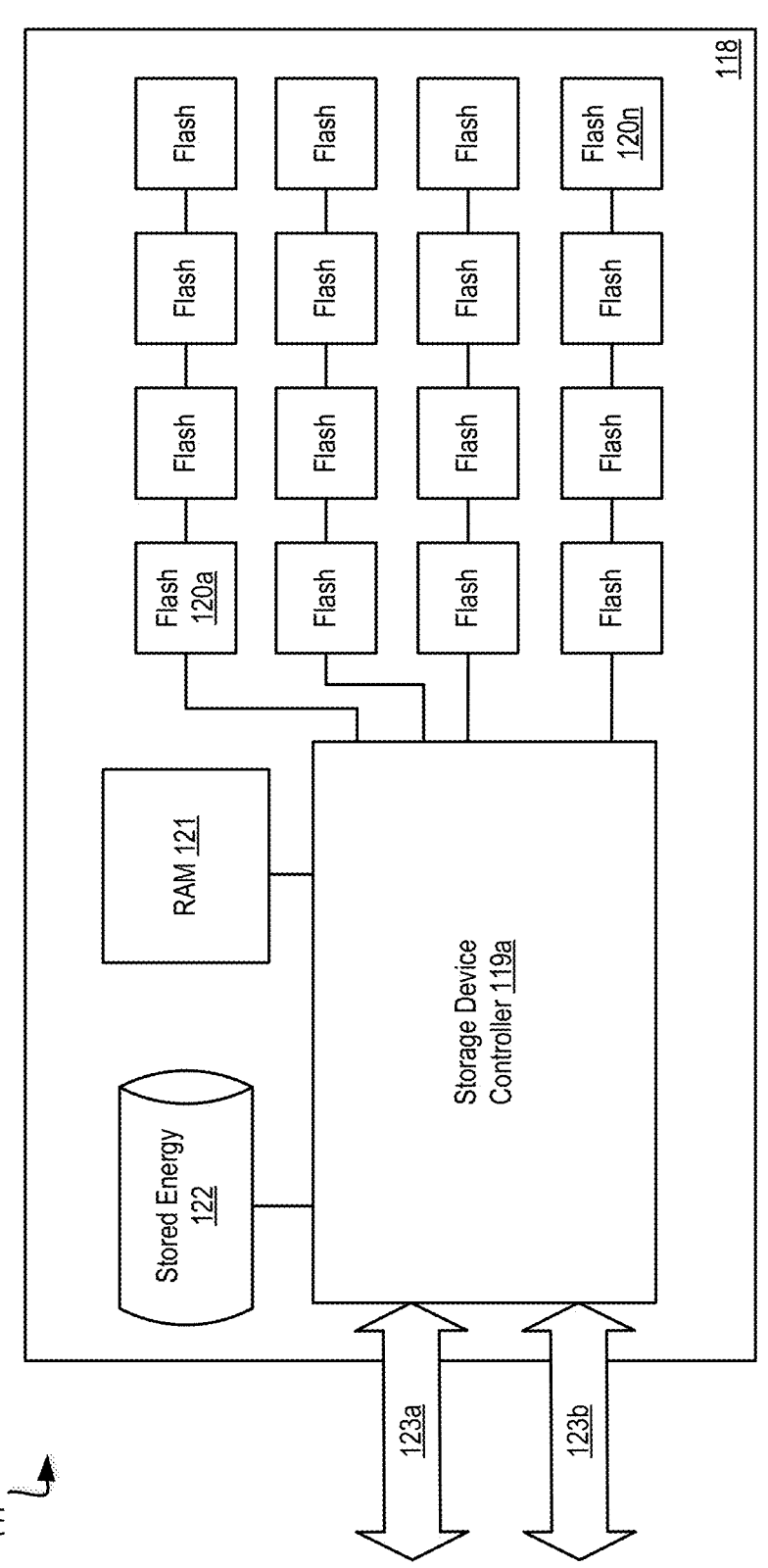
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n. The stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
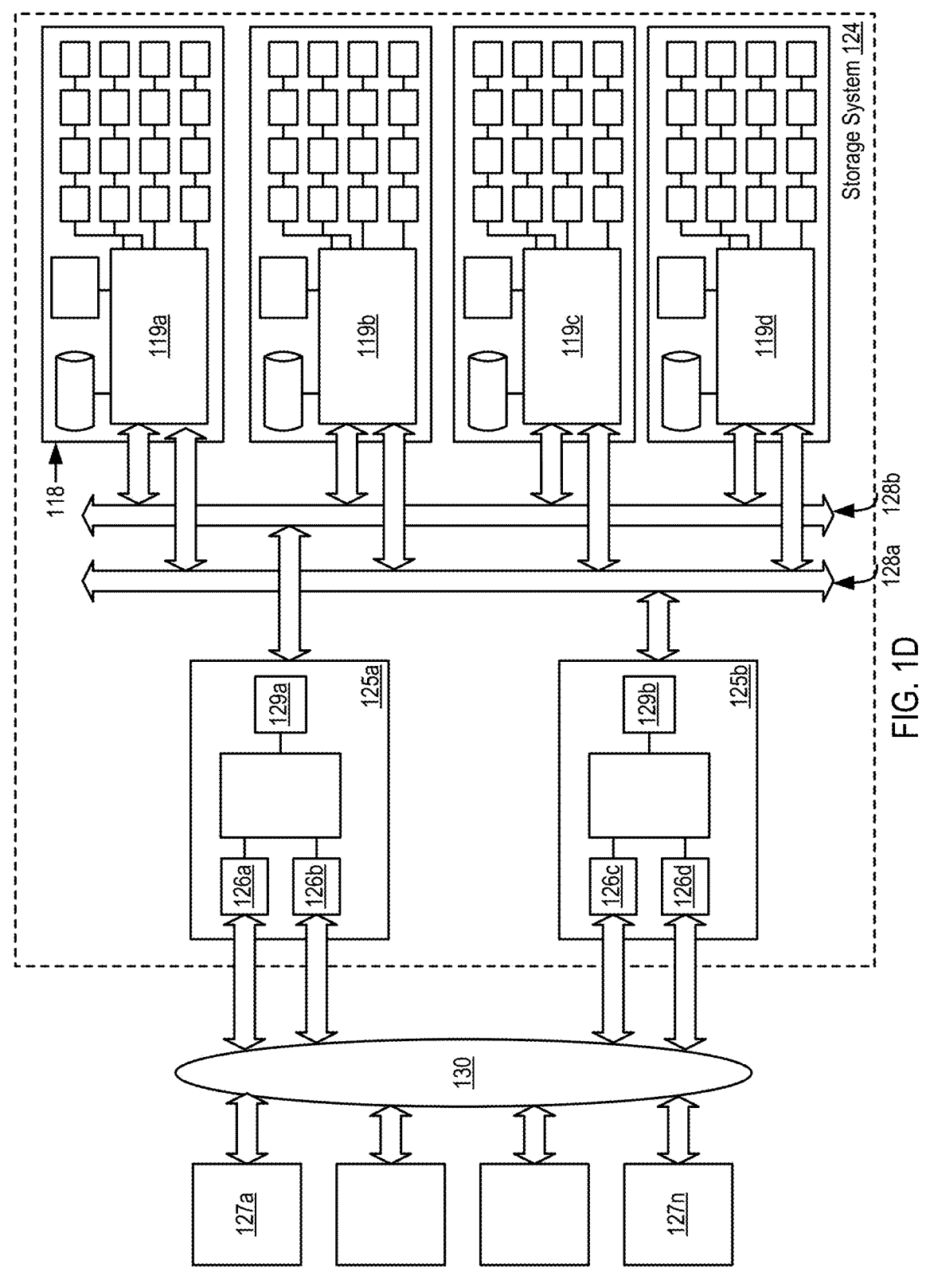
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128*a* and 128*b* may be based on other communications standards (e.g., HyperTransport, InfiniBand, etc.). Other storage system embodiments may operate storage controllers 125*a*, 125*b* as multi-masters for both PCI buses 128*a*, 128*b*. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119*a* may be operable under direction from a storage controller 125*a* to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128*a*, 128*b*) from the storage controllers 125*a*, 125*b*. In one embodiment, a recalculation may include compressing data, attaching indexing or other metadata, combining multiple data segments together, performing erasure code calculations, etc.

In one embodiment, under direction from a storage controller 125*a*, 125*b*, a storage device controller 119*a*, 119*b* may be operable to calculate and transfer data to other storage devices from data stored in RAM (e.g., RAM 121 of FIG. 1C) without involvement of the storage controllers 125*a*, 125*b*. This operation may be used to mirror data stored in one controller 125*a* to another controller 125*b*, or it could be used to offload compression, data aggregation, and/or erasure coding calculations and transfers to storage devices to reduce load on storage controllers or the storage controller interface 129*a*, 129*b* to the PCI bus 128*a*, 128*b*.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one or more storage devices.

In one embodiment, the storage controllers 125*a*, 125*b* may initiate the use of erase blocks within and across storage devices (e.g., 118) in accordance with an age and expected remaining lifespan of the storage devices, or based on other statistics. The storage controllers 125*a*, 125*b* may initiate garbage collection and data migration between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
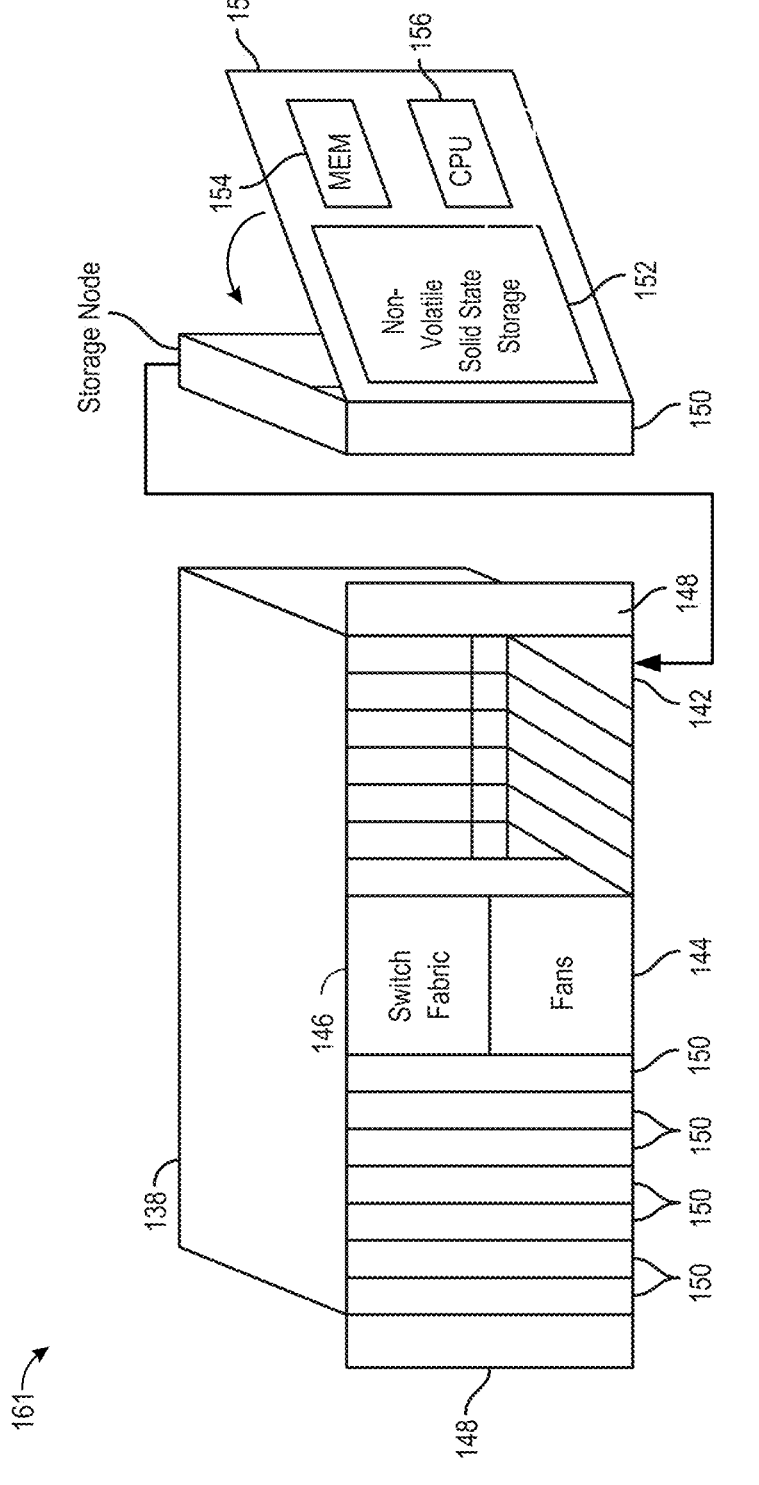
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities.

Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
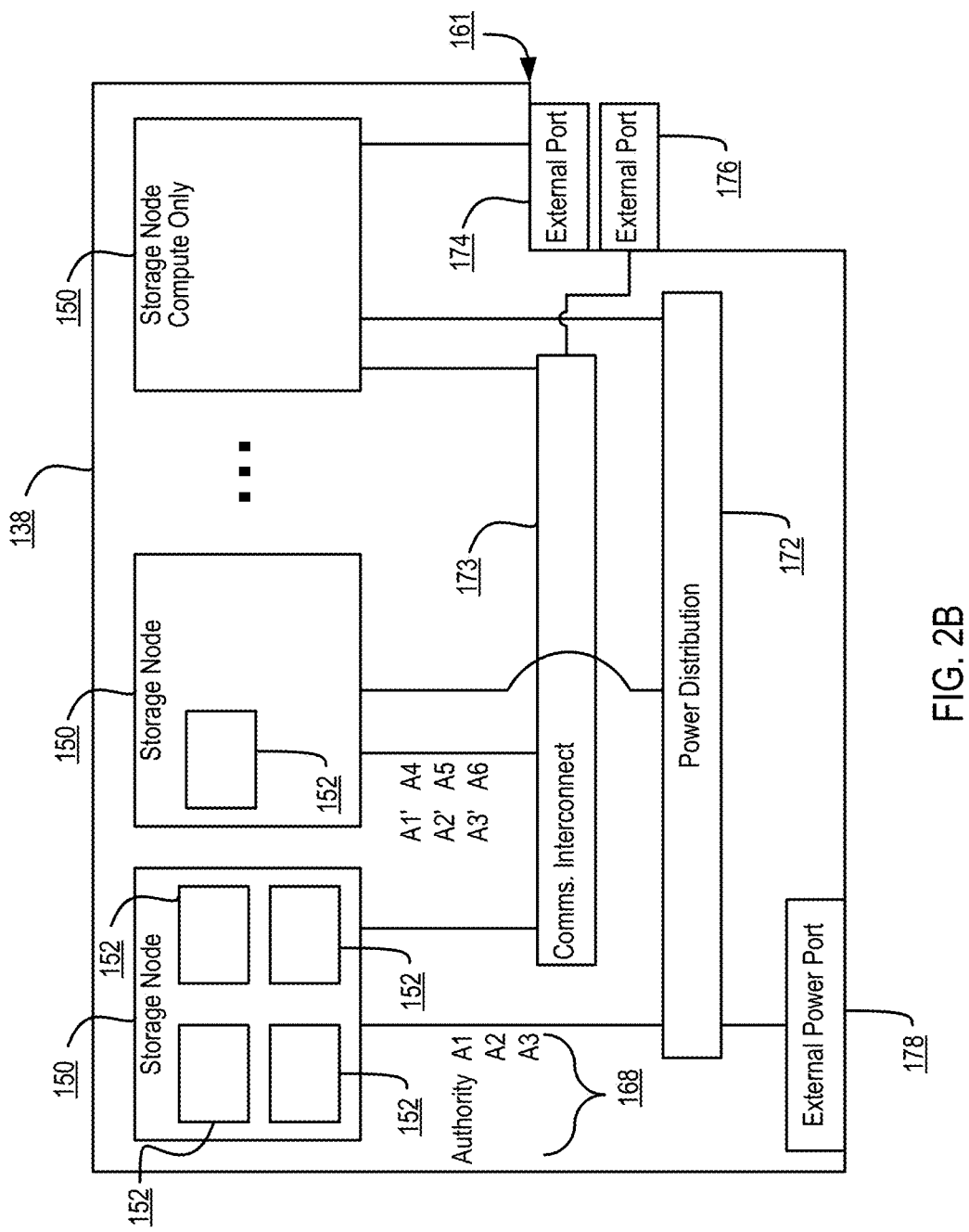
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (Sec FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement.

Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
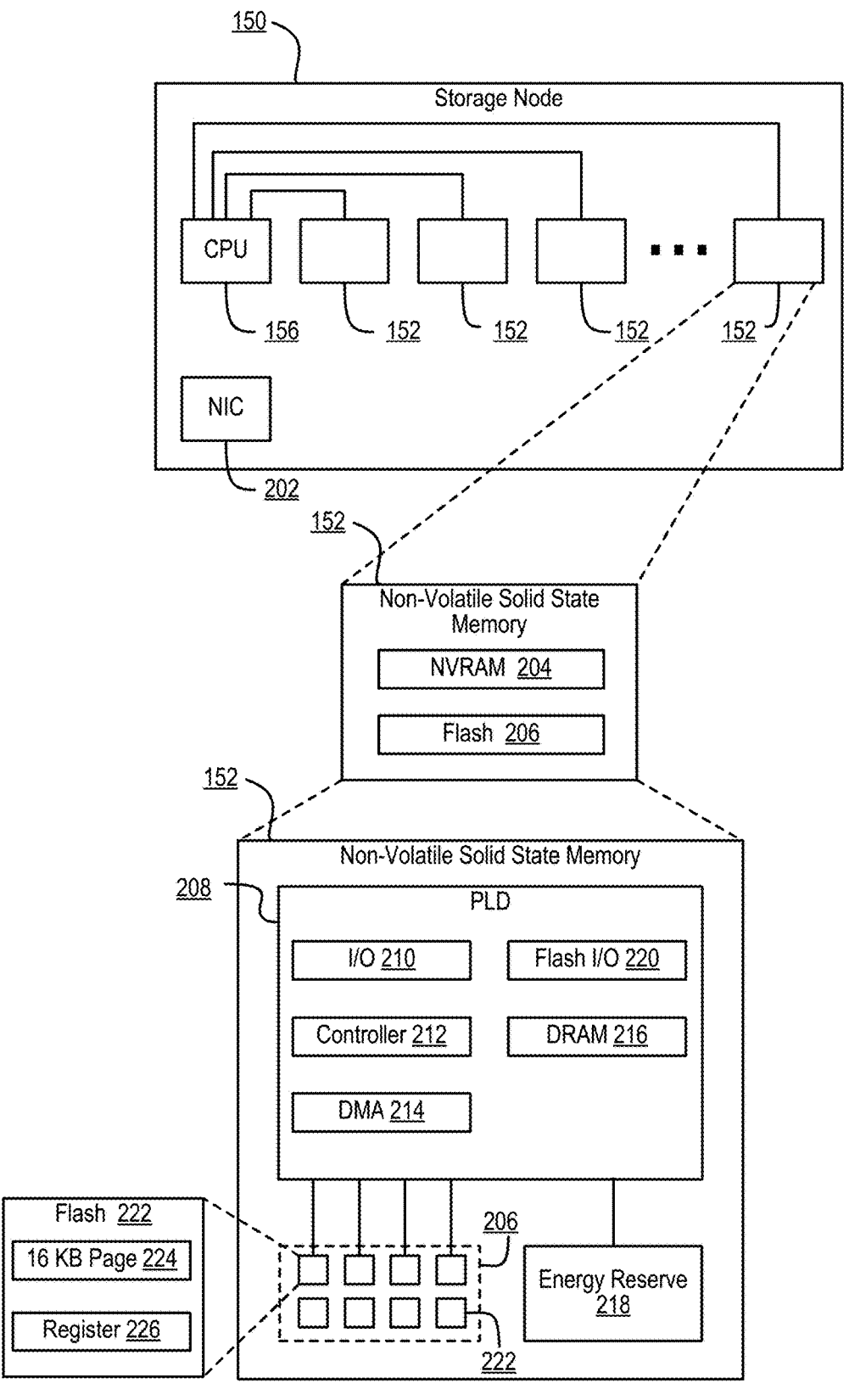
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
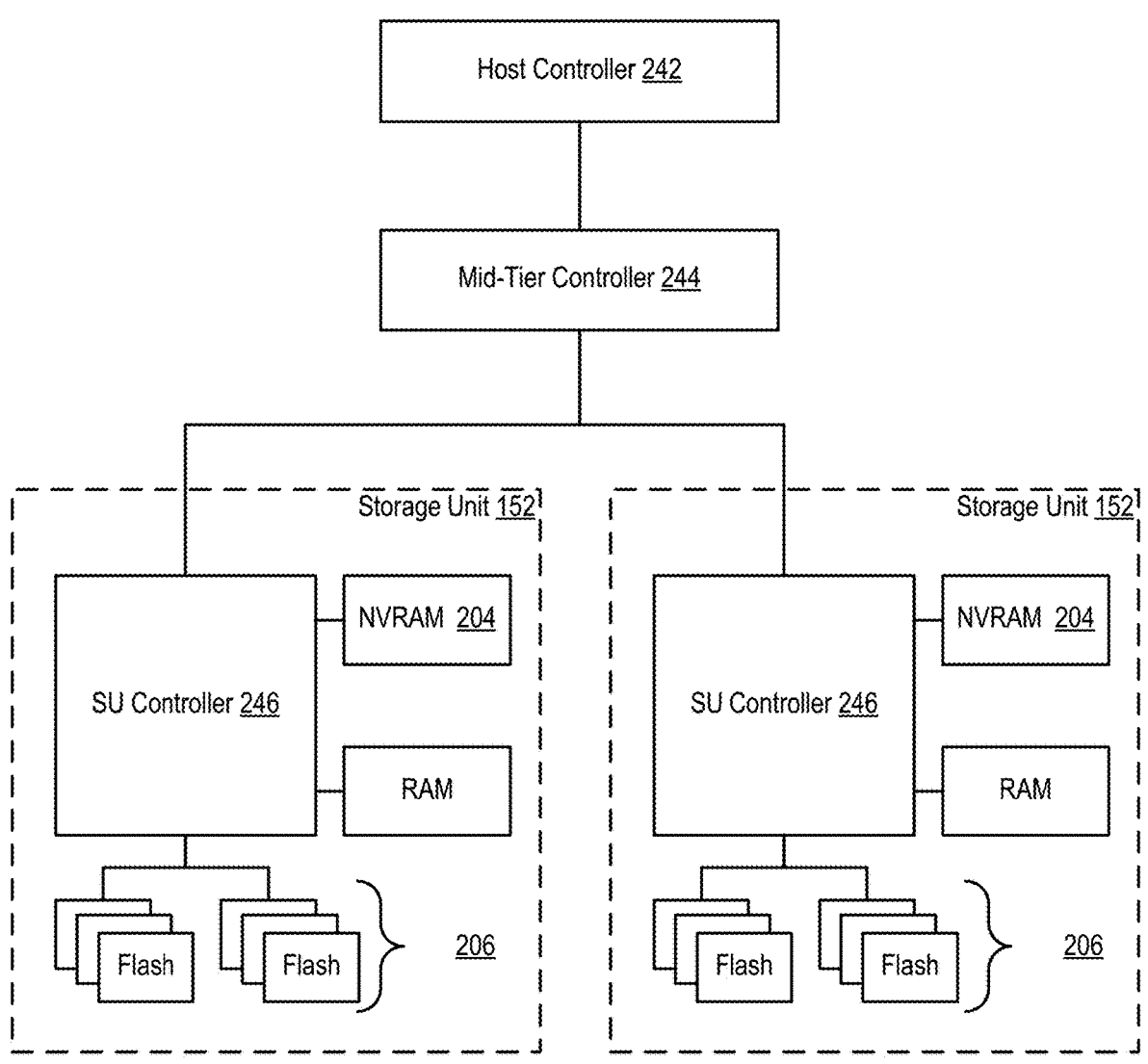
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA (field programmable gate array), flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
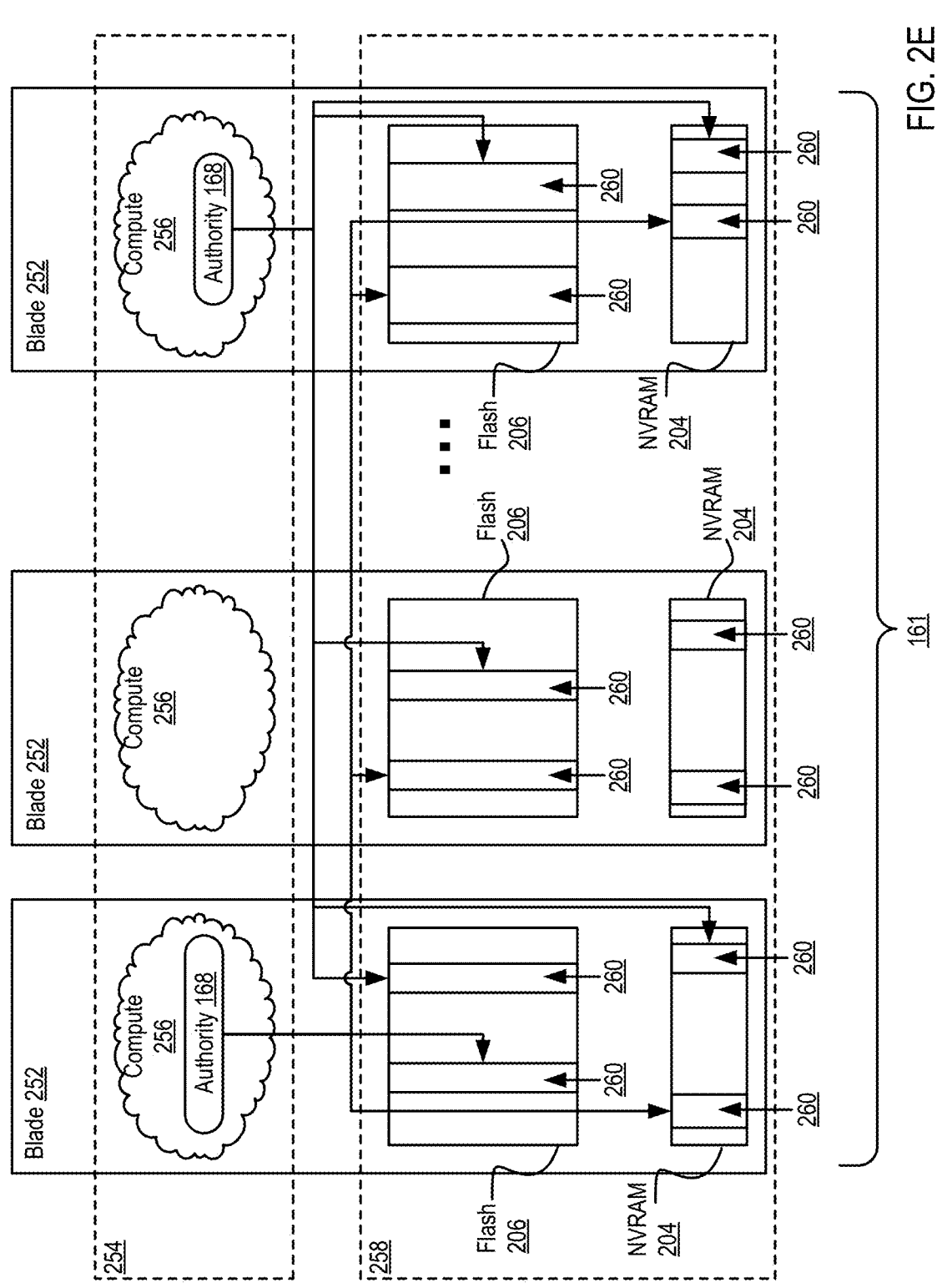
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g., partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
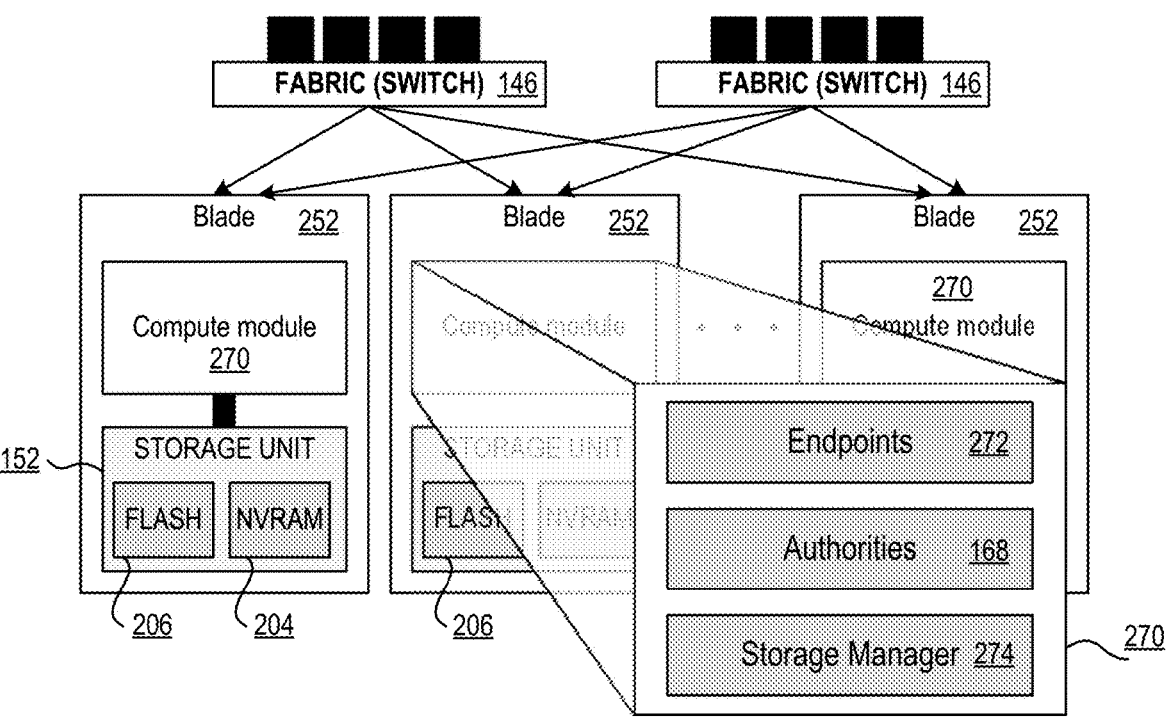
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
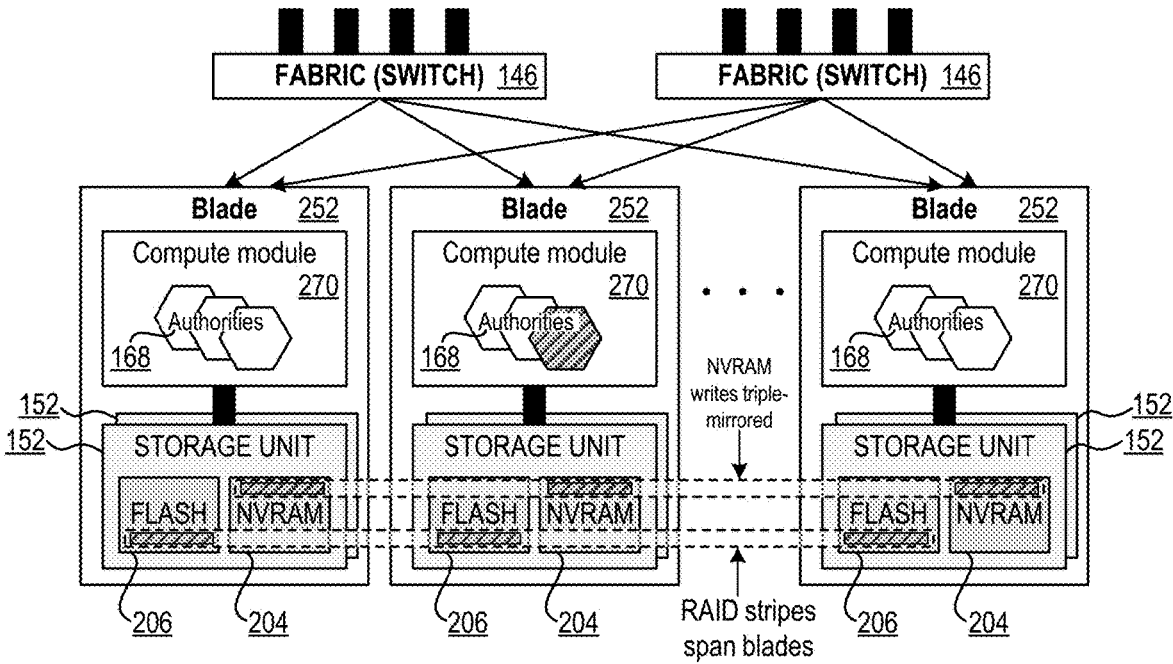
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPV6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
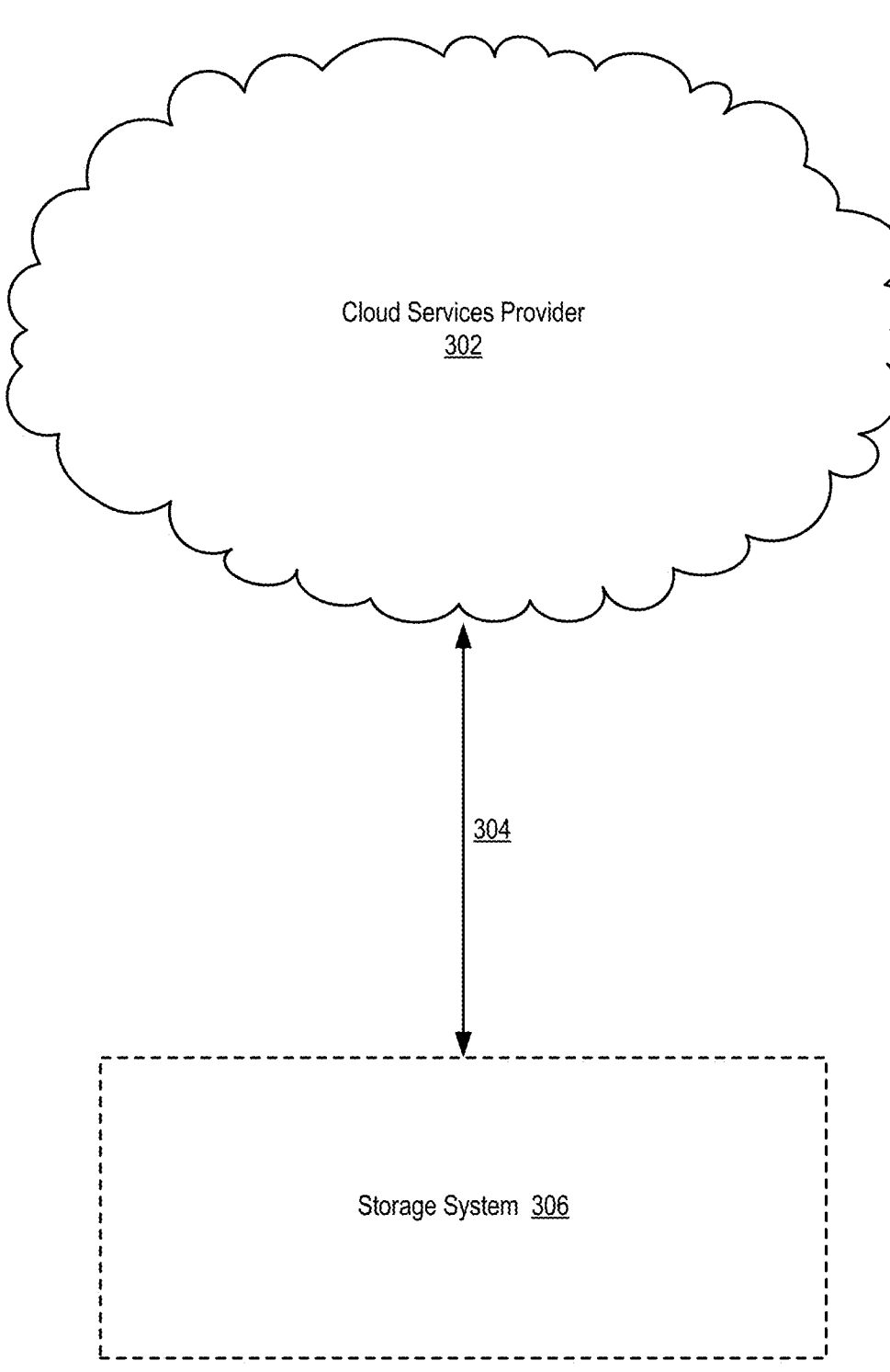
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or local area network ('LAN'), or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services to the storage system 306 and users of the storage system 306 through the implementation of an infrastructure as a service ('IaaS') service model where the cloud services provider 302 offers computing infrastructure such as virtual machines and other resources as a service to subscribers. In addition, the cloud services provider 302 may be configured to provide services to the storage system 306 and users of the storage system 306 through the implementation of a platform as a service ('PaaS') service model where the cloud services provider 302 offers a development environment to application developers. Such a development environment may include, for example, an operating system, programming-language execution environment, database, web server, or other components that may be utilized by application developers to develop and run software solutions on a cloud platform. Furthermore, the cloud services provider 302 may be configured to provide services to the storage system 306 and users of the storage system 306 through the implementation of a software as a service ('SaaS') service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. The cloud services provider 302 may be further configured to provide services to the storage system 306 and users of the storage system 306 through the implementation of an authentication as a service ('AaaS') service model where the cloud services provider 302 offers authentication services that can be used to secure access to applications, data sources, or other resources. The cloud services provider 302 may also be configured to provide services to the storage system 306 and users of the storage system 306 through the implementation of a storage as a service model where the cloud services provider 302 offers access to its storage infrastructure for use by the storage system 306 and users of the storage system 306. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. Public cloud and private cloud deployment models may differ and may come with various advantages and disadvantages. For example, because a public cloud deployment involves the sharing of a computing infrastructure across different organization, such a deployment may not be ideal for organizations with security concerns, mission-critical workloads, uptime requirements demands, and so on. While a private cloud deployment can address some of these issues, a private cloud deployment may require on-premises staff to manage the private cloud. In still alternative embodiments, the cloud services provider 302 may be embodied as a mix of a private and public cloud services with a hybrid cloud deployment.

Although not explicitly depicted in FIG. 3A, readers will appreciate that additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premises with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model where the cloud services provider 302 offers application software, databases, as well as the platforms that are used to run the applications to the storage system 306 and users of the storage system 306, providing the storage system 306 and users of the storage system 306 with on-demand software and eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive telemetry data phoned home by the storage system 306. Such telemetry data may describe various operating characteristics of the storage system 306 and may be analyzed, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
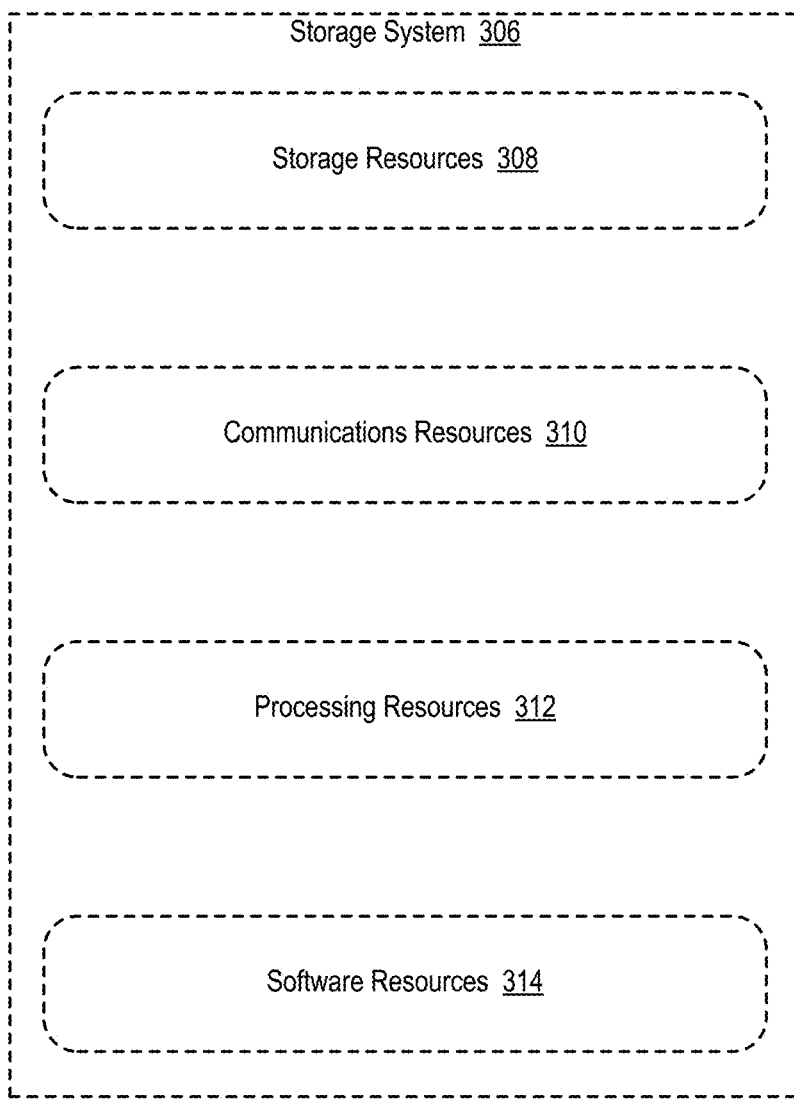
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include storage resources 308, which may be embodied in many forms. For example, in some embodiments the storage resources 308 can include nano-RAM or another form of nonvolatile random access memory that utilizes carbon nanotubes deposited on a substrate. In some embodiments, the storage resources 308 may include 3D crosspoint nonvolatile memory in which bit storage is based on a change of bulk resistance, in conjunction with a stackable crossgridded data access array. In some embodiments, the storage resources 308 may include flash memory, including single-level cell ('SLC') NAND flash, multi-level cell ('MLC') NAND flash, triple-level cell ('TLC') NAND flash, quad-level cell ('QLC') NAND flash, and others. In some embodiments, the storage resources 308 may include non-volatile magnetoresistive random-access memory ('MRAM'), including spin transfer torque ('STT') MRAM, in which data is stored through the use of magnetic storage elements. In some embodiments, the example storage resources 308 may include non-volatile phase-change memory ('PCM') that may have the ability to hold multiple bits in a single cell as cells can achieve a number of distinct intermediary states. In some embodiments, the storage resources 308 may include quantum memory that allows for the storage and retrieval of photonic quantum information. In some embodiments, the example storage resources 308 may include resistive random-access memory ('ReRAM') in which data is stored by changing the resistance across a dielectric solid-state material. In some embodiments, the storage resources 308 may include storage class memory ('SCM') in which solid-state nonvolatile memory may be manufactured at a high density using some combination of sub-lithographic patterning techniques, multiple bits per cell, multiple layers of devices, and so on. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3A may include various forms of storage-class memory ('SCM').

SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC networks. The communications resources 310 can also include FC over ethernet ('FCOE') technologies through which FC frames are encapsulated and transmitted over Ethernet networks. The communications resources 310 can also include InfiniBand ('IB') technologies in which a switched fabric topology is utilized to facilitate transmissions between channel adapters.

The communications resources 310 can also include NVM Express ('NVMe') technologies and NVMe over fabrics ('NVMcoF') technologies through which non-volatile storage media attached via a PCI express ('PCIe') bus may be accessed. The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('ISCSI') technologies to provide block-level access to storage resources 308 within the storage system 306, and other communications resources that may be useful in facilitating data communications between components within the storage system 306, as well as data communications between the storage system 306 and computing devices that are outside of the storage system 306.

The storage system 306 depicted in FIG. 3B also includes processing resources 312 that may be useful in executing computer program instructions and performing other computational tasks within the storage system 306. The processing resources 312 may include one or more application-specific integrated circuits ('ASICs') that are customized for some particular purpose as well as one or more central processing units ('CPUs'). The processing resources 312 may also include one or more digital signal processors ('DSPs'), one or more field-programmable gate arrays ('FPGAs'), one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform various tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques. Through the use of such data protection techniques, business continuity and disaster recovery objectives may be met as a failure of the storage system may not result in the loss of data stored in the storage system.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Readers will appreciate that the presence of such software resources 314 may provide for an improved user experience of the storage system 306, an expansion of functionality supported by the storage system 306, and many other benefits. Consider the specific example of the software resources 314 carrying out data backup techniques through which data stored in the storage system may be copied and stored in a distinct location to avoid data loss in the event of equipment failure or some other form of catastrophe. In such an example, the systems described herein may more reliably (and with less burden placed on the user) perform backup operations relative to interactive backup management systems that require high degrees of user interactivity, offer less robust automation and feature sets, and so on.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware- or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components depicted in FIG. 3B may be grouped into one or more optimized computing packages as converged infrastructures. Such converged infrastructures may include pools of computers, storage and networking resources that can be shared by multiple applications and managed in a collective manner using policy-driven processes. Such converged infrastructures may minimize compatibility issues between various components within the storage system 306 while also reducing various costs associated with the establishment and operation of the storage system 306. Such converged infrastructures may be implemented with a converged infrastructure reference architecture, with standalone appliances, with a software driven hyper-converged approach (e.g., hyper-converged infrastructures), or in other ways.

Readers will appreciate that the storage system 306 depicted in FIG. 3B may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed.

One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. A GPU is a modern processor with thousands of cores, well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others. Furthermore, AI may impact a wide variety of industries and sectors. For example, AI solutions may be used in healthcare to take clinical notes, patient files, research data, and other inputs to generate potential treatment options for doctors to explore. Likewise, AI solutions may be used by retailers to personalize consumer recommendations based on a person's digital footprint of behaviors, profile data, or other data.

Training deep neural networks, however, requires both high quality input data and large amounts of computation. GPUs are massively parallel processors capable of operating on large amounts of data simultaneously. When combined into a multi-GPU cluster, a high throughput pipeline may be required to feed input data from storage to the compute engines. Deep learning is more than just constructing and training models. There also exists an entire data pipeline that must be designed for the scale, iteration, and experimentation necessary for a data science team to succeed.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

A data scientist works to improve the usefulness of the trained model through a wide variety of approaches: more data, better data, smarter training, and deeper models. In many cases, there will be teams of data scientists sharing the same datasets and working in parallel to produce new and improved training models. Often, there is a team of data scientists working within these phases concurrently on the same shared datasets. Multiple, concurrent workloads of data processing, experimentation, and full-scale training layer the demands of multiple access patterns on the storage tier. In other words, storage cannot just satisfy large file reads, but must contend with a mix of large and small file reads and writes. Finally, with multiple data scientists exploring datasets and models, it may be critical to store data in its native format to provide flexibility for each user to transform, clean, and use the data in a unique way. The storage systems described above may provide a natural shared storage home for the dataset, with data protection redundancy (e.g., by using RAID6) and the performance necessary to be a common access point for multiple developers and multiple experiments. Using the storage systems described above may avoid the need to carefully copy subsets of the data for local work, saving both engineering and GPU-accelerated servers use time. These copies become a constant and growing tax as the raw data set and desired transformations constantly update and change.

Readers will appreciate that a fundamental reason why deep learning has seen a surge in success is the continued improvement of models with larger data set sizes. In contrast, classical machine learning algorithms, like logistic regression, stop improving in accuracy at smaller data set sizes. As such, the separation of compute resources and storage resources may also allow independent scaling of each tier, avoiding many of the complexities inherent in managing both together. As the data set size grows or new data sets are considered, a scale out storage system must be able to expand easily. Similarly, if more concurrent training is required, additional GPUs or other compute resources can be added without concern for their internal storage. Furthermore, the storage systems described above may make building, operating, and growing an AI system easier due to the random read bandwidth provided by the storage systems, the ability to of the storage systems to randomly read small files (50 KB) high rates (meaning that no extra effort is required to aggregate individual data points to make larger, storage-friendly files), the ability of the storage systems to scale capacity and performance as either the dataset grows or the throughput requirements grow, the ability of the storage systems to support files or objects, the ability of the storage systems to tune performance for large or small files (i.e., no need for the user to provision filesystems), the ability of the storage systems to support non-disruptive upgrades of hardware and software even during production model training, and for many other reasons.

Small file performance of the storage tier may be critical as many types of inputs, including text, audio, or images will be natively stored as small files. If the storage tier does not handle small files well, an extra step will be required to pre-process and group samples into larger files. Storage, built on top of spinning disks, that relies on SSD as a caching tier, may fall short of the performance needed. Because training with random input batches results in more accurate models, the entire data set must be accessible with full performance. SSD caches only provide high performance for a small subset of the data and will be ineffective at hiding the latency of spinning drives.

Although the preceding paragraphs discuss deep learning applications, readers will appreciate that the storage systems described herein may also be part of a distributed deep learning ('DDL') platform to support the execution of DDL algorithms. Distributed deep learning may be used to significantly accelerate deep learning with distributed computing on GPUs (or other form of accelerator or computer program instruction executor), such that parallelism can be achieved. In addition, the output of training machine learning and deep learning models, such as a fully trained machine learning model, may be used for a variety of purposes and in conjunction with other tools. For example, trained machine learning models may be used in conjunction with tools like Core ML to integrate a broad variety of machine learning model types into an application. In fact, trained models may be run through Core ML converter tools and inserted into a custom application that can be deployed on compatible devices. The storage systems described above may also be paired with other technologies such as TensorFlow, an open-source software library for dataflow programming across a range of tasks that may be used for machine learning applications such as neural networks, to facilitate the development of such machine learning models, applications, and so on.

Readers will further appreciate that the systems described above may be deployed in a variety of ways to support the democratization of AI, as AI becomes more available for mass consumption. The democratization of AI may include, for example, the ability to offer AI as a Platform-as-a-Service, the growth of Artificial general intelligence offerings, the proliferation of Autonomous level 4 and Autonomous level 5 vehicles, the availability of autonomous mobile robots, the development of conversational AI platforms, and many others. For example, the systems described above may be deployed in cloud environments, edge environments, or other environments that are useful in supporting the democratization of AI. As part of the democratization of AI, a movement may occur from narrow AI that consists of highly scoped machine learning solutions that target a particular task to artificial general intelligence where the use of machine learning is expanded to handle a broad range of use cases that could essentially perform any intelligent task that a human could perform and could learn dynamically, much like a human.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI)

systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. Such blockchains may be embodied as a continuously growing list of records, called blocks, which are linked and secured using cryptography. Each block in a blockchain may contain a hash pointer as a link to a previous block, a timestamp, transaction data, and so on. Blockchains may be designed to be resistant to modification of the data and can serve as an open, distributed ledger that can record transactions between two parties efficiently and in a verifiable and permanent way. This makes blockchains potentially suitable for the recording of events, medical records, and other records management activities, such as identity management, transaction processing, and others. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Readers will appreciate that blockchain technologies may impact a wide variety of industries and sectors. For example, blockchain technologies may be used in real estate transactions as blockchain based contracts whose use can eliminate the need for 3rd parties and enable self-executing actions when conditions are met. Likewise, universal health records can be created by aggregating and placing a person's health history onto a blockchain ledger for any healthcare provider, or permissioned health care providers, to access and update.

Readers will appreciate that the usage of blockchains is not limited to financial transactions, contracts, and the like. In fact, blockchains may be leveraged to enable the decentralized aggregation, ordering, timestamping and archiving of any type of information, including structured data, correspondence, documentation, or other data. Through the usage of blockchains, participants can provably and permanently agree on exactly what data was entered, when and by whom, without relying on a trusted intermediary. For example, SAP's recently launched blockchain platform, which supports MultiChain and Hyperledger Fabric, targets a broad range of supply chain and other non-financial applications.

One way to use a blockchain for recording data is to embed each piece of data directly inside a transaction. Every blockchain transaction may be digitally signed by one or more parties, replicated to a plurality of nodes, ordered and timestamped by the chain's consensus algorithm, and stored permanently in a tamper-proof way. Any data within the transaction will therefore be stored identically but independently by every node, along with a proof of who wrote it and when. The chain's users are able to retrieve this information at any future time. This type of storage may be referred to as on-chain storage. On-chain storage may not be particularly practical, however, when attempting to store a very large dataset. As such, in accordance with embodiments of the present disclosure, blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Each hash may serve as a commitment to its input data, with the data itself being stored outside of the blockchain. Readers will appreciate that any blockchain participant that needs an off-chain piece of data cannot reproduce the data from its hash, but if the data can be retrieved in some other way, then the on-chain hash serves to confirm who created it and when. Just like regular on-chain data, the hash may be embedded inside a digitally signed transaction, which was included in the chain by consensus.

Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW). While typical PoW systems only depend on the previous block in order to generate each successive block, the PoA algorithm may incorporate data from a randomly chosen previous block. Combined with the blockweave data structure, miners do not need to store all blocks (forming a blockchain), but rather can store any previous blocks forming a weave of blocks (a blockweave). This enables increased levels of scalability, speed and low-cost and reduces the cost of data storage in part because miners need not store all blocks, thereby resulting in a substantial reduction in the amount of electricity that is consumed during the mining process because, as the network expands, electricity consumption decreases because a blockweave demands less and less hashing power for consensus as data is added to the system. Furthermore, blockweaves may be deployed on a decentralized storage network in which incentives are created to encourage rapid data sharing. Such decentralized storage networks may also make use of blockshadowing techniques, where nodes only send a minimal block "shadow" to other nodes that allows peers to reconstruct a full block, instead of transmitting the full block itself.

The storage systems described above may, either alone or in combination with other computing devices, be used to support in-memory computing applications. In memory computing involves the storage of information in RAM that is distributed across a cluster of computers. In-memory computing helps business customers, including retailers, banks and utilities, to quickly detect patterns, analyze massive data volumes on the fly, and perform their operations quickly. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available-including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also possible.

Readers will appreciate that the systems described above may be better suited for the applications described above relative to other systems that may include, for example, a distributed direct-attached storage (DDAS) solution deployed in server nodes. Such DDAS solutions may be built for handling large, less sequential accesses but may be less able to handle small, random accesses. Readers will further appreciate that the storage systems described above may be utilized to provide a platform for the applications described above that is preferable to the utilization of cloud-based resources as the storage systems may be included in an on-site or in-house infrastructure that is more secure, more locally and internally managed, more robust in feature sets and performance, or otherwise preferable to the utilization of cloud-based resources as part of a platform to support the applications described above. For example, services built on platforms such as IBM's Watson may require a business enterprise to distribute individual user information, such as financial transaction information or identifiable patient records, to other institutions. As such, cloud-based offerings of AI as a service may be less desirable than internally managed and offered AI as a service that is supported by storage systems such as the storage systems described above, for a wide array of technical reasons as well as for various business reasons.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services. Such platforms may seamlessly collect, organize, secure, and analyze data across an enterprise, as well as simplify hybrid data management, unified data governance and integration, data science and business analytics with a single solution.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing-so fast, in fact, that sending data up to a cloud environment and back to receive data processing support may simply be too slow. Likewise, machines like locomotives and gas turbines that generate large amounts of information through the use of a wide array of data-generating sensors may benefit from the rapid data processing capabilities of an edge solution. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

Consider a specific example of inventory management in a warehouse, distribution center, or similar location. A large inventory, warehousing, shipping, order-fulfillment, manufacturing or other operation has a large amount of inventory on inventory shelves, and high resolution digital cameras that produce a firehose of large data. All of this data may be taken into an image processing system, which may reduce the amount of data to a firehose of small data. All of the small data may be stored on-premises in storage. The on-premises storage, at the edge of the facility, may be coupled to the cloud, for external reports, real-time control and cloud storage. Inventory management may be performed with the results of the image processing, so that inventory can be tracked on the shelves and restocked, moved, shipped, modified with new products, or discontinued/obsolescent products deleted, etc. The above scenario is a prime candidate for an embodiment of the configurable processing and storage systems described above. A combination of compute-only blades and offload blades suited for the image processing, perhaps with deep learning on offload-FPGA or offload-custom blade(s) could take in the firehose of large data from all of the digital cameras, and produce the firehose of small data. All of the small data could then be stored by storage nodes, operating with storage units in whichever combination of types of storage blades best handles the data flow. This is an example of storage and function acceleration and integration. Depending on external communication needs with the cloud, and external processing in the cloud, and depending on reliability of network connections and cloud resources, the system could be sized for storage and compute management with bursty workloads and variable conductivity reliability. Also, depending on other inventory management aspects, the system could be configured for scheduling and resource management in a hybrid edge/cloud environment.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. Big data analytics applications enable data scientists, predictive modelers, statisticians and other analytics professionals to analyze growing volumes of structured transaction data, plus other forms of data that are often left untapped by conventional business intelligence (BI) and analytics programs. As part of that process, semi-structured and unstructured data such as, for example, internet clickstream data, web server logs, social media content, text from customer emails and survey responses, mobile-phone call-detail records, IoT sensor data, and other data may be converted to a structured form. Big data analytics is a form of advanced analytics, which involves complex applications with elements such as predictive models, statistical algorithms and what-if analyses powered by high-performance analytics systems.

The storage systems described above may also support (including implementing as a system interface) applications that perform tasks in response to human speech. For example, the storage systems may support the execution of intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others. The storage systems described above may also, either alone or in combination with other computing environments, be used to deliver a wide range of transparently immersive experiences where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others. The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

Readers will appreciate that some transparently immersive experiences may involve the use of digital twins of various "things" such as people, places, processes, systems, and so on. Such digital twins and other immersive technologies can alter the way that humans interact with technology, as conversational platforms, augmented reality, virtual reality and mixed reality provide a more natural and immersive interaction with the digital world. In fact, digital twins may be linked with the real-world, perhaps even in real-time, to understand the state of a thing or system, respond to changes, and so on. Because digital twins consolidate massive amounts of information on individual assets and groups of assets (even possibly providing control of those assets), digital twins may communicate with each other to digital factory models of multiple linked digital twins.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload. Furthermore, application monitoring and visibility tools may be deployed to move application workloads around different clouds, identify performance issues, and perform other tasks. In addition, security and compliance tools may be deployed for to ensure compliance with security requirements, government regulations, and so on. Such a multi-cloud environment may also include tools for application delivery and smart workload management to ensure efficient application delivery and help direct workloads across the distributed and heterogeneous infrastructure, as well as tools that case the deployment and maintenance of packaged and custom applications in the cloud and enable portability amongst clouds. The multi-cloud environment may similarly include tools for data portability.

The storage systems described above may be used as a part of a platform to enable the use of crypto-anchors that may be used to authenticate a product's origins and contents to ensure that it matches a blockchain record associated with the product. Such crypto-anchors may take many forms including, for example, as edible ink, as a mobile sensor, as a microchip, and others. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming through the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers. Through the use of a parallel file system, file contents may be distributed over a plurality of storage servers using striping and metadata may be distributed over a plurality of metadata servers on a directory level, with each server storing a part of the complete file system tree. Readers will appreciate that in some embodiments, the storage servers and metadata servers may run in userspace on top of an existing local file system. Furthermore, dedicated hardware is not required for client services, the metadata servers, or the hardware servers as metadata servers, storage servers, and even the client services may be run on the same machines.

Readers will appreciate that, in part due to the emergence of many of the technologies discussed above including mobile devices, cloud services, social networks, big data analytics, and so on, an information technology platform may be needed to integrate all of these technologies and drive new business opportunities by quickly delivering revenue-generating products, services, and experiences-rather than merely providing the technology to automate internal business processes. Information technology organizations may need to balance resources and investments needed to keep core legacy systems up and running while also integrating technologies to build an information technology platform that can provide the speed and flexibility in areas such as, for example, exploiting big data, managing unstructured data, and working with cloud applications and services. One possible embodiment of such an information technology platform is a composable infrastructure that includes fluid resource pools, such as many of the systems described above that, can meet the changing needs of applications by allowing for the composition and recomposition of blocks of disaggregated compute, storage, and fabric infrastructure. Such a composable infrastructure can also include a single management interface to eliminate complexity and a unified API to discover, search, inventory, configure, provision, update, and diagnose the composable infrastructure.

The systems described above can support the execution of a wide array of software applications. Such software applications can be deployed in a variety of ways, including container-based deployment models. Containerized applications may be managed using a variety of tools. For example, containerized applications may be managed using Docker Swarm, a clustering and scheduling tool for Docker containers that enables IT administrators and developers to establish and manage a cluster of Docker nodes as a single virtual system. Likewise, containerized applications may be managed through the use of Kubernetes, a container-orchestration system for automating deployment, scaling and management of containerized applications. Kubernetes may execute on top of operating systems such as, for example, Red Hat Enterprise Linux, Ubuntu Server, SUSE Linux Enterprise Servers, and others. In such examples, a master node may assign tasks to worker/minion nodes. Kubernetes can include a set of components (e.g., kubelet, kube-proxy, cAdvisor) that manage individual nodes as well as a set of components (e.g., etcd, API server, Scheduler, Control Manager) that form a control plane. Various controllers (e.g., Replication Controller, DaemonSet Controller) can drive the state of a Kubernetes cluster by managing a set of pods that includes one or more containers that are deployed on a single node. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better. MEC technology is designed to be implemented at the cellular base stations or other edge nodes, and enables flexible and rapid deployment of new applications and services for customers. MEC may also allow cellular operators to open their radio access network ('RAN') to authorized third-parties, such as application developers and content provider. Furthermore, edge computing and micro data centers may substantially reduce the cost of smartphones that work with the 5G network because the customer may not need devices with such intensive processing power and the expensive requisite components.

Readers will appreciate that 5G networks may generate more data than previous network generations, especially in view of the fact that the high network bandwidth offered by 5G networks may cause the 5G networks to handle amounts and types of data (e.g., sensor data from self-driving cars, data generated by AR/VR technologies) that weren't as feasible for previous generation networks. In such examples, the scalability offered by the systems described above may be very valuable as the amount of data increases, adoption of emerging technologies increase, and so on.

Figure 3C:
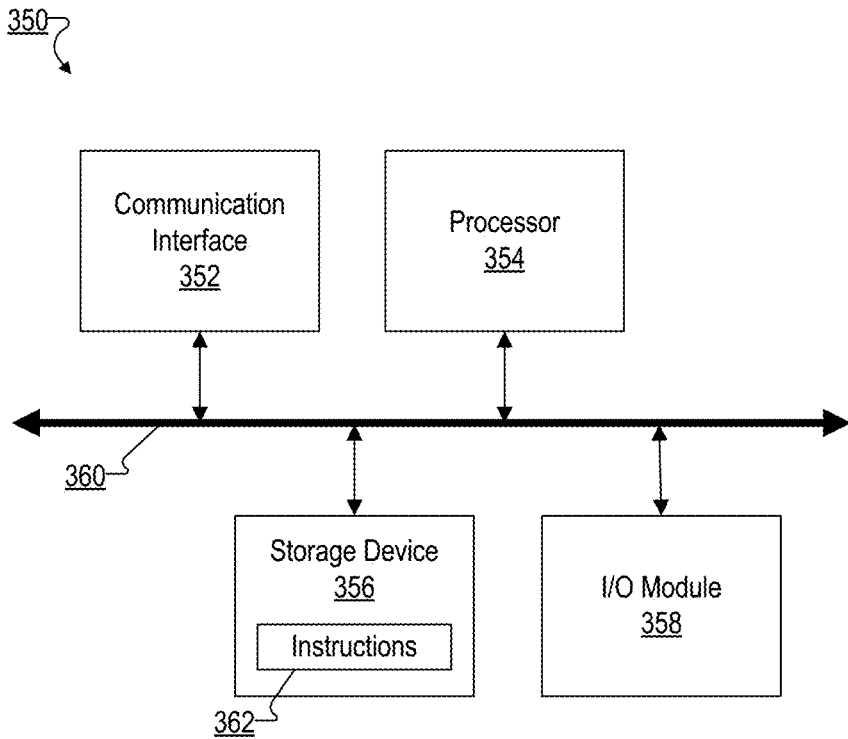
FIG. 3C illustrates an exemplary computing device that may be specifically configured to perform one or more of the processes described herein.

For further explanation, FIG. 3C illustrates an exemplary computing device 350 that may be specifically configured to perform one or more of the processes described herein. As shown in FIG. 3C, computing device 350 may include a communication interface 352, a processor 354, a storage device 356, and an input/output ("I/O") module 358 communicatively connected one to another via a communication infrastructure 360. While an exemplary computing device 350 is shown in FIG. 3C, the components illustrated in FIG. 3C are not intended to be limiting. Additional or alternative components may be used in other embodiments. Components of computing device 350 shown in FIG. 3C will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Figure 3D:
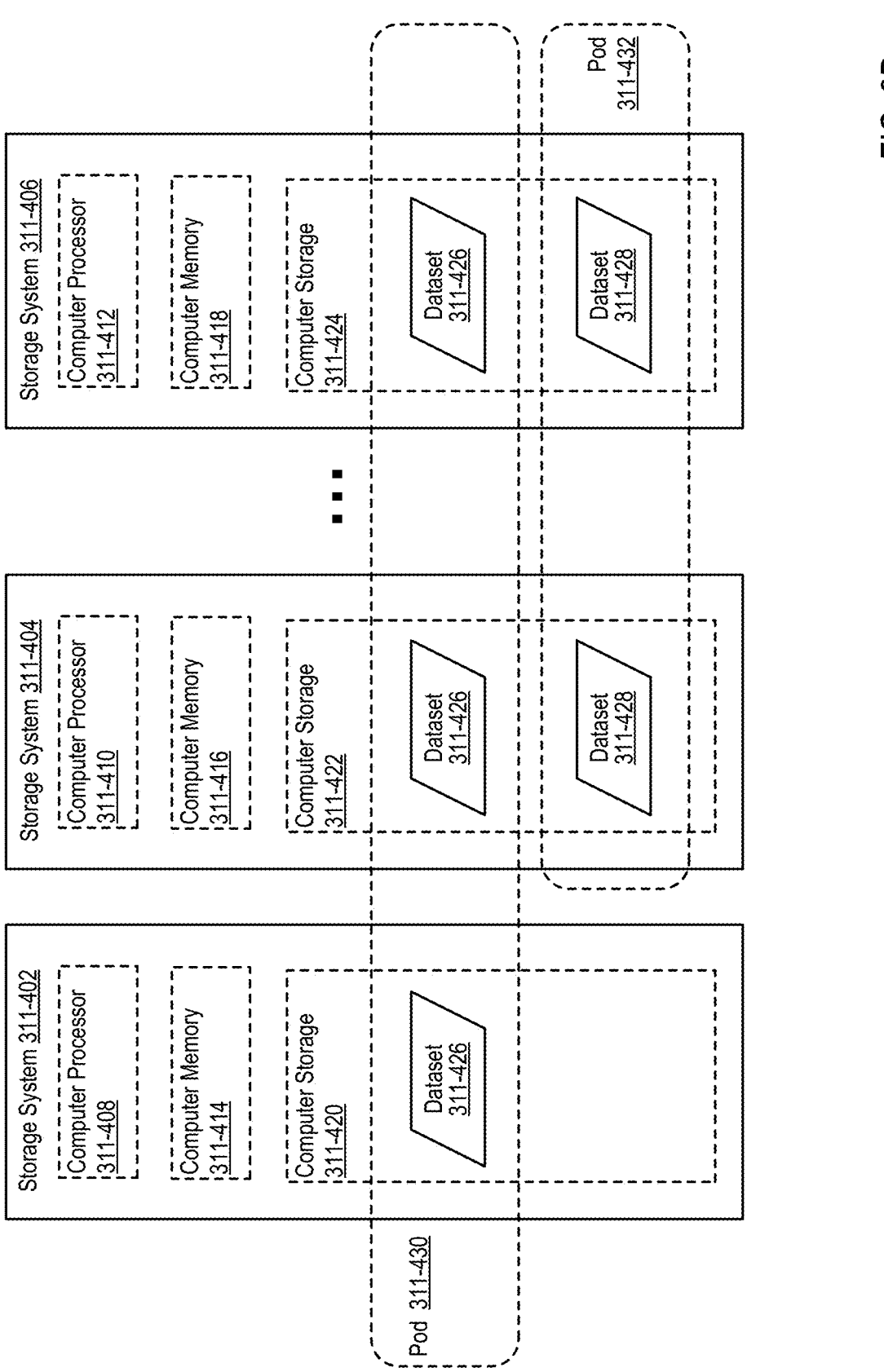
FIG. 3D sets forth a block diagram illustrating a plurality of storage systems that support a pod according to some embodiments of the present disclosure.

For further explanation, FIG. 3D sets forth a block diagram illustrating a plurality of storage systems (311-402, 311-404, 311-406) that support a pod according to some embodiments of the present disclosure. Although depicted in less detail, the storage systems (311-402, 311-404, 311-406) depicted in FIG. 3D may be similar to the storage systems described above with reference to FIGS. 1A-1D, FIGS. 2A-2G, FIGS. 3A-3B, or any combination thereof. In fact, the storage systems (311-402, 311-404, 311-406) depicted in FIG. 3D may include the same, fewer, or additional components as the storage systems described above.

In the example depicted in FIG. 3D, each of the storage systems (311-402, 311-404, 311-406) is depicted as having at least one computer processor (311-408, 311-410, 311-412), computer memory (311-414, 311-416, 311-418), and computer storage (311-420, 311-422, 311-424). Although depicted in some embodiments the computer memory (311-414, 311-416, 311-418) and the computer storage (311-420, 311-422, 311-424) may be part of the same hardware devices, in other embodiments the computer memory (311-414, 311-416, 311-418) and the computer storage (311-420, 311-422, 311-424) may be part of different hardware devices. The distinction between the computer memory (311-414, 311-416, 311-418) and the computer storage (311-420, 311-422, 311-424) in this particular example may be that the computer memory (311-414, 311-416, 311-418) is physically proximate to the computer processors (311-408, 311-410, 311-412) and may store computer program instructions that are executed by the computer processors (311-408, 311-410, 311-412), while the computer storage (311-420, 311-422, 311-424) is embodied as non-volatile storage for storing user data, metadata describing the user data, and so on. Referring to the example above in FIG. 1A, for example, the computer processors (311-408, 311-410, 311-412) and computer memory (311-414, 311-416, 311-418) for a particular storage system (311-402, 311-404, 311-406) may reside within one of more of the controllers (110A-110D) while the attached storage devices (171A-171F) may serve as the computer storage (311-420, 311-422, 311-424) within a particular storage system (311-402, 311-404, 311-406).

In the example depicted in FIG. 3D, the depicted storage systems (311-402, 311-404, 311-406) may attach to one or more pods (311-430, 311-432) according to some embodiments of the present disclosure. Each of the pods (311-430, 311-432) depicted in FIG. 3D can include a dataset (311-426, 311-428). For example, a first pod (311-430) that three storage systems (311-402, 311-404, 311-406) have attached to includes a first dataset (311-426) while a second pod (311-432) that two storage systems (311-404, 311-406) have attached to includes a second dataset (311-428). In such an example, when a particular storage system attaches to a pod, the pod's dataset is copied to the particular storage system and then kept up to date as the dataset is modified. Storage systems can be removed from a pod, resulting in the dataset being no longer kept up to date on the removed storage system. In the example depicted in FIG. 3D, any storage system which is active for a pod (it is an up-to-date, operating, non-faulted member of a non-faulted pod) can receive and process requests to modify or read the pod's dataset.

In the example depicted in FIG. 3D, each pod (311-430, 311-432) may also include a set of managed objects and management operations, as well as a set of access operations to modify or read the dataset (311-426, 311-428) that is associated with the particular pod (311-430, 311-432). In such an example, the management operations may modify or query managed objects equivalently through any of the storage systems. Likewise, access operations to read or modify the dataset may operate equivalently through any of the storage systems. In such an example, while each storage system stores a separate copy of the dataset as a proper subset of the datasets stored and advertised for use by the storage system, the operations to modify managed objects or the dataset performed and completed through any one storage system are reflected in subsequent management objects to query the pod or subsequent access operations to read the dataset.

Readers will appreciate that pods may implement more capabilities than just a clustered synchronously replicated dataset. For example, pods can be used to implement tenants, whereby datasets are in some way securely isolated from each other. Pods can also be used to implement virtual arrays or virtual storage systems where each pod is presented as a unique storage entity on a network (e.g., a Storage Area Network, or Internet Protocol network) with separate addresses. In the case of a multi-storage-system pod implementing a virtual storage system, all physical storage systems associated with the pod may present themselves as in some way the same storage system (e.g., as if the multiple physical storage systems were no different than multiple network ports into a single storage system).

Readers will appreciate that pods may also be units of administration, representing a collection of volumes, file systems, object/analytic stores, snapshots, and other administrative entities, where making administrative changes (e.g., name changes, property changes, managing exports or permissions for some part of the pod's dataset), on any one storage system is automatically reflected to all active storage systems associated with the pod. In addition, pods could also be units of data collection and data analysis, where performance and capacity metrics are presented in ways that aggregate across all active storage systems for the pod, or that call out data collection and analysis separately for each pod, or perhaps presenting each attached storage system's contribution to the incoming content and performance for each a pod.

One model for pod membership may be defined as a list of storage systems, and a subset of that list where storage systems are considered to be in-sync for the pod. A storage system may be considered to be in-sync for a pod if it is at least within a recovery of having identical idle content for the last written copy of the dataset associated with the pod. Idle content is the content after any in-progress modifications have completed with no processing of new modifications. Sometimes this is referred to as "crash recoverable" consistency. Recovery of a pod carries out the process of reconciling differences in applying concurrent updates to in-sync storage systems in the pod. Recovery can resolve any inconsistencies between storage systems in the completion of concurrent modifications that had been requested to various members of the pod but that were not signaled to any requestor as having completed successfully. Storage systems that are listed as pod members but that are not listed as in-sync for the pod can be described as "detached" from the pod. Storage systems that are listed as pod members, are in-sync for the pod, and are currently available for actively serving data for the pod are "online" for the pod.

Each storage system member of a pod may have its own copy of the membership, including which storage systems it last knew were in-sync, and which storage systems it last knew comprised the entire set of pod members. To be online for a pod, a storage system must consider itself to be in-sync for the pod and must be communicating with all other storage systems it considers to be in-sync for the pod. If a storage system can't be certain that it is in-sync and communicating with all other storage systems that are in-sync, then it must stop processing new incoming requests for the pod (or must complete them with an error or exception) until it can be certain that it is in-sync and communicating with all other storage systems that are in-sync. A first storage system may conclude that a second paired storage system should be detached, which will allow the first storage system to continue since it is now in-sync with all storage systems now in the list. But, the second storage system must be prevented from concluding, alternatively, that the first storage system should be detached and with the second storage system continuing operation. This would result in a "split brain" condition that can lead to irreconcilable datasets, dataset corruption, or application corruption, among other dangers.

The situation of needing to determine how to proceed when not communicating with paired storage systems can arise while a storage system is running normally and then notices lost communications, while it is currently recovering from some previous fault, while it is rebooting or resuming from a temporary power loss or recovered communication outage, while it is switching operations from one set of storage system controller to another set for whatever reason, or during or after any combination of these or other kinds of events. In fact, any time a storage system that is associated with a pod can't communicate with all known non-detached members, the storage system can either wait briefly until communications can be established, go offline and continue waiting, or it can determine through some means that it is safe to detach the non-communicating storage system without risk of incurring a split brain due to the non-communicating storage system concluding the alternative view, and then continue. If a safe detach can happen quickly enough, the storage system can remain online for the pod with little more than a short delay and with no resulting application outages for applications that can issue requests to the remaining online storage systems.

One example of this situation is when a storage system may know that it is out-of-date. That can happen, for example, when a first storage system is first added to a pod that is already associated with one or more storage systems, or when a first storage system reconnects to another storage system and finds that the other storage system had already marked the first storage system as detached. In this case, this first storage system will simply wait until it connects to some other set of storage systems that are in-sync for the pod.

This model demands some degree of consideration for how storage systems are added to or removed from pods or from the in-sync pod members list. Since each storage system will have its own copy of the list, and since two independent storage systems can't update their local copy at exactly the same time, and since the local copy is all that is available on a reboot or in various fault scenarios, care must be taken to ensure that transient inconsistencies don't cause problems. For example, if one storage system is in-sync for a pod and a second storage system is added, then if the second storage system is updated to list both storage systems as in-sync first, then if there is a fault and a restart of both storage systems, the second might startup and wait to connect to the first storage system while the first might be unaware that it should or could wait for the second storage system. If the second storage system then responds to an inability to connect with the first storage system by going through a process to detach it, then it might succeed in completing a process that the first storage system is unaware of, resulting in a split brain. As such, it may be necessary to ensure that storage systems won't disagree inappropriately on whether they might opt to go through a detach process if they aren't communicating.

One way to ensure that storage systems won't disagree inappropriately on whether they might opt to go through a detach process if they aren't communicating is to ensure that when adding a new storage system to the in-sync member list for a pod, the new storage system first stores that it is a detached member (and perhaps that it is being added as an in-sync member). Then, the existing in-sync storage systems can locally store that the new storage system is an in-sync pod member before the new storage system locally stores that same fact. If there is a set of reboots or network outages prior to the new storage system storing its in-sync status, then the original storage systems may detach the new storage system due to non-communication, but the new storage system will wait. A reverse version of this change might be needed for removing a communicating storage system from a pod: first the storage system being removed stores that it is no longer in-sync, then the storage systems that will remain store that the storage system being removed is no longer in-sync, then all storage systems delete the storage system being removed from their pod membership lists. Depending on the implementation, an intermediate persisted detached state may not be necessary. Whether or not care is required in local copies of membership lists may depend on the model storage systems use for monitoring each other or for validating their membership. If a consensus model is used for both, or if an external system (or an external distributed or clustered system) is used to store and validate pod membership, then inconsistencies in locally stored membership lists may not matter.

When communications fail or one or several storage systems in a pod fail, or when a storage system starts up (or fails over to a secondary controller) and can't communicate with paired storage systems for a pod, and it is time for one or more storage systems to decide to detach one or more paired storage systems, some algorithm or mechanism must be employed to decide that it is safe to do so and to follow through on the detach. One means of resolving detaches is to use a majority (or quorum) model for membership. With three storage systems, as long as two are communicating, they can agree to detach a third storage system that isn't communicating, but that third storage system cannot by itself choose to detach either of the other two. Confusion can arise when storage system communication is inconsistent. For example, storage system A might be communicating with storage system B but not C, while storage system B might be communicating with both A and C. So, A and B could detach C, or B and C could detach A, but more communication between pod members may be needed to figure this out.

Care needs to be taken in a quorum membership model when adding and removing storage systems. For example, if a fourth storage system is added, then a "majority" of storage systems is at that point three. The transition from three storage systems (with two required for majority) to a pod including a fourth storage system (with three required for majority) may require something similar to the model described previously for carefully adding a storage system to the in-sync list. For example, the fourth storage system might start in an attaching state but not yet attached where it would never instigate a vote over quorum. Once in that state, the original three pod members could each be updated to be aware of the fourth member and the new requirement for a three storage system majority to detach a fourth. Removing a storage system from a pod might similarly move that storage system to a locally stored "detaching" state before updating other pod members. A variant scheme for this is to use a distributed consensus mechanism such as PAXOS or RAFT to implement any membership changes or to process detach requests.

Another means of managing membership transitions is to use an external system that is outside of the storage systems themselves to handle pod membership. In order to become online for a pod, a storage system must first contact the external pod membership system to verify that it is in-sync for the pod. Any storage system that is online for a pod should then remain in communication with the pod membership system and should wait or go offline if it loses communication. An external pod membership manager could be implemented as a highly available cluster using various cluster tools, such as Oracle RAC, Linux HA, VERITAS Cluster Server, IBM's HACMP, or others. An external pod membership manager could also use distributed configuration tools such as Etcd or Zookeeper, or a reliable distributed database such as Amazon's DynamoDB.

In the example depicted in FIG. 3D, the depicted storage systems (311-402, 311-404, 311-406) may receive a request to read a portion of the dataset (311-426, 311-428) and process the request to read the portion of the dataset locally according to some embodiments of the present disclosure. Readers will appreciate that although requests to modify (e.g., a write operation) the dataset (311-426, 311-428) require coordination between the storage systems (311-402, 311-404, 311-406) in a pod, as the dataset (311-426, 311-428) should be consistent across all storage systems (311-402, 311-404, 311-406) in a pod, responding to a request to read a portion of the dataset (311-426, 311-428) does not require similar coordination between the storage systems (311-402, 311-404, 311-406). As such, a particular storage system that receives a read request may service the read request locally by reading a portion of the dataset (311-426, 311-428) that is stored within the storage system's storage devices, with no synchronous communication with other storage systems in the pod. Read requests received by one storage system for a replicated dataset in a replicated cluster are expected to avoid any communication in the vast majority of cases, at least when received by a storage system that is running within a cluster that is also running nominally. Such reads should normally be processed simply by reading from the local copy of a clustered dataset with no further interaction required with other storage systems in the cluster.

Readers will appreciate that the storage systems may take steps to ensure read consistency such that a read request will return the same result regardless of which storage system processes the read request. For example, the resulting clustered dataset content for any set of updates received by any set of storage systems in the cluster should be consistent across the cluster, at least at any time updates are idle (all previous modifying operations have been indicated as complete and no new update requests have been received and processed in any way). More specifically, the instances of a clustered dataset across a set of storage systems can differ only as a result of updates that have not yet completed. This means, for example, that any two write requests which overlap in their volume block range, or any combination of a write request and an overlapping snapshot, compare-and-write, or virtual block range copy, must yield a consistent result on all copies of the dataset. Two operations should not yield a result as if they happened in one order on one storage system and a different order on another storage system in the replicated cluster.

Furthermore, read requests can be made time order consistent. For example, if one read request is received on a replicated cluster and completed and that read is then followed by another read request to an overlapping address range which is received by the replicated cluster and where one or both reads in any way overlap in time and volume address range with a modification request received by the replicated cluster (whether any of the reads or the modification are received by the same storage system or a different storage system in the replicated cluster), then if the first read reflects the result of the update then the second read should also reflect the results of that update, rather than possibly returning data that preceded the update. If the first read does not reflect the update, then the second read can either reflect the update or not. This ensures that between two read requests "time" for a data segment cannot roll backward.

In the example depicted in FIG. 3D, the depicted storage systems (311-402, 311-404, 311-406) may also detect a disruption in data communications with one or more of the other storage systems and determine whether to the particular storage system should remain in the pod. A disruption in data communications with one or more of the other storage systems may occur for a variety of reasons. For example, a disruption in data communications with one or more of the other storage systems may occur because one of the storage systems has failed, because a network interconnect has failed, or for some other reason. An important aspect of synchronous replicated clustering is ensuring that any fault handling doesn't result in unrecoverable inconsistencies, or any inconsistency in responses. For example, if a network fails between two storage systems, at most one of the storage systems can continue processing newly incoming I/O requests for a pod. And, if one storage system continues processing, the other storage system can't process any new requests to completion, including read requests.

In the example depicted in FIG. 3D, the depicted storage systems (311-402, 311-404, 311-406) may also determine whether the particular storage system should remain in the pod in response to detecting a disruption in data communications with one or more of the other storage systems. As mentioned above, to be 'online' as part of a pod, a storage system must consider itself to be in-sync for the pod and must be communicating with all other storage systems it considers to be in-sync for the pod. If a storage system can't be certain that it is in-sync and communicating with all other storage systems that are in-sync, then it may stop processing new incoming requests to access the dataset (311-426, 311-428). As such, the storage system may determine whether to the particular storage system should remain online as part of the pod, for example, by determining whether it can communicate with all other storage systems it considers to be in-sync for the pod (e.g., via one or more test messages), by determining whether the all other storage systems it considers to be in-sync for the pod also consider the storage system to be attached to the pod, through a combination of both steps where the particular storage system must confirm that it can communicate with all other storage systems it considers to be in-sync for the pod and that all other storage systems it considers to be in-sync for the pod also consider the storage system to be attached to the pod, or through some other mechanism.

In the example depicted in FIG. 3D, the depicted storage systems (311-402, 311-404, 311-406) may also keep the dataset on the particular storage system accessible for management and dataset operations in response to determining that the particular storage system should remain in the pod. The storage system may keep the dataset (311-426, 311-428) on the particular storage system accessible for management and dataset operations, for example, by accepting requests to access the version of the dataset (311-426, 311-428) that is stored on the storage system and processing such requests, by accepting and processing management operations associated with the dataset (311-426, 311-428) that are issued by a host or authorized administrator, by accepting and processing management operations associated with the dataset (311-426, 311-428) that are issued by one of the other storage systems, or in some other way.

In the example depicted in FIG. 3D, the depicted storage systems (311-402, 311-404, 311-406) may, however, make the dataset on the particular storage system inaccessible for management and dataset operations in response to determining that the particular storage system should not remain in the pod. The storage system may make the dataset (311-426, 311-428) on the particular storage system inaccessible for management and dataset operations, for example, by rejecting requests to access the version of the dataset (311-426,

311-428) that is stored on the storage system, by rejecting management operations associated with the dataset (311-426, 311-428) that are issued by a host or other authorized administrator, by rejecting management operations associated with the dataset (311-426, 311-428) that are issued by one of the other storage systems in the pod, or in some other way.

In the example depicted in FIG. 3D, the depicted storage systems (311-402, 311-404, 311-406) may also detect that the disruption in data communications with one or more of the other storage systems has been repaired and make the dataset on the particular storage system accessible for management and dataset operations. The storage system may detect that the disruption in data communications with one or more of the other storage systems has been repaired, for example, by receiving a message from the one or more of the other storage systems. In response to detecting that the disruption in data communications with one or more of the other storage systems has been repaired, the storage system may make the dataset (311-426, 311-428) on the particular storage system accessible for management and dataset operations once the previously detached storage system has been resynchronized with the storage systems that remained attached to the pod.

In the example depicted in FIG. 3D, the depicted storage systems (311-402, 311-404, 311-406) may also go offline from the pod such that the particular storage system no longer allows management and dataset operations. The depicted storage systems (311-402, 311-404, 311-406) may go offline from the pod such that the particular storage system no longer allows management and dataset operations for a variety of reasons. For example, the depicted storage systems (311-402, 311-404, 311-406) may also go offline from the pod due to some fault with the storage system itself, because an update or some other maintenance is occurring on the storage system, due to communications faults, or for many other reasons. In such an example, the depicted storage systems (311-402, 311-404, 311-406) may subsequently update the dataset on the particular storage system to include all updates to the dataset since the particular storage system went offline and go back online with the pod such that the particular storage system allows management and dataset operations, as will be described in greater detail in the resynchronization sections included below.

In the example depicted in FIG. 3D, the depicted storage systems (311-402, 311-404, 311-406) may also identifying a target storage system for asynchronously receiving the dataset, where the target storage system is not one of the plurality of storage systems across which the dataset is synchronously replicated. Such a target storage system may represent, for example, a backup storage system, as some storage system that makes use of the synchronously replicated dataset, and so on. In fact, synchronous replication can be leveraged to distribute copies of a dataset closer to some rack of servers, for better local read performance. One such case is smaller top-of-rack storage systems symmetrically replicated to larger storage systems that are centrally located in the data center or campus and where those larger storage systems are more carefully managed for reliability or are connected to external networks for asynchronous replication or backup services.

In the example depicted in FIG. 3D, the depicted storage systems (311-402, 311-404, 311-406) may also identify a portion of the dataset that is not being asynchronously replicated to the target storage system by any of the other storages systems and asynchronously replicate, to the target storage system, the portion of the dataset that is not being asynchronously replicated to the target storage system by any of the other storages systems, wherein the two or more storage systems collectively replicate the entire dataset to the target storage system. In such a way, the work associated with asynchronously replicating a particular dataset may be split amongst the members of a pod, such that each storage system in a pod is only responsible for asynchronously replicating a subset of a dataset to the target storage system.

In the example depicted in FIG. 3D, the depicted storage systems (311-402, 311-404, 311-406) may also detach from the pod, such that the particular storage system that detaches from the pod is no longer included in the set of storage systems across which the dataset is synchronously replicated. For example, if storage system (311-404) in FIG. 3D detached from the pod (311-430) illustrated in FIG. 3D, the pod (311-430) would only include storage systems (311-402, 311-406) as the storage systems across which the dataset (311-426) that is included in the pod (311-430) would be synchronously replicated across. In such an example, detaching the storage system from the pod could also include removing the dataset from the particular storage system that detached from the pod. Continuing with the example where the storage system (311-404) in FIG. 3D detached from the pod (311-430) illustrated in FIG. 3D, the dataset (311-426) that is included in the pod (311-430) could be deleted or otherwise removed from the storage system (311-404).

Readers will appreciate that there are a number of unique administrative capabilities enabled by the pod model that can further be supported. Also, the pod model itself intro-duces some issues that can be addressed by an implemen-tation. For example, when a storage system is offline for a pod, but is otherwise running, such as because an intercon-nect failed and another storage system for the pod won out in mediation, there may still be a desire or need to access the offline pod's dataset on the offline storage system. One solution may be simply to enable the pod in some detached mode and allow the dataset to be accessed. However, that solution can be dangerous and that solution can cause the pod's metadata and data to be much more difficult to reconcile when the storage systems do regain communica-tion. Furthermore, there could still be a separate path for hosts to access the offline storage system as well as the still online storage systems. In that case, a host might issue I/O to both storage systems even though they are no longer being kept in sync, because the host sees target ports reporting volumes with the same identifiers and the host I/O drivers presume it sees additional paths to the same volume. This can result in fairly damaging data corruption as reads and writes issued to both storage systems are no longer consis-tent even though the host presumes they are. As a variant of this case, in a clustered application, such as a shared storage clustered database, the clustered application running on one host might be reading or writing to one storage system and the same clustered application running on another host might be reading or writing to the "detached" storage system, yet the two instances of the clustered application are communicating between each other on the presumption that the dataset they each see is entirely consistent for completed writes. Since they aren't consistent, that presumption is violated and the application's dataset (e.g., the database) can quickly end up being corrupted.

One way to solve both of these problems is to allow for an offline pod, or perhaps a snapshot of an offline pod, to be copied to a new pod with new volumes that have sufficiently new identities that host I/O drivers and clustered applica-tions won't confuse the copied volumes as being the same as the still online volumes on another storage system. Since each pod maintains a complete copy of the dataset, which is crash consistent but perhaps slightly different from the copy of the pod dataset on another storage system, and since each pod has an independent copy of all data and metadata needed to operate on the pod content, it is a straightforward problem to make a virtual copy of some or all volumes or snapshots in the pod to new volumes in a new pod. In a logical extent graph implementation, for example, all that is needed is to define new volumes in a new pod which reference logical extent graphs from the copied pod associated with the pod's volumes or snapshots, and with the logical extent graphs being marked as copy on write. The new volumes should be treated as new volumes, similarly to how volume snapshots copied to a new volume might be implemented. Volumes may have the same administrative name, though within a new pod namespace. But, they should have different under-lying identifiers, and differing logical unit identifiers from the original volumes.

In some cases it may be possible to use virtual network isolation techniques (for example, by creating a virtual LAN in the case of IP networks or a virtual SAN in the case of fiber channel networks) in such a way that isolation of volumes presented to some interfaces can be assured to be inaccessible from host network interfaces or host SCSI initiator ports that might also see the original volumes. In such cases, it may be safe to provide the copies of volumes with the same SCSI or other storage identifiers as the original volumes. This could be used, for example, in cases where the applications expect to see a particular set of storage identifiers in order to function without an undue burden in reconfiguration.

Some of the techniques described herein could also be used outside of an active fault context to test readiness for handling faults. Readiness testing (sometimes referred to as "fire drills") is commonly required for disaster recovery configurations, where frequent and repeated testing is con-sidered a necessity to ensure that most or all aspects of a disaster recovery plan are correct and account for any recent changes to applications, datasets, or changes in equipment. Readiness testing should be non-disruptive to current pro-duction operations, including replication. In many cases the real operations can't actually be invoked on the active configuration, but a good way to get close is to use storage operations to make copies of production datasets, and then perhaps couple that with the use of virtual networking, to create an isolated environment containing all data that is believed necessary for the important applications that must be brought up successfully in cases of disasters. Making such a copy of a synchronously replicated (or even an asynchronously replicated) dataset available within a site (or collection of sites) that is expected to perform a disaster recovery readiness test procedure and then starting the important applications on that dataset to ensure that it can startup and function is a great tool, since it helps ensure that no important parts of the application datasets were left out in the disaster recovery plan. If necessary, and practical, this could be coupled with virtual isolated networks coupled perhaps with isolated collection of physical or virtual machines, to get as close as possible to a real world disaster recovery takeover scenario. Virtually copying a pod (or set of pods) to another pod as a point-in-time image of the pod datasets immediately creates an isolated dataset that contains all the copied elements and that can then be operated on essentially identically to the originally pods, as well as allowing isolation to a single site (or a few sites) separately from the original pod. Further, these are fast operations and they can be torn down and repeated easily allowing testing to be repeated as often as is desired.

Some enhancements could be made to get further toward perfect disaster recovery testing. For example, in conjunction with isolated networks, SCSI logical unit identities or other types of identities could be copied into the target pod so that the test servers, virtual machines, and applications see the same identities. Further, the administrative environment of the servers could be configured to respond to requests from a particular virtual set of virtual networks to respond to requests and operations on the original pod name so scripts don't require use of test-variants with alternate "test" versions of object names. A further enhancement can be used in cases where the host-side server infrastructure that will take over in the case of a disaster takeover can be used during a test. This includes cases where a disaster recovery data center is completely stocked with alternative server infrastructure that won't generally be used until directed to do so by a disaster. It also includes cases where that infrastructure might be used for non-critical operations (for example, running analytics on production data, or simply supporting application development or other functions which may be important but can be halted if needed for more critical functions). Specifically, host definitions and configurations and the server infrastructure that will use them can be set up as they will be for an actual disaster recovery takeover event and tested as part of disaster recovery takeover testing, with the tested volumes being connected to these host definitions from the virtual pod copy used to provide a snapshot of the dataset. From the standpoint of the storage systems involved, then, these host definitions and configurations used for testing, and the volume-to-host connection configurations used during testing, can be reused when an actual disaster takeover event is triggered, greatly minimizing the configuration differences between the test configuration and the real configuration that will be used in case of a disaster recovery takeover.

In some cases it may make sense to move volumes out of a first pod and into a new second pod including just those volumes. The pod membership and high availability and recovery characteristics can then be adjusted separately, and administration of the two resulting pod datasets can then be isolated from each other. An operation that can be done in one direction should also be possible in the other direction. At some point, it may make sense to take two pods and merge them into one so that the volumes in each of the original two pods will now track each other for storage system membership and high availability and recovery characteristics and events. Both operations can be accomplished safely and with reasonably minimal or no disruption to running applications by relying on the characteristics suggested for changing mediation or quorum properties for a pod which were discussed in an earlier section. With mediation, for example, a mediator for a pod can be changed using a sequence consisting of a step where each storage system in a pod is changed to depend on both a first mediator and a second mediator and each is then changed to depend only on the second mediator. If a fault occurs in the middle of the sequence, some storage systems may depend on both the first mediator and the second mediator, but in no case will recovery and fault handling result in some storage systems depending only on the first mediator and other storage systems only depending on the second mediator. Quorum can be handled similarly by temporarily depending on winning against both a first quorum model and a second quorum model in order to proceed to recovery. This may result in a very short time period where availability of the pod in the face of faults depend on additional resources, thus reducing potential availability, but this time period is very short and the reduction in availability is often very little. With mediation, if the change in mediator parameters is nothing more than the change in the key used for mediation and the mediation service used is the same, then the potential reduction in availability is even less, since it now depends only on two calls to the same service versus one call to that service, and rather than separate calls to two separate services.

Readers will note that changing the quorum model may be quite complex. An additional step may be necessary where storage systems will participate in the second quorum model but won't depend on winning in that second quorum model, which is then followed by the step of also depending on the second quorum model. This may be necessary to account for the fact that if only one system has processed the change to depend on the quorum model, then it will never win quorum since there will never be a majority. With this model in place for changing the high availability parameters (mediation relationship, quorum model, takeover preferences), we can create a safe procedure for these operations to split a pod into two or to join two pods into one. This may require adding one other capability: linking a second pod to a first pod for high availability such that if two pods include compatible high availability parameters the second pod linked to the first pod can depend on the first pod for determining and instigating detach-related processing and operations, offline and in-sync states, and recovery and resynchronization actions.

To split a pod into two, which is an operation to move some volumes into a newly created pod, a distributed operation may be formed that can be described as: form a second pod into which we will move a set of volumes which were previously in a first pod, copy the high availability parameters from the first pod into the second pod to ensure they are compatible for linking, and link the second pod to the first pod for high availability. This operation may be encoded as messages and should be implemented by each storage system in the pod in such a way that the storage system ensures that the operation happens completely on that storage system or does not happen at all if processing is interrupted by a fault. Once all in-sync storage systems for the two pods have processed this operation, the storage systems can then process a subsequent operation which changes the second pod so that it is no longer linked to the first pod. As with other changes to high availability characteristics for a pod, this involves first having each in-sync storage system change to rely on both the previous model (that model being that high availability is linked to the first pod) and the new model (that model being its own now independent high availability). In the case of mediation or quorum, this means that storage systems which processed this change will first depend on mediation or quorum being achieved as appropriate for the first pod and will additionally depend on a new separate mediation (for example, a new mediation key) or quorum being achieved for the second pod before the second pod can proceed following a fault that required mediation or testing for quorum. As with the previous description of changing quorum models, an intermediate step may set storage systems to participate in quorum for the second pod before the step where storage systems participate in and depend on quorum for the second pod. Once all in-sync storage systems have processed the change to depend on the new parameters for mediation or quorum for both the first pod and the second pod, the split is complete.

Joining a second pod into a first pod operates essentially in reverse. First, the second pod must be adjusted to be compatible with the first pod, by having an identical list of storage systems and by having a compatible high availability model. This may involve some set of steps such as those described elsewhere in this paper to add or remove storage systems or to change mediator and quorum models. Depending on implementation, it may be necessary only to reach an identical list of storage systems. Joining proceeds by processing an operation on each in-sync storage system to link the second pod to the first pod for high availability. Each storage system which processes that operation will then depend on the first pod for high availability and then the second pod for high availability. Once all in-sync storage systems for the second pod have processed that operation, the storage systems will then each process a subsequent operation to eliminate the link between the second pod and the first pod, migrate the volumes from the second pod into the first pod, and delete the second pod. Host or application dataset access can be preserved throughout these operations, as long as the implementation allows proper direction of host or application dataset modification or read operations to the volume by identity and as long as the identity is preserved as appropriate to the storage protocol or storage model (for example, as long as logical unit identifiers for volumes and use of target ports for accessing volumes are preserved in the case of SCSI).

Migrating a volume between pods may present issues. If the pods have an identical set of in-sync membership storage systems, then it may be straightforward: temporarily suspend operations on the volumes being migrated, switch control over operations on those volumes to controlling software and structures for the new pod, and then resume operations. This allows for a seamless migration with continuous uptime for applications apart from the very brief operation suspension, provided network and ports migrate properly between pods. Depending on the implementation, suspending operations may not even be necessary, or may be so internal to the system that the suspension of operations has no impact. Copying volumes between pods with different in-sync membership sets is more of a problem. If the target pod for the copy has a subset of in-sync members from the source pod, this isn't much of a problem: a member storage system can be dropped safely enough without having to do more work. But, if the target pod adds in-sync member storage systems to the volume over the source pod, then the added storage systems must be synchronized to include the volume's content before they can be used. Until synchronized, this leaves the copied volumes distinctly different from the already synchronized volumes, in that fault handling differs and request handling from the not yet synced member storage systems either won't work or must be forwarded or won't be as fast because reads will have to traverse an interconnect. Also, the internal implementation will have to handle some volumes being in sync and ready for fault handling and others not being in sync.

There are other problems relating to reliability of the operation in the face of faults. Coordinating a migration of volumes between multi-storage-system pods is a distributed operation. If pods are the unit of fault handling and recovery, and if mediation or quorum or whatever means are used to avoid split-brain situations, then a switch in volumes from one pod with a particular set of state and configurations and relationships for fault handling, recovery, mediation and quorum to another then storage systems in a pod have to be careful about coordinating changes related to that handling for any volumes. Operations can't be atomically distributed between storage systems, but must be staged in some way. Mediation and quorum models essentially provide pods with the tools for implementing distributed transactional atomicity, but this may not extend to inter-pod operations without adding to the implementation.

Consider even a simple migration of a volume from a first pod to a second pod even for two pods that share the same first and second storage systems. At some point the storage systems will coordinate to define that the volume is now in the second pod and is no longer in the first pod. If there is no inherent mechanism for transactional atomicity across the storage systems for the two pods, then a naive implementation could leave the volume in the first pod on the first storage system and the second pod on the second storage system at the time of a network fault that results in fault handling to detach storage systems from the two pods. If pods separately determine which storage system succeeds in detaching the other, then the result could be that the same storage system detaches the other storage system for both pods, in which case the result of the volume migration recovery should be consistent, or it could result in a different storage system detaching the other for the two pods. If the first storage system detaches the second storage system for the first pod and the second storage system detaches the first storage system for the second pod, then recovery might result in the volume being recovered to the first pod on the first storage system and into the second pod on the second storage system, with the volume then running and exported to hosts and storage applications on both storage systems. If instead the second storage system detaches the first storage system for the first pod and first storage detaches the second storage system for the second pod, then recovery might result in the volume being discarded from the second pod by the first storage system and the volume being discarded from the first pod by the second storage system, resulting in the volume disappearing entirely. If the pods a volume is being migrated between are on differing sets of storage systems, then things can get even more complicated.

A solution to these problems may be to use an intermediate pod along with the techniques described previously for splitting and joining pods. This intermediate pod may never be presented as visible managed objects associated with the storage systems. In this model, volumes to be moved from a first pod to a second pod are first split from the first pod into a new intermediate pod using the split operation described previously. The storage system members for the intermediate pod can then be adjusted to match the membership of storage systems by adding or removing storage systems from the pod as necessary. Subsequently, the intermediate pod can be joined with the second pod.

Figure 3E:
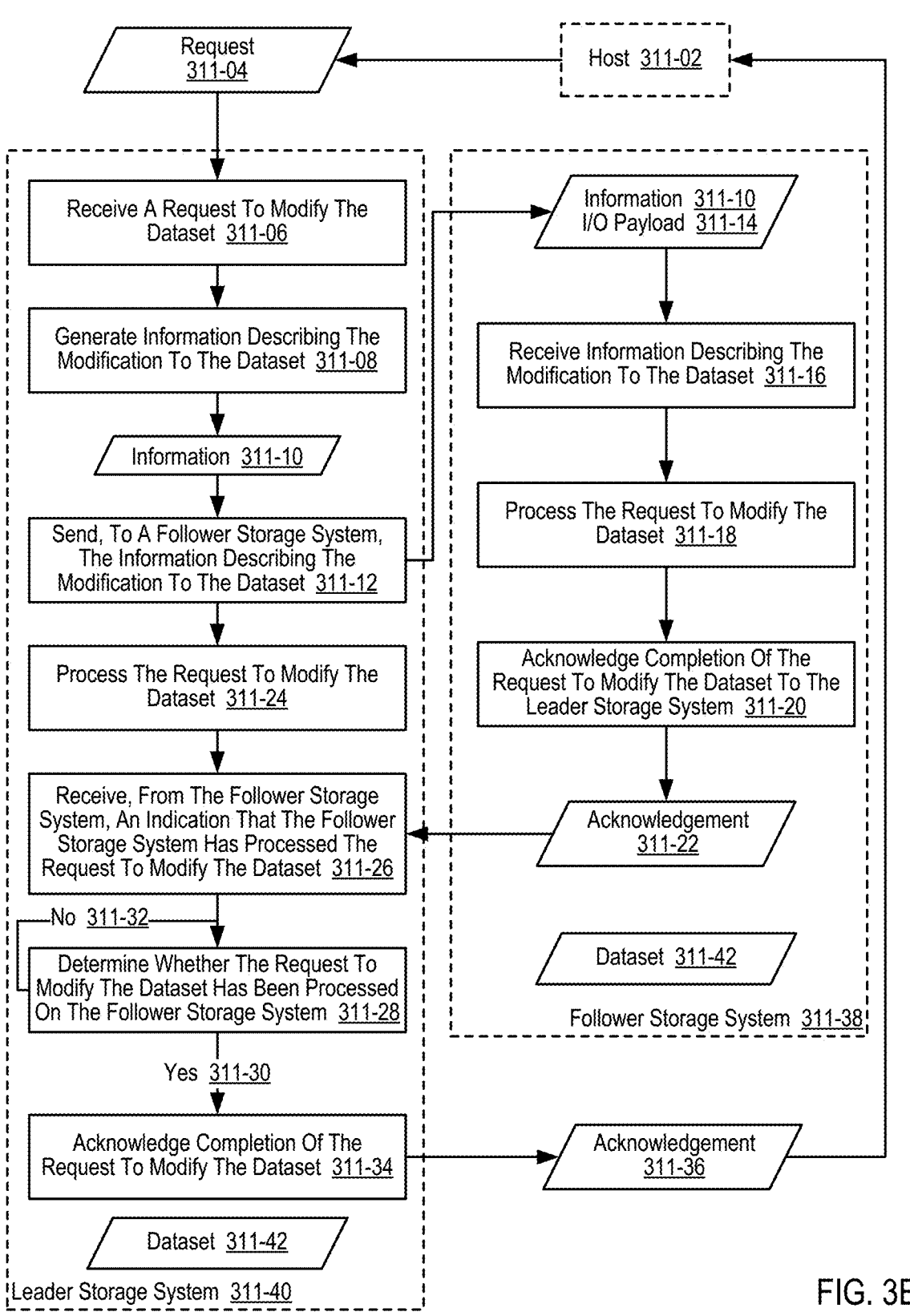
FIG. 3E sets forth a flow chart illustrating an example method for servicing I/O operations directed to a dataset that is synchronized across a plurality of storage systems according to some embodiments of the present disclosure.

For further explanation, FIG. 3E sets forth a flow chart illustrating an example method for servicing I/O operations directed to a dataset (311-42) that is synchronized across a plurality of storage systems (311-38, 311-40) according to some embodiments of the present disclosure. Although depicted in less detail, the storage systems (311-38, 311-40) depicted in FIG. 3E may be similar to the storage systems described above with reference to FIGS. 1A-1D, FIGS. 2A-2G, FIGS. 3A-3B, or any combination thereof. In fact, the storage system depicted in FIG. 3E may include the same, fewer, additional components as the storage systems described above.

The dataset (311-42) depicted in FIG. 3E may be embodied, for example, as the contents of a particular volume, as the contents of a particular shared of a volume, or as any other collection of one or more data elements. The dataset (311-42) may be synchronized across a plurality of storage systems (311-38, 311-40) such that each storage system (311-38, 311-40) retains a local copy of the dataset (311-42). In the examples described herein, such a dataset (311-42) is synchronously replicated across the storage systems (311-38, 311-40) in such a way that the dataset (311-42) can be accessed through any of the storage systems (311-38, 311-40) with performance characteristics such that any one storage system in the cluster doesn't operate substantially more optimally any other storage system in the cluster, at least as long as the cluster and the particular storage system being accessed are running nominally. In such systems, modifications to the dataset (311-42) should be made to the copy of the dataset that resides on each storage system (311-38, 311-40) in such a way that accessing the dataset (311-42) on any storage system (311-38, 311-40) will yield consistent results. For example, a write request issued to the dataset must be serviced on all storage systems (311-38, 311-40) or on none of the storage systems (311-38, 311-40) that were running nominally at the beginning of the write and that remained running nominally through completion of the write. Likewise, some groups of operations (e.g., two write operations that are directed to same location within the dataset) must be executed in the same order, or other steps must be taken as described in greater detail below, on all storage systems (311-38, 311-40) such that the dataset is ultimately identical on all storage systems (311-38, 311-40). Modifications to the dataset (311-42) need not be made at the exact same time, but some actions (e.g., issuing an acknowledgement that a write request directed to the dataset, enabling read access to a location within the dataset that is targeted by a write request that has not yet been completed on both storage systems) may be delayed until the copy of the dataset on each storage system (311-38, 311-40) has been modified.

In the example method depicted in FIG. 3E, the designation of one storage system (311-40) as the 'leader' and another storage system (311-38) as the 'follower' may refer to the respective relationships of each storage system for the purposes of synchronously replicating a particular dataset across the storage systems. In such an example, and as will be described in greater detail below, the leader storage system (311-40) may be responsible for performing some processing of an incoming I/O operation and passing such information along to the follower storage system (311-38) or performing other tasks that are not required of the follower storage system (311-40). The leader storage system (311-40) may be responsible for performing tasks that are not required of the follower storage system (311-38) for all incoming I/O operations or, alternatively, the leader-follower relationship may be specific to only a subset of the I/O operations that are received by either storage system. For example, the leader-follower relationship may be specific to I/O operations that are directed towards a first volume, a first group of volumes, a first group of logical addresses, a first group of physical addresses, or some other logical or physical delineator. In such a way, a first storage system may serve as the leader storage system for I/O operations directed to a first set of volumes (or other delineator) while a second storage system may serve as the leader storage system for I/O operations directed to a second set of volumes (or other delineator). The example method depicted in FIG. 3E depicts an embodiment where synchronizing a plurality of storage systems (311-38, 311-40) occurs in response to the receipt of a request (311-04) to modify a dataset (311-42) by the leader storage system (311-40), although synchronizing a plurality of storage systems (311-38, 311-40) may also be carried out in response to the receipt of a request (311-04) to modify a dataset (311-42) by the follower storage system (311-38), as will be described in greater detail below.

The example method depicted in FIG. 3E includes receiving (311-06), by a leader storage system (311-40), a request (311-04) to modify the dataset (311-42). The request (311-04) to modify the dataset (311-42) may be embodied, for example, as a request to write data to a location within the storage system (311-40) that contains data that is included in the dataset (311-42), as a request to write data to a volume that contains data that is included in the dataset (311-42), as a request to take a snapshot of the dataset (311-42), as a virtual range copy, as an UNMAP operation that essentially represents a deletion of some portion of the data in the dataset (311-42), as a modifying transformations of the dataset (311-42) (rather than a change to a portion of data within the dataset), or as some other operation that results in a change to some portion of the data that is included in the dataset (311-42). In the example method depicted in FIG. 3E, the request (311-04) to modify the dataset (311-42) is issued by a host (311-02) that may be embodied, for example, as an application that is executing on a virtual machine, as an application that is executing on a computing device that is connected to the storage system (311-40), or as some other entity configured to access the storage system (311-40).

The example method depicted in FIG. 3E also includes generating (311-08), by the leader storage system (311-40), information (311-10) describing the modification to the dataset (311-42). The leader storage system (311-40) may generate (311-08) the information (311-10) describing the modification to the dataset (311-42), for example, by determining ordering versus any other operations that are in progress, by determining the proper outcome of overlapping modifications (e.g., the appropriate outcome of two requests to modify the same storage location), calculating any distributed state changes such as to common elements of metadata across all members of the pod (e.g., all storage systems across which the dataset is synchronously replicated), and so on. The information (311-10) describing the modification to the dataset (311-42) may be embodied, for example, as system-level information that is used to describe an I/O operation that is to be performed by a storage system. The leader storage system (311-40) may generate (311-08) the information (311-10) describing the modification to the dataset (311-42) by processing the request (311-04) to modify the dataset (311-42) just enough to figure out what should happen in order to service the request (311-04) to modify the dataset (311-42). For example, the leader storage system (311-40) may determine whether some ordering of the execution of the request (311-04) to modify the dataset (311-42) relative to other requests to modify the dataset (311-42) is required, or some other steps must be taken as described in greater detail below, to produce an equivalent result on each storage system (311-38, 311-40).

Consider an example in which the request (311-04) to modify the dataset (311-42) is embodied as a request to copy blocks from a first address range in the dataset (311-42) to a second address range in the dataset (311-42). In such an example, assume that three other write operations (write A, write B, write C) are directed to the first address range in the dataset (311-42). In such an example, if the leader storage system (311-40) services write A and write B (but does not service write C) prior to copying the blocks from the first address range in the dataset (311-42) to the second address range in the dataset (311-42), the follower storage system (311-38) must also service write A and write B (but does not service write C) prior to copying the blocks from the first address range in the dataset (311-42) to the second address range in the dataset (311-42) in order to yield consistent results. As such, when the leader storage system (311-40) generates (311-08) the information (311-10) describing the modification to the dataset (311-42), in this example, the leader storage system (311-40) could generate information (e.g., sequence numbers for write A and write B) that identifies other operations that must be completed before the follower storage system (311-38) can process the request (311-04) to modify the dataset (311-42).

Consider an additional example in which two requests (e.g., Write A and Write B) are directed to overlapping portions of the dataset (311-42). In such an example, if the leader storage system (311-40) services write A and subsequently services write B, while the follower storage system (311-38) services write B and subsequently services write A, the dataset (311-42) would not be consistent across both storage systems (311-38, 311-40). As such, when the leader storage system (311-40) generates (311-08) the information (311-10) describing the modification to the dataset (311-42), in this example, the leader storage system (311-40) could generate information (e.g., sequence numbers for write A and write B) that identifies the order in which the requests should be executed. Alternatively, rather than generating information (311-10) describing the modification to the dataset (311-42) which requires intermediate behavior from each storage system (311-38, 311-40), the leader storage system (311-40) may generate (311-08) information (311-10) describing the modification to the dataset (311-42) that includes information that identifies the proper outcome of the two requests. For example, if write B logically follows write A (and overlaps with write A), the end result must be that the dataset (311-42) includes the parts of write B that overlap with write A, rather than including the parts of write A that overlap with write B. Such an outcome could be facilitated by merging a result in memory and writing the result of such a merge to the dataset (311-42), rather than strictly requiring that a particular storage system (311-38, 311-40) execute write A and then subsequently execute write B. Readers will appreciate that more subtle cases relate to snapshots and virtual address range copies.

Readers will further appreciate that correct results for any operation must be committed to the point of being recoverable before the operation can be acknowledged. But, multiple operations can be committed together, or operations can be partially committed if recovery would ensure correctness. For example, a snapshot could locally commit with a recorded dependency on an expected write of A and B, but A or B might not have themselves committed. The snapshot cannot be acknowledged, and recovery might end up backing out the snapshot if the missing I/O cannot be recovered from another array. Also, if write B overlaps with write A, then the leader may "order" B to be after A, but A could actually be discarded and the operation to write A would then simply wait for B. Writes A, B, C, and D, coupled with a snapshot between A,B and C,D could commit and/or acknowledge some or all parts together as long as recovery cannot result in a snapshot inconsistency across arrays and as long as acknowledgement does not complete a later operation before an earlier operation has been persisted to the point that it is guaranteed to be recoverable.

The example method depicted in FIG. 3E also includes sending (311-12), from the leader storage system (311-40) to a follower storage system (311-38), information (311-10) describing the modification to the dataset (311-42). Sending (311-12) information (311-10) describing the modification to the dataset (311-42) from the leader storage system (311-40) to a follower storage system (311-38) may be carried out, for example, by the leader storage system (311-40) sending one or more messages to the follower storage system (311-38). The leader storage system (311-40) may also send, in the same messages or in one or more different messages, I/O payload (311-14) for the request (311-04) to modify the dataset (311-42). The I/O payload (311-14) may be embodied, for example, as data that is to be written to storage within the follower storage system (311-38) when the request (311-04) to modify the dataset (311-42) is embodied as a request to write data to the dataset (311-42). In such an example, because the request (311-04) to modify the dataset (311-42) was received (311-06) by the leader storage system (311-40), the follower storage system (311-38) has not received the I/O payload (311-14) associated with the request (311-04) to modify the dataset (311-42). In the example method depicted in FIG. 3E, the information (311-10) describing the modification to the dataset (311-42) and the I/O payload (311-14) that is associated with the request (311-04) to modify the dataset (311-42) may be sent (311-12) from the leader storage system (311-40) to the follower storage system (311-38) via one or more data communications networks that couple the leader storage system (311-40) to the follower storage system (311-38), via one or more dedicated data communications links (e.g., a first link for sending I/O payload and a second link for sending information describing modifications to datasets) that couples the leader storage system (311-40) to the follower storage system (311-38), or via some other mechanism.

The example method depicted in FIG. 3E also includes receiving (311-16), by the follower storage system (311-38), the information (311-10) describing the modification to the dataset (311-42). The follower storage system (311-38) may receive (311-16) the information (311-10) describing the modification to the dataset (311-42) and I/O payload (311-14) from the leader storage system (311-40), for example, via one or more messages that are sent from the leader storage system (311-40) to the follower storage system (311-38). The one or more messages may be sent from the leader storage system (311-40) to the follower storage system (311-38) via one or more dedicated data communications links between the two storage systems (311-38, 311-40), by the leader storage system (311-40) writing a message to a predetermined memory location (e.g., the location of a queue) on the follower storage system (311-38) using RDMA or a similar mechanism, or in other ways.

In one embodiment, the follower storage system (311-38) may receive (311-16) the information (311-10) describing the modification to the dataset (311-42) and I/O payload (311-14) from the leader storage system (311-40) through the use of the use of SCSI requests (writes from sender to receiver, or reads from receiver to sender) as a communication mechanism. In such an embodiment, a SCSI Write request is used to encode information that is intended to be sent (which includes whatever data and metadata), and which may be delivered to a special pseudo-device or over a specially configured SCSI network, or through any other agreed upon addressing mechanism. Or, alternately, the model can issue a set of open SCSI read requests from a receiver to a sender, also using special devices, specially configured SCSI networks, or other agreed upon mechanisms. Encoded information including data and metadata will be delivered to the receiver as a response to one or more of these open SCSI requests. Such a model can be implemented over Fibre Channel SCSI networks, which are often deployed as the "dark fibre" storage network infrastructure between data centers. Such a model also allows the use of the same network lines for host-to-remote-array multipathing and bulk array-to-array communications.

The example method depicted in FIG. 3E also includes processing (311-18), by the follower storage system (311-38), the request (311-04) to modify the dataset (311-42). In the example method depicted in FIG. 3E, the follower storage system (311-38) may process (311-18) the request (311-04) to modify the dataset (311-42) by modifying the contents of one or more storage devices (e.g., an NVRAM device, an SSD, an HDD) that are included in the follower storage system (311-38) in dependence upon the information (311-10) describing the modification to the dataset (311-42) as well as the I/O payload (311-14) that was received from the leader storage system (311-40). Consider an example in which the request (311-04) to modify the dataset (311-42) is embodied as a write operation that is directed to a volume that is included in the dataset (311-42) and the information (311-10) describing the modification to the dataset (311-42) indicates that the write operation can only be executed after a previously issued write operation has been processed. In such an example, processing (311-18) the request (311-04) to modify the dataset (311-42) may be carried out by the follower storage system (311-38) first verifying that the previously issued write operation has been processed on the follower storage system (311-38) and subsequently writing I/O payload (311-14) associated with the write operation to one or more storage devices that are included in the follower storage system (311-38). In such an example, the request (311-04) to modify the dataset (311-42) may be considered to have been completed and successfully processed, for example, when the I/O payload (311-14) has been committed to persistent storage within the follower storage system (311-38).

The example method depicted in FIG. 3E also includes acknowledging (311-20), by the follower storage system (311-38) to the leader storage system (311-40), completion of the request (311-04) to modify the dataset (311-42). In the example method depicted in FIG. 3E, acknowledging (311-20), by the follower storage system (311-38) to the leader storage system (311-40), completion of the request (311-04) to modify the dataset (311-42) may be carried out by the follower storage system (311-38) sending an acknowledgment (311-22) message to the leader storage system (311-40). Such messages may include, for example, information identifying the particular request (311-04) to modify the dataset (311-42) that was completed as well as any additional information useful in acknowledging (311-20) the completion of the request (311-04) to modify the dataset (311-42) by the follower storage system (311-38). In the example method depicted in FIG. 3E, acknowledging (311-20) completion of the request (311-04) to modify the dataset (311-42) to the leader storage system (311-40) is illustrated by the follower storage system (311-38) issuing an acknowledgment (311-22) message to the leader storage system (311-38).

The example method depicted in FIG. 3E also includes processing (311-24), by the leader storage system (311-40), the request (311-04) to modify the dataset (311-42). In the example method depicted in FIG. 3E, the leader storage system (311-40) may process (311-24) the request (311-04) to modify the dataset (311-42) by modifying the contents of one or more storage devices (e.g., an NVRAM device, an SSD, an HDD) that are included in the leader storage system (311-40) in dependence upon the information (311-10) describing the modification to the dataset (311-42) as well as the I/O payload (311-14) that was received as part of the request (311-04) to modify the dataset (311-42). Consider an example in which the request (311-04) to modify the dataset (311-42) is embodied as a write operation that is directed to a volume that is included in the dataset (311-42) and the information (311-10) describing the modification to the dataset (311-42) indicates that the write operation can only be executed after a previously issued write operation has been processed. In such an example, processing (311-24) the request (311-04) to modify the dataset (311-42) may be carried out by the leader storage system (311-40) first verifying that the previously issued write operation has been processed by the leader storage system (311-40) and subsequently writing I/O payload (311-14) associated with the write operation to one or more storage devices that are included in the leader storage system (311-40). In such an example, the request (311-04) to modify the dataset (311-42) may be considered to have been completed and successfully processed, for example, when the I/O payload (311-14) has been committed to persistent storage within the leader storage system (311-40).

The example method depicted in FIG. 3E also includes receiving (311-26), from the follower storage system (311-38), an indication that the follower storage system (311-38) has processed the request (311-04) to modify the dataset (311-42). In this example, the indication that the follower storage system (311-38) has processed the request (311-04) to modify the dataset (311-42) is embodied as an acknowledgement (311-22) message sent from the follower storage system (311-38) to the leader storage system (311-40). Readers will appreciate that although many of the steps described above are depicted and described as occurring in a particular order, no particular order is actually required. In fact, because the follower storage system (311-38) and the leader storage system (311-40) are independent storage systems, each storage system may be performing some of the steps described above in parallel. For example, the follower storage system (311-38) may receive (311-16) the information (311-10) describing the modification to the dataset (311-42), process (311-18) the request (311-04) to modify the dataset (311-42), or acknowledge (311-20) completion of the request (311-04) to modify the dataset (311-42) before the leader storage system (311-40) has processed (311-24) the request (311-04) to modify the dataset (311-42). Alternatively, the leader storage system (311-40) may have processed (311-24) the request (311-04) to modify the dataset (311-42) before the follower storage system (311-38) has received (311-16) the information (311-10) describing the modification to the dataset (311-42), processed (311-18) the request (311-04) to modify the dataset (311-42), or acknowledged (311-20) completion of the request (311-04) to modify the dataset (311-42).

The example method depicted in FIG. 3E also includes acknowledging (311-34), by the leader storage system (311-40), completion of the request (311-04) to modify the dataset (311-42). In the example method depicted in FIG. 3E, acknowledging (311-34) completion of the request (311-04) to modify the dataset (311-42) may be carried out through the use of one or more acknowledgement (311-36) messages that are sent from the leader storage system (311-40) to the host (311-02) or via some other appropriate mechanism. In the example method depicted in FIG. 3E, the leader storage system (311-40) may determine (311-28) whether the request (311-04) to modify the dataset (311-42) has been processed (311-18) by the follower storage system (311-38) prior to acknowledging (311-34) completion of the request (311-04) to modify the dataset (311-42). The leader storage system (311-40) may determine (311-28) whether the request (311-04) to modify the dataset (311-42) has been processed (311-18) by the follower storage system (311-38), for example, by determining whether the leader storage system (311-40) has received an acknowledgment message or other message from the follower storage system (311-38) indicating that the request (311-04) to modify the dataset (311-42) has been processed (311-18) by the follower storage system (311-38). In such an example, if the leader storage system (311-40) affirmatively (311-30) determines that the request (311-04) to modify the dataset (311-42) has been processed (311-18) by the follower storage system (311-38) and also processed (311-24) by the leader storage system (311-38), the leader storage system (311-40) may proceed by acknowledging (311-34) completion of the request (311-04) to modify the dataset (311-42) to the host (311-02) that initiated the request (311-04) to modify the dataset (311-42). If the leader storage system (311-40) determines that the request (311-04) to modify the dataset (311-42) has not (311-32) been processed (311-18) by the follower storage system (311-38) or has not been processed (311-24) by the leader storage system (311-38), however, the leader storage system (311-40) may not yet acknowledge (311-34) completion of the request (311-04) to modify the dataset (311-42) to the host (311-02) that initiated the request (311-04) to modify the dataset (311-42), as the leader storage system (311-40) may only acknowledge (311-34) completion of the request (311-04) to modify the dataset (311-42) to the host (311-02) that initiated the request (311-04) to modify the dataset (311-42) when the request (311-04) to modify the dataset (311-42) has been success-fully processed on all storage systems (311-38, 311-40) across which a dataset (311-42) is synchronously replicated.

Readers will appreciate that in the example method depicted in FIG. 3E, sending (311-12), from the leader storage system (311-40) to a follower storage system (311-38), information (311-10) describing the modification to the dataset (311-42) and acknowledging (311-20), by the follower storage system (311-38) to the leader storage system (311-40), completion of the request (311-04) to modify the dataset (311-42) can be carried out using single roundtrip messaging. Single roundtrip messaging may be used, for example, through the use of Fibre Channel as a data inter-connect. Typically, SCSI protocols are used with Fibre Channel. Such interconnects are commonly provisioned between data centers because some older replication tech-nologies may be built to essentially replicate data as SCSI transactions over Fibre Channel networks. Also, historically Fibre Channel SCSI infrastructure had less overhead and lower latencies than networks based on Ethernet and TCP/IP. Further, when data centers are internally connected to block storage arrays using Fibre Channel, the Fibre Channel networks may be stretched to other data centers so that hosts in one data center can switch to accessing storage arrays in a remote data center when local storage arrays fail.

SCSI could be used as a general communication mecha-nism, even though it is normally designed for use with block storage protocols for storing and retrieving data in block-oriented volumes (or for tape). For example, SCSI READ or SCSI WRITE could be used to deliver or retrieve message data between storage controllers in paired storage systems. A typical implementation of SCSI WRITE requires two message round trips: a SCSI initiator sends a SCSI CDB describing the SCSI WRITE operation, a SCSI target receives that CDB and the SCSI target sends a "Ready to Receive" message to the SCSI initiator. The SCSI initiator then sends data to the SCSI target and when SCSI WRITE is complete the SCSI target responds to the SCSI initiator with a Success completion. A SCSI READ request, on the other hand, requires only one round trip: the SCSI initiator sends a SCSI CDB describing the SCSI READ operation, a SCSI target receives that CDB and responds with data and then a Success completion. As a result, over distance, a SCSI READ incurs half of the distance-related latency as a SCSI WRITE. Because of this, it may be faster for a data com-munications receiver to use SCSI READ requests to receive messages than for a sender of messages to use SCSI WRITE requests to send data. Using SCSI READ simply requires a message sender to operate as a SCSI target, and for a message receiver to operate as a SCSI initiator. A message receiver may send some number of SCSI CDB READ requests to any message sender, and the message sender would respond to one of the outstanding CDB READ requests when message data is available. Since SCSI sub-systems may timeout if a READ request is outstanding for too long (e.g., 10 seconds), READ requests should be responded to within a few seconds even if there is no message data to be sent.

SCSI tape requests, as described in the SCSI Stream Commands standard from the T10 Technical Committee of the InterNational Committee on Information Technology Standards, support variable response data, which can be more flexible for returning variable-sized message data. The SCSI standard also supports an Immediate mode for SCSI WRITE requests, which could allow single-round-trip SCSI WRITE commands. Readers will appreciate that many of the embodiments described below also utilize single roundtrip messaging.

Figure 4:
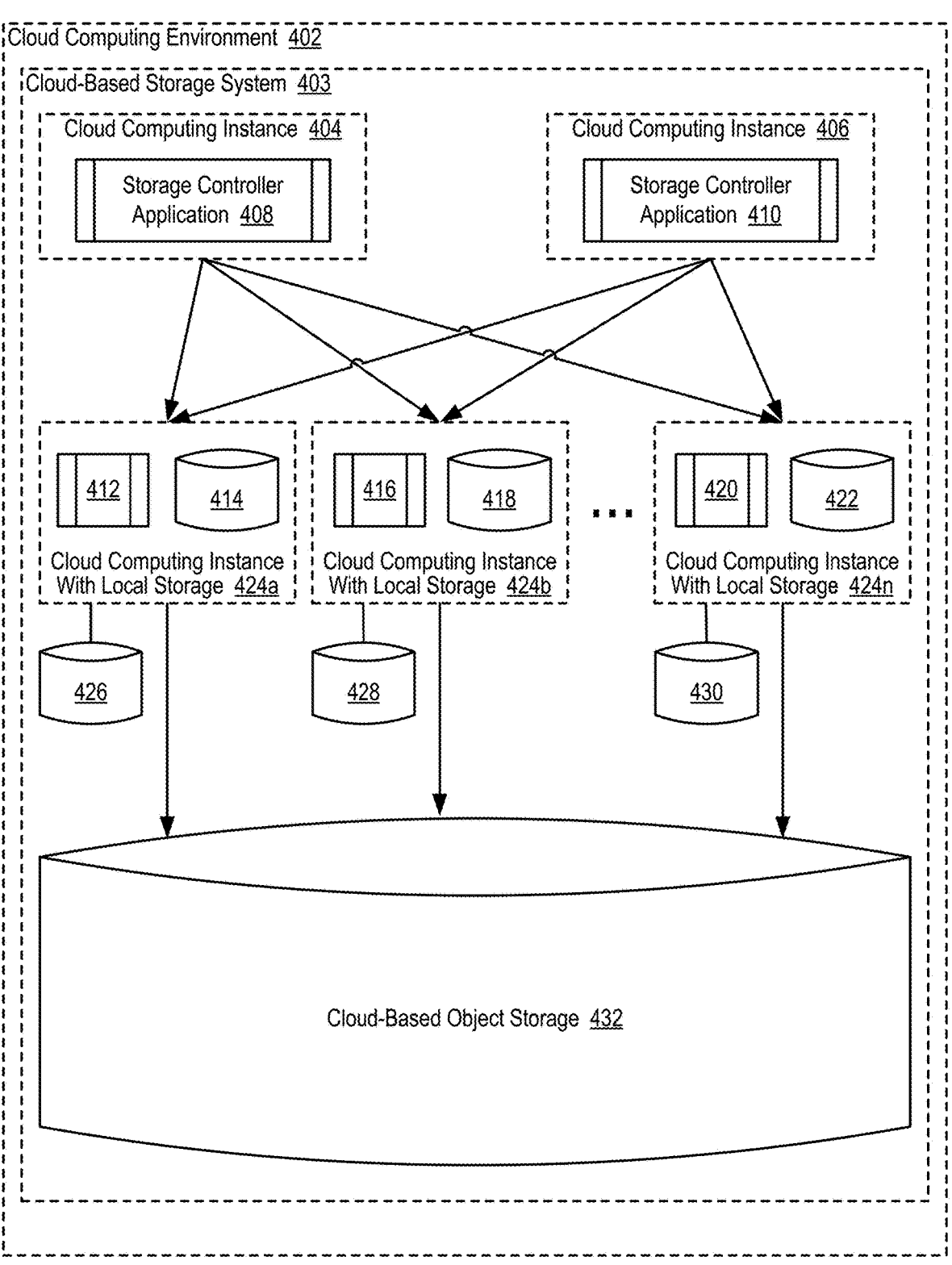
FIG. 4 sets forth an example of a cloud-based storage system in accordance with some embodiments of the present disclosure.

For further explanation, FIG. 4 sets forth an example of a cloud-based storage system (403) in accordance with some embodiments of the present disclosure. In the example depicted in FIG. 4, the cloud-based storage system (403) is created entirely in a cloud computing environment (402) such as, for example, Amazon Web Services ('AWS'), Microsoft Azure, Google Cloud Platform, IBM Cloud, Oracle Cloud, and others. The cloud-based storage system (403) may be used to provide services similar to the services that may be provided by the storage systems described above. For example, the cloud-based storage system (403) may be used to provide block storage services to users of the cloud-based storage system (403), the cloud-based storage system (403) may be used to provide storage services to users of the cloud-based storage system (403) through the use of solid-state storage, and so on.

The cloud-based storage system (403) depicted in FIG. 4 includes two cloud computing instances (404, 406) that each are used to support the execution of a storage controller application (408, 410). The cloud computing instances (404, 406) may be embodied, for example, as instances of cloud computing resources (e.g., virtual machines) that may be provided by the cloud computing environment (402) to support the execution of software applications such as the storage controller application (408, 410). In one embodi-ment, the cloud computing instances (404, 406) may be embodied as Amazon Elastic Compute Cloud ('EC2') instances. In such an example, an Amazon Machine Image ('AMI') that includes the storage controller application (408, 410) may be booted to create and configure a virtual machine that may execute the storage controller application (408, 410).

In the example method depicted in FIG. 4, the storage controller application (408, 410) may be embodied as a module of computer program instructions that, when executed, carries out various storage tasks. For example, the storage controller application (408, 410) may be embodied as a module of computer program instructions that, when executed, carries out the same tasks as the controllers (110A, 110B in FIG. 1A) described above such as writing data received from the users of the cloud-based storage system (403) to the cloud-based storage system (403), erasing data from the cloud-based storage system (403), retrieving data from the cloud-based storage system (403) and providing such data to users of the cloud-based storage system (403), monitoring and reporting of disk utilization and performance, performing redundancy operations, such as Redundant Array of Independent Drives ('RAID') or RAID-like data redundancy operations, compressing data, encrypting data, deduplicating data, and so forth. Readers will appreciate that because there are two cloud computing instances (404, 406) that each include the storage controller application (408, 410), in some embodiments one cloud computing instance (404) may operate as the primary controller as described above while the other cloud computing instance (406) may operate as the secondary controller as described above. In such an example, in order to save costs, the cloud computing instance (404) that operates as the primary controller may be deployed on a relatively high-performance and relatively expensive cloud computing instance while the cloud computing instance (406) that operates as the secondary controller may be deployed on a relatively low-performance and relatively inexpensive cloud computing instance. Readers will appreciate that the storage controller application (408, 410) depicted in FIG. 4 may include identical source code that is executed within different cloud computing instances (404, 406).

Consider an example in which the cloud computing environment (402) is embodied as AWS and the cloud computing instances are embodied as EC2 instances. In such an example, AWS offers many types of EC2 instances. For example, AWS offers a suite of general purpose EC2 instances that include varying levels of memory and processing power. In such an example, the cloud computing instance (404) that operates as the primary controller may be deployed on one of the instance types that has a relatively large amount of memory and processing power while the cloud computing instance (406) that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance (406) that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance (406) that originally operated as the secondary controller begins operating as the secondary controller again. In such an example, the cloud computing instance (404) that formerly operated as the primary controller may be terminated. Readers will appreciate that in alternative embodiments, the cloud computing instance (404) that is operating as the secondary controller after the failover event may continue to operate as the secondary controller and the cloud computing instance (406) that operated as the primary controller after the occurrence of the failover event may be terminated once the primary role has been assumed by the third cloud computing instance (not shown).

Readers will appreciate that while the embodiments described above relate to embodiments where one cloud computing instance (404) operates as the primary controller and the second cloud computing instance (406) operates as the secondary controller, other embodiments are within the scope of the present disclosure. For example, each cloud computing instance (404, 406) may operate as a primary controller for some portion of the address space supported by the cloud-based storage system (403), each cloud computing instance (404, 406) may operate as a primary controller where the servicing of I/O operations directed to the cloud-based storage system (403) are divided in some other way, and so on. In fact, in other embodiments where costs savings may be prioritized over performance demands, only a single cloud computing instance may exist that contains the storage controller application. In such an example, a controller failure may take more time to recover from as a new cloud computing instance that includes the storage controller application would need to be spun up rather than having an already created cloud computing instance take on the role of servicing I/O operations that would have otherwise been handled by the failed cloud computing instance.

The cloud-based storage system (403) depicted in FIG. 4 includes cloud computing instances (424a, 424b, 424n) with local storage (414, 418, 422). The cloud computing instances (424a, 424b, 424n) depicted in FIG. 4 may be embodied, for example, as instances of cloud computing resources that may be provided by the cloud computing environment (402) to support the execution of software applications. The cloud computing instances (424a, 424b, 424n) of FIG. 4 may differ from the cloud computing instances (404, 406) described above as the cloud computing instances (424a, 424b, 424n) of FIG. 4 have local storage (414, 418, 422) resources whereas the cloud computing instances (404, 406) that support the execution of the storage controller application (408, 410) need not have local storage resources. The cloud computing instances (424a, 424b, 424n) with local storage (414, 418, 422) may be embodied, for example, as EC2 M5 instances that include one or more SSDs, as EC2 R5 instances that include one or more SSDs, as EC2 I3 instances that include one or more SSDs, and so on. In some embodiments, the local storage (414, 418, 422) must be embodied as solid-state storage (e.g., SSDs) rather than storage that makes use of hard disk drives.

In the example depicted in FIG. 4, each of the cloud computing instances (424a, 424b, 424n) with local storage (414, 418, 422) can include a software daemon (412, 416, 420) that, when executed by a cloud computing instance (424a, 424b, 424n) can present itself to the storage controller applications (408, 410) as if the cloud computing instance (424a, 424b, 424n) were a physical storage device (e.g., one or more SSDs). In such an example, the software daemon (412, 416, 420) may include computer program instructions similar to those that would normally be contained on a storage device such that the storage controller applications (408, 410) can send and receive the same commands that a storage controller would send to storage devices. In such a way, the storage controller applications (408, 410) may include code that is identical to (or substantially identical to) the code that would be executed by the controllers in the storage systems described above. In these and similar embodiments, communications between the storage controller applications (408, 410) and the cloud computing instances (424a, 424b, 424n) with local storage (414, 418, 422) may utilize iSCSI, NVMe over TCP, messaging, a custom protocol, or in some other mechanism.

In the example depicted in FIG. 4, each of the cloud computing instances (424*a*, 424*b*, 424*n*) with local storage (414, 418, 422) may also be coupled to block-storage (426, 428, 430) that is offered by the cloud computing environment (402). The block-storage (426, 428, 430) that is offered by the cloud computing environment (402) may be embodied, for example, as Amazon Elastic Block Store ('EBS') volumes. For example, a first EBS volume (426) may be coupled to a first cloud computing instance (424*a*), a second EBS volume (428) may be coupled to a second cloud computing instance (424*b*), and a third EBS volume (430) may be coupled to a third cloud computing instance (424*n*). In such an example, the block-storage (426, 428, 430) that is offered by the cloud computing environment (402) may be utilized in a manner that is similar to how the NVRAM devices described above are utilized, as the software daemon (412, 416, 420) (or some other module) that is executing within a particular cloud computing instance (424*a*, 424*b*, 424*n*) may, upon receiving a request to write data, initiate a write of the data to its attached EBS volume as well as a write of the data to its local storage (414, 418, 422) resources. In some alternative embodiments, data may only be written to the local storage (414, 418, 422) resources within a particular cloud comping instance (424*a*, 424*b*, 424*n*). In an alternative embodiment, rather than using the block-storage (426, 428, 430) that is offered by the cloud computing environment (402) as NVRAM, actual RAM on each of the cloud computing instances (424*a*, 424*b*, 424*n*) with local storage (414, 418, 422) may be used as NVRAM, thereby decreasing network utilization costs that would be associated with using an EBS volume as the NVRAM.

In the example depicted in FIG. 4, the cloud computing instances (424*a*, 424*b*, 424*n*) with local storage (414, 418, 422) may be utilized, by cloud computing instances (404, 406) that support the execution of the storage controller application (408, 410) to service I/O operations that are directed to the cloud-based storage system (403). Consider an example in which a first cloud computing instance (404) that is executing the storage controller application (408) is operating as the primary controller. In such an example, the first cloud computing instance (404) that is executing the storage controller application (408) may receive (directly or indirectly via the secondary controller) requests to write data to the cloud-based storage system (403) from users of the cloud-based storage system (403). In such an example, the first cloud computing instance (404) that is executing the storage controller application (408) may perform various tasks such as, for example, deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances (424*a*, 424*b*, 424*n*) with local storage (414, 418, 422). Either cloud computing instance (404, 406), in some embodiments, may receive a request to read data from the cloud-based storage system (403) and may ultimately send a request to read data to one or more of the cloud computing instances (424*a*, 424*b*, 424*n*) with local storage (414, 418, 422).

Readers will appreciate that when a request to write data is received by a particular cloud computing instance (424*a*, 424*b*, 424*n*) with local storage (414, 418, 422), the software daemon (412, 416, 420) or some other module of computer program instructions that is executing on the particular cloud computing instance (424*a*, 424*b*, 424*n*) may be configured to not only write the data to its own local storage (414, 418,

422) resources and any appropriate block storage (426, 428, 430) that are offered by the cloud computing environment (402), but the software daemon (412, 416, 420) or some other module of computer program instructions that is executing on the particular cloud computing instance (424*a*, 424*b*, 424*n*) may also be configured to write the data to cloud-based object storage (432) that is attached to the particular cloud computing instance (424*a*, 424*b*, 424*n*). The cloud-based object storage (432) that is attached to the particular cloud computing instance (424*a*, 424*b*, 424*n*) may be embodied, for example, as Amazon Simple Storage Service ('S3') storage that is accessible by the particular cloud computing instance (424*a*, 424*b*, 424*n*). In other embodiments, the cloud computing instances (404, 406) that each include the storage controller application (408, 410) may initiate the storage of the data in the local storage (414, 418, 422) of the cloud computing instances (424*a*, 424*b*, 424*n*) and the cloud-based object storage (432).

Readers will appreciate that the software daemon (412, 416, 420) or other module of computer program instructions that writes the data to block storage (e.g., local storage (414, 418, 422) resources) and also writes the data to cloud-based object storage (432) may be executed on processing units of dissimilar types (e.g., different types cloud computing instances, cloud computing instances that contain different processing units). In fact, the software daemon (412, 416, 420) or other module of computer program instructions that writes the data to block storage (e.g., local storage (414, 418, 422) resources) and also writes the data to cloud-based object storage (432) can be migrated between different types of cloud computing instances based on demand.

Readers will appreciate that, as described above, the cloud-based storage system (403) may be used to provide block storage services to users of the cloud-based storage system (403). While the local storage (414, 418, 422) resources and the block-storage (426, 428, 430) resources that are utilized by the cloud computing instances (424*a*, 424*b*, 424*n*) may support block-level access, the cloud-based object storage (432) that is attached to the particular cloud computing instance (424*a*, 424*b*, 424*n*) supports only object-based access. In order to address this, the software daemon (412, 416, 420) or some other module of computer program instructions that is executing on the particular cloud computing instance (424*a*, 424*b*, 424*n*) may be configured to take blocks of data, package those blocks into objects, and write the objects to the cloud-based object storage (432) that is attached to the particular cloud computing instance (424*a*, 424*b*, 424*n*).

Consider an example in which data is written to the local storage (414, 418, 422) resources and the block-storage (426, 428, 430) resources that are utilized by the cloud computing instances (424*a*, 424*b*, 424*n*) in 1 MB blocks. In such an example, assume that a user of the cloud-based storage system (403) issues a request to write data that, after being compressed and deduplicated by the storage controller application (408, 410) results in the need to write 5 MB of data. In such an example, writing the data to the local storage (414, 418, 422) resources and the block-storage (426, 428, 430) resources that are utilized by the cloud computing instances (424*a*, 424*b*, 424*n*) is relatively straightforward as 5 blocks that are 1 MB in size are written to the local storage (414, 418, 422) resources and the block-storage (426, 428, 430) resources that are utilized by the cloud computing instances (424*a*, 424*b*, 424*n*). In such an example, the software daemon (412, 416, 420) or some other module of computer program instructions that is executing on the particular cloud computing instance (424*a*, 424*b*, 424*n*) may be configured to: 1) create a first object that includes the first 1 MB of data and write the first object to the cloud-based object storage (432), 2) create a second object that includes the second 1 MB of data and write the second object to the cloud-based object storage (432), 3) create a third object that includes the third 1 MB of data and write the third object to the cloud-based object storage (432), and so on. As such, in some embodiments, each object that is written to the cloud-based object storage (432) may be identical (or nearly identical) in size. Readers will appreciate that in such an example, metadata that is associated with the data itself may be included in each object (e.g., the first 1 MB of the object is data and the remaining portion is metadata associated with the data).

Readers will appreciate that the cloud-based object storage (432) may be incorporated into the cloud-based storage system (403) to increase the durability of the cloud-based storage system (403). Continuing with the example described above where the cloud computing instances (424a, 424b, 424n) are EC2 instances, readers will understand that EC2 instances are only guaranteed to have a monthly uptime of 99.9% and data stored in the local instance store only persists during the lifetime of the EC2 instance. As such, relying on the cloud computing instances (424a, 424b, 424n) with local storage (414, 418, 422) as the only source of persistent data storage in the cloud-based storage system (403) may result in a relatively unreliable storage system. Likewise, EBS volumes are designed for 99.999% availability. As such, even relying on EBS as the persistent data store in the cloud-based storage system (403) may result in a storage system that is not sufficiently durable. Amazon S3, however, is designed to provide 99.999999999% durability, meaning that a cloud-based storage system (403) that can incorporate S3 into its pool of storage is substantially more durable than various other options.

Readers will appreciate that while a cloud-based storage system (403) that can incorporate S3 into its pool of storage is substantially more durable than various other options, utilizing S3 as the primary pool of storage may result in storage system that has relatively slow response times and relatively long I/O latencies. As such, the cloud-based storage system (403) depicted in FIG. 4 not only stores data in S3 but the cloud-based storage system (403) also stores data in local storage (414, 418, 422) resources and block-storage (426, 428, 430) resources that are utilized by the cloud computing instances (424a, 424b, 424n), such that read operations can be serviced from local storage (414, 418, 422) resources and the block-storage (426, 428, 430) resources that are utilized by the cloud computing instances (424a, 424b, 424n), thereby reducing read latency when users of the cloud-based storage system (403) attempt to read data from the cloud-based storage system (403).

In some embodiments, all data that is stored by the cloud-based storage system (403) may be stored in both: 1) the cloud-based object storage (432), and 2) at least one of the local storage (414, 418, 422) resources or block-storage (426, 428, 430) resources that are utilized by the cloud computing instances (424a, 424b, 424n). In such embodiments, the local storage (414, 418, 422) resources and block-storage (426, 428, 430) resources that are utilized by the cloud computing instances (424a, 424b, 424n) may effectively operate as cache that generally includes all data that is also stored in S3, such that all reads of data may be serviced by the cloud computing instances (424a, 424b, 424n) without requiring the cloud computing instances (424a, 424b, 424n) to access the cloud-based object storage (432). Readers will appreciate that in other embodiments, however, all data that is stored by the cloud-based storage system (403) may be stored in the cloud-based object storage (432), but less than all data that is stored by the cloud-based storage system (403) may be stored in at least one of the local storage (414, 418, 422) resources or block-storage (426, 428, 430) resources that are utilized by the cloud computing instances (424a, 424b, 424n). In such an example, various policies may be utilized to determine which subset of the data that is stored by the cloud-based storage system (403) should reside in both: 1) the cloud-based object storage (432), and 2) at least one of the local storage (414, 418, 422) resources or block-storage (426, 428, 430) resources that are utilized by the cloud computing instances (424a, 424b, 424n).

As described above, when the cloud computing instances (424a, 424b, 424n) with local storage (414, 418, 422) are embodied as EC2 instances, the cloud computing instances (424a, 424b, 424n) with local storage (414, 418, 422) are only guaranteed to have a monthly uptime of 99.9% and data stored in the local instance store only persists during the lifetime of each cloud computing instance (424a, 424b, 424n) with local storage (414, 418, 422). As such, one or more modules of computer program instructions that are executing within the cloud-based storage system (403) (e.g., a monitoring module that is executing on its own EC2 instance) may be designed to handle the failure of one or more of the cloud computing instances (424a, 424b, 424n) with local storage (414, 418, 422). In such an example, the monitoring module may handle the failure of one or more of the cloud computing instances (424a, 424b, 424n) with local storage (414, 418, 422) by creating one or more new cloud computing instances with local storage, retrieving data that was stored on the failed cloud computing instances (424a, 424b, 424n) from the cloud-based object storage (432), and storing the data retrieved from the cloud-based object storage (432) in local storage on the newly created cloud computing instances. Readers will appreciate that many variants of this process may be implemented.

Consider an example in which all cloud computing instances (424a, 424b, 424n) with local storage (414, 418, 422) failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage (432). Readers will appreciate that instances types are selected that allow for the maximum data transfer rates between the new cloud computing instances and the cloud-based object storage (432) such that the new high-bandwidth cloud computing instances can be rehydrated with data from the cloud-based object storage (432) as quickly as possible. Once the new high-bandwidth cloud computing instances are rehydrated with data from the cloud-based object storage (432), less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system (403). The number of new cloud computing instances that are created may substantially exceed the number of cloud computing instances that are needed to locally store all of the data stored by the cloud-based storage system (403) in order to more rapidly pull data from the cloud-based object storage (432) and into the new cloud computing instances, as each new cloud computing instance can (in parallel) retrieve some portion of the data stored by the cloud-based storage system (403). In such embodiments, once the data stored by the cloud-based storage system (403) has been pulled into the newly created cloud computing instances, the data may be consolidated within a subset of the newly created cloud computing instances and those newly created cloud computing instances that are excessive may be terminated.

Consider an example in which 1000 cloud computing instances are needed in order to locally store all valid data that users of the cloud-based storage system (403) have written to the cloud-based storage system (403). In such an example, assume that all 1,000 cloud computing instances fail. In such an example, the monitoring module may cause 100,000 cloud computing instances to be created, where each cloud computing instance is responsible for retrieving, from the cloud-based object storage (432), distinct $\frac{1}{100,000}$th chunks of the valid data that users of the cloud-based storage system (403) have written to the cloud-based storage system (403) and locally storing the distinct chunk of the dataset that it retrieved. In such an example, because each of the 100,000 cloud computing instances can retrieve data from the cloud-based object storage (432) in parallel, the caching layer may be restored 100 times faster as compared to an embodiment where the monitoring module only create 1000 replacement cloud computing instances. In such an example, over time the data that is stored locally in the 100,000 could be consolidated into 1,000 cloud computing instances and the remaining 99,000 cloud computing instances could be terminated.

Readers will appreciate that various performance aspects of the cloud-based storage system (403) may be monitored (e.g., by a monitoring module that is executing in an EC2 instance) such that the cloud-based storage system (403) can be scaled-up or scaled-out as needed. Consider an example in which the monitoring module monitors the performance of the cloud-based storage system (403) via communications with one or more of the cloud computing instances (404, 406) that each are used to support the execution of a storage controller application (408, 410), via monitoring communications between cloud computing instances (404, 406, 424*a*, 424*b*, 424*n*), via monitoring communications between cloud computing instances (404, 406, 424*a*, 424*b*, 424*n*) and the cloud-based object storage (432), or in some other way. In such an example, assume that the monitoring module determines that the cloud computing instances (404, 406) that are used to support the execution of a storage controller application (408, 410) are undersized and not sufficiently servicing the I/O requests that are issued by users of the cloud-based storage system (403). In such an example, the monitoring module may create a new, more powerful cloud computing instance (e.g., a cloud computing instance of a type that includes more processing power, more memory, etc., . . . ) that includes the storage controller application such that the new, more powerful cloud computing instance can begin operating as the primary controller. Likewise, if the monitoring module determines that the cloud computing instances (404, 406) that are used to support the execution of a storage controller application (408, 410) are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Consider, as an additional example of dynamically sizing the cloud-based storage system (403), an example in which the monitoring module determines that the utilization of the local storage that is collectively provided by the cloud computing instances (424*a*, 424*b*, 424*n*) has reached a predetermined utilization threshold (e.g., 95%). In such an example, the monitoring module may create additional cloud computing instances with local storage to expand the pool of local storage that is offered by the cloud computing instances. Alternatively, the monitoring module may create one or more new cloud computing instances that have larger amounts of local storage than the already existing cloud computing instances (424*a*, 424*b*, 424*n*), such that data stored in an already existing cloud computing instance (424*a*, 424*b*, 424*n*) can be migrated to the one or more new cloud computing instances and the already existing cloud computing instance (424*a*, 424*b*, 424*n*) can be terminated, thereby expanding the pool of local storage that is offered by the cloud computing instances. Likewise, if the pool of local storage that is offered by the cloud computing instances is unnecessarily large, data can be consolidated and some cloud computing instances can be terminated.

Readers will appreciate that the cloud-based storage system (403) may be sized up and down automatically by a monitoring module applying a predetermined set of rules that may be relatively simple of relatively complicated. In fact, the monitoring module may not only take into account the current state of the cloud-based storage system (403), but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system (403) may be based on current performance metrics, predicted workloads, and many other factors, including combinations thereof.

Readers will further appreciate that because the cloud-based storage system (403) may be dynamically scaled, the cloud-based storage system (403) may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system (403) described here can always 'add' additional storage (e.g., by adding more cloud computing instances with local storage). Because the cloud-based storage system (403) described here can always 'add' additional storage, the cloud-based storage system (403) can make more intelligent decisions regarding when to perform garbage collection. For example, the cloud-based storage system (403) may implement a policy that garbage collection only be performed when the number of IOPS being serviced by the cloud-based storage system (403) falls below a certain level. In some embodiments, other system-level functions (e.g., deduplication, compression) may also be turned off and on in response to system load, given that the size of the cloud-based storage system (403) is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 4.

In some embodiments, especially in embodiments where the cloud-based object storage (432) resources are embodied as Amazon S3, the cloud-based storage system (403) may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object- and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system (403) does not need to access the data to verify its validity, the data can stay encrypted and access charges can be avoided.

In the example depicted in FIG. 4, and as described above, the cloud computing instances (404, 406) that are used to support the execution of the storage controller applications (408, 410) may operate in a primary/secondary configuration where one of the cloud computing instances (404, 406) that are used to support the execution of the storage controller applications (408, 410) is responsible for writing data to the local storage (414, 418, 422) that is attached to the cloud computing instances with local storage (424a, 424b, 424n). In such an example, however, because each of the cloud computing instances (404, 406) that are used to support the execution of the storage controller applications (408, 410) can access the cloud computing instances with local storage (424a, 424b, 424n), both of the cloud computing instances (404, 406) that are used to support the execution of the storage controller applications (408, 410) can service requests to read data from the cloud-based storage system (403).

Figure 5:
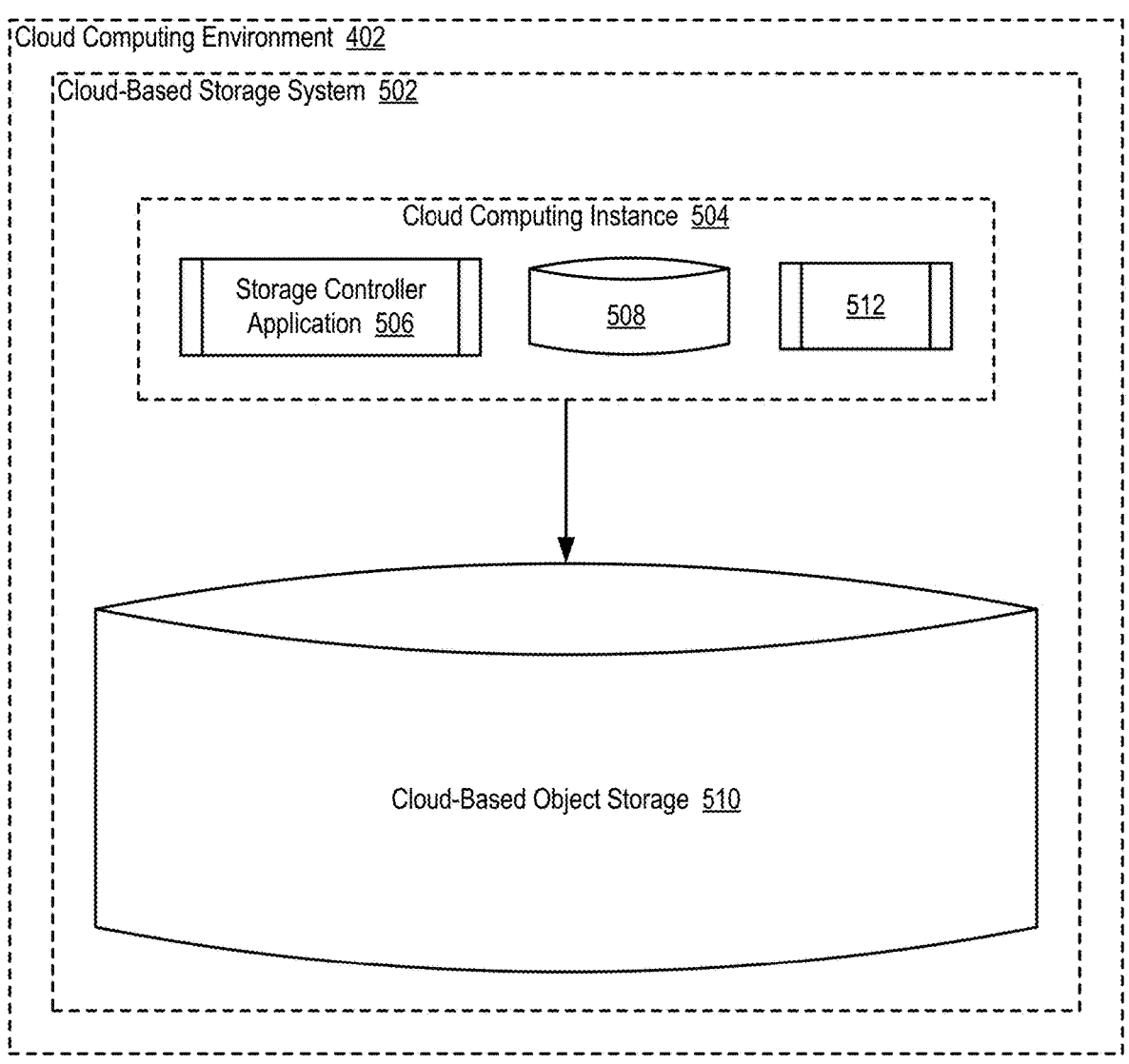
FIG. 5 sets forth an example of an additional cloud-based storage system in accordance with some embodiments of the present disclosure.

For further explanation, FIG. 5 sets forth an example of an additional cloud-based storage system (502) in accordance with some embodiments of the present disclosure. In the example depicted in FIG. 5, the cloud-based storage system (502) is created entirely in a cloud computing environment (402) such as, for example, AWS, Microsoft Azure, Google Cloud Platform, IBM Cloud, Oracle Cloud, and others. The cloud-based storage system (502) may be used to provide services similar to the services that may be provided by the storage systems described above. For example, the cloud-based storage system (502) may be used to provide block storage services to users of the cloud-based storage system (502), the cloud-based storage system (403) may be used to provide storage services to users of the cloud-based storage system (403) through the use of solid-state storage, and so on.

The cloud-based storage system (502) depicted in FIG. 5 may operate in a manner that is somewhat similar to the cloud-based storage system (403) depicted in FIG. 4, as the cloud-based storage system (502) depicted in FIG. 5 includes a storage controller application (506) that is being executed in a cloud computing instance (504). In the example depicted in FIG. 5, however, the cloud computing instance (504) that executes the storage controller application (506) is a cloud computing instance (504) with local storage (508). In such an example, data written to the cloud-based storage system (502) may be stored in both the local storage (508) of the cloud computing instance (504) and also in cloud-based object storage (510) in the same manner that the cloud-based object storage (510) was used above. In some embodiments, for example, the storage controller application (506) may be responsible for writing data to the local storage (508) of the cloud computing instance (504) while a software daemon (512) may be responsible for ensuring that the data is written to the cloud-based object storage (510) in the same manner that the cloud-based object storage (510) was used above. In other embodiments, the same entity (e.g., the storage controller application) may be responsible for writing data to the local storage (508) of the cloud computing instance (504) and also responsible for ensuring that the data is written to the cloud-based object storage (510) in the same manner that the cloud-based object storage (510) was used above.

Readers will appreciate that a cloud-based storage system (502) depicted in FIG. 5 may represent a less expensive, less robust version of a cloud-based storage system than was depicted in FIG. 4. In yet alternative embodiments, the cloud-based storage system (502) depicted in FIG. 5 could include additional cloud computing instances with local storage that supported the execution of the storage controller application (506), such that failover can occur if the cloud computing instance (504) that executes the storage controller application (506) fails. Likewise, in other embodiments, the cloud-based storage system (502) depicted in FIG. 5 can include additional cloud computing instances with local storage to expand the amount local storage that is offered by the cloud computing instances in the cloud-based storage system (502).

Readers will appreciate that many of the failure scenarios described above with reference to FIG. 4 would also apply cloud-based storage system (502) depicted in FIG. 5. Likewise, the cloud-based storage system (502) depicted in FIG. 5 may be dynamically scaled up and down in a similar manner as described above. The performance of various system-level tasks may also be executed by the cloud-based storage system (502) depicted in FIG. 5 in an intelligent way, as described above.

Readers will appreciate that, in an effort to increase the resiliency of the cloud-based storage systems described above, various components may be located within different availability zones. For example, a first cloud computing instance that supports the execution of the storage controller application may be located within a first availability zone while a second cloud computing instance that also supports the execution of the storage controller application may be located within a second availability zone. Likewise, the cloud computing instances with local storage may be distributed across multiple availability zones. In fact, in some embodiments, an entire second cloud-based storage system could be created in a different availability zone, where data in the original cloud-based storage system is replicated (synchronously or asynchronously) to the second cloud-based storage system so that if the entire original cloud-based storage system went down, a replacement cloud-based storage system (the second cloud-based storage system) could be brought up in a trivial amount of time.

Readers will appreciate that the cloud-based storage systems described herein may be used as part of a fleet of storage systems. In fact, the cloud-based storage systems described herein may be paired with on-premises storage systems. In such an example, data stored in the on-premises storage may be replicated (synchronously or asynchronously) to the cloud-based storage system, and vice versa.

Figure 6:
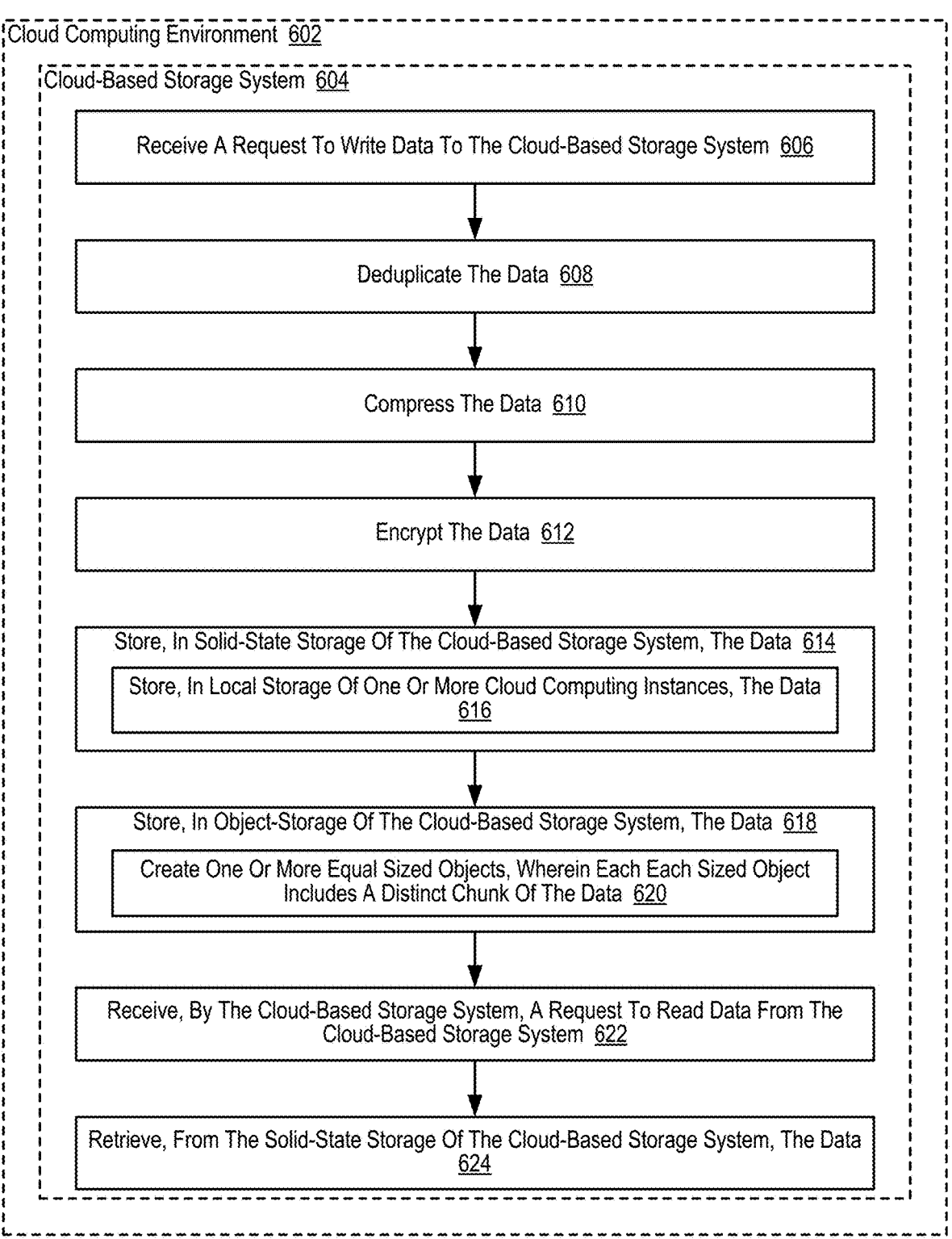
FIG. 6 sets forth a flow chart illustrating an example method of servicing I/O operations in a cloud-based storage system.

For further explanation, FIG. 6 sets forth a flow chart illustrating an example method of servicing I/O operations in a cloud-based storage system (604). Although depicted in less detail, the cloud-based storage system (604) depicted in FIG. 6 may be similar to the cloud-based storage systems described above and may be supported by a cloud computing environment (602).

The example method depicted in FIG. 6 includes receiving (606), by the cloud-based storage system (604), a request to write data to the cloud-based storage system (604). The request to write data may be received, for example, from an application executing in the cloud computing environment, by a user of the storage system that is communicatively coupled to the cloud computing environment, and in other ways. In such an example, the request can include the data that is to be written to the cloud-based storage system (604). In other embodiments, the request to write data to the cloud-based storage system (604) may occur at boot-time when the cloud-based storage system (604) is being brought up.

The example method depicted in FIG. 6 also includes deduplicating (608) the data. Data deduplication is a data reduction technique for eliminating duplicate copies of repeating data. The cloud-based storage system (604) may deduplicate (608) the data, for example, by comparing one or more portions of the data to data that is already stored in the cloud-based storage system (604), by comparing a fingerprint for one or more portions of the data to fingerprints for data that is already stored in the cloud-based storage system (604), or in other ways. In such an example, duplicate data may be removed and replaced by a reference to an already existing copy of the data that is already stored in the cloud-based storage system (604).

The example method depicted in FIG. 6 also includes compressing (610) the data. Data compression is a data reduction technique whereby information is encoded using fewer bits than the original representation. The cloud-based storage system (604) may compress (610) the data by applying one or more data compression algorithms to the data, which at this point may not include data that data that is already stored in the cloud-based storage system (604).

The example method depicted in FIG. 6 also includes encrypting (612) the data. Data encryption is a technique that involves the conversion of data from a readable format into an encoded format that can only be read or processed after the data has been decrypted. The cloud-based storage system (604) may encrypt (612) the data, which at this point may have already been deduplicated and compressed, using an encryption key. Readers will appreciate that although the embodiment depicted in FIG. 6 involves deduplicating (608) the data, compressing (610) the data, and encrypting (612) the data, other embodiments exist in which fewer of these steps are performed and embodiment exist in which the same number of steps or fewer are performed in a different order.

The example method depicted in FIG. 6 also includes storing (614), in block storage of the cloud-based storage system (604), the data. Storing (614) the data in block storage of the cloud-based storage system (604) may be carried out, for example, by storing (616) the data solid-state storage such as local storage (e.g., SSDs) of one or more cloud computing instances, as described in more detail above. In such an example, the data may be spread across the local storage of many cloud computing instances, along with parity data, to implement RAID or RAID-like data redundancy.

The example method depicted in FIG. 6 also includes storing (618), in object storage of the cloud-based storage system (604), the data. Storing (618) the data in object storage of the cloud-based storage system can include creating (620) one or more equal sized objects, where each equal sized object includes a distinct chunk of the data. In such an example, because each object includes data and metadata, the data portion of each object may be equal sized. In other embodiments, the data portion of each created object may not be equal sized. For example, each object could include the data from a predetermined number of blocks in the block storage that was used in the preceding paragraph, or in some other way.

The example method depicted in FIG. 6 also includes receiving (622), by the cloud-based storage system, a request to read data from the cloud-based storage system (604). The request to read data from the cloud-based storage system (604) may be received, for example, from an application executing in the cloud computing environment, by a user of the storage system that is communicatively coupled to the cloud computing environment, and in other ways. The request can include, for example, a logical address of the data that is to be read from the cloud-based storage system (604).

The example method depicted in FIG. 6 also includes retrieving (624), from block storage of the cloud-based storage system (604), the data. Readers will appreciate that the cloud-based storage system (604) may retrieve (624) the data from block storage of the cloud-based storage system (604), for example, by the storage controller application forwarding the read request to the cloud computing instance that includes the requested data in its local storage. Readers will appreciate that by retrieving (624) the data from block storage of the cloud-based storage system (604), the data may be retrieved more rapidly than if the data were read from cloud-based object storage, even though the cloud-based object storage does include a copy of the data.

Readers will appreciate that in the example method depicted in FIG. 6, the block storage of the cloud-based storage system (604) is characterized by a low read latency relative to the object storage of the cloud-based storage system. As such, by servicing read operations from the block storage rather than the object storage, the cloud-based storage system (604) may be able to service read operations using low latency block storage, while still offering the resiliency that is associated with object storage solutions offered by cloud services providers. Furthermore, the block storage of the cloud-based storage system (604) may offer relatively high bandwidth. The block storage of the cloud-based storage system (604) may be implemented in a variety of ways as will occur to readers of this disclosure.

For further explanation, FIG. 7 sets forth a flow chart illustrating an additional example method of servicing I/O operations in a cloud-based storage system (604). The example method depicted in FIG. 7 is similar to the example method depicted in FIG. 6, as the example method depicted in FIG. 7 also includes receiving (606) a request to write data to the cloud-based storage system (604), storing (614) the data in block storage of the cloud-based storage system (604), and storing (618) the data in object storage of the cloud-based storage system (604).

The example method depicted in FIG. 7 also includes detecting (702) that at least some portion of the block storage of the cloud-based storage system has become unavailable. Detecting (702) that at least some portion of the block storage of the cloud-based storage system has become unavailable may be carried out, for example, by detecting that one or more of the cloud computing instances that includes local storage has become unavailable, as described in greater detail below.

The example method depicted in FIG. 7 also includes identifying (704) data that was stored in the portion of the block storage of the cloud-based storage system that has become unavailable. Identifying (704) data that was stored in the portion of the block storage of the cloud-based storage system that has become unavailable may be carried out, for example, through the use of metadata that maps some identifier of a piece of data (e.g., a sequence number, an address) to the location where the data is stored. Such metadata, or separate metadata, may also map the piece of data to one or more object identifiers that identify objects stored in the object storage of the cloud-based storage system that contain the piece of data.

The example method depicted in FIG. 7 also includes retrieving (706), from object storage of the cloud-based storage system, the data that was stored in the portion of the block storage of the cloud-based storage system that has become unavailable. Retrieving (706) the data that was stored in the portion of the block storage of the cloud-based storage system that has become unavailable from object storage of the cloud-based storage system may be carried out, for example, through the use of metadata described above that maps the data that was stored in the portion of the block storage of the cloud-based storage system that has become unavailable to one or more objects stored in the object storage of the cloud-based storage system that contain the piece of data. In such an example, retrieving (706) the data may be carried out by reading the objects that map to the data from the object storage of the cloud-based storage system.

The example method depicted in FIG. 7 also includes storing (708), in block storage of the cloud-based storage system, the retrieved data. Storing (708) the retrieved data in block storage of the cloud-based storage system may be carried out, for example, by creating replacement cloud computing instances with local storage and storing the data in the local storage of one or more of the replacement cloud computing instances, as described in greater detail above.

Readers will appreciate that although the embodiments described above relate to embodiments in which data that was stored in the portion of the block storage of the cloud-based storage system that has become unavailable is essentially brought back into the block storage layer of the cloud-based storage system by retrieving the data from the object storage layer of the cloud-based storage system, other embodiments are within the scope of the present disclosure. For example, because data may be distributed across the local storage of multiple cloud computing instances using data redundancy techniques such as RAID, in some embodiments the lost data may be brought back into the block storage layer of the cloud-based storage system through a RAID rebuild.

Figure 8:
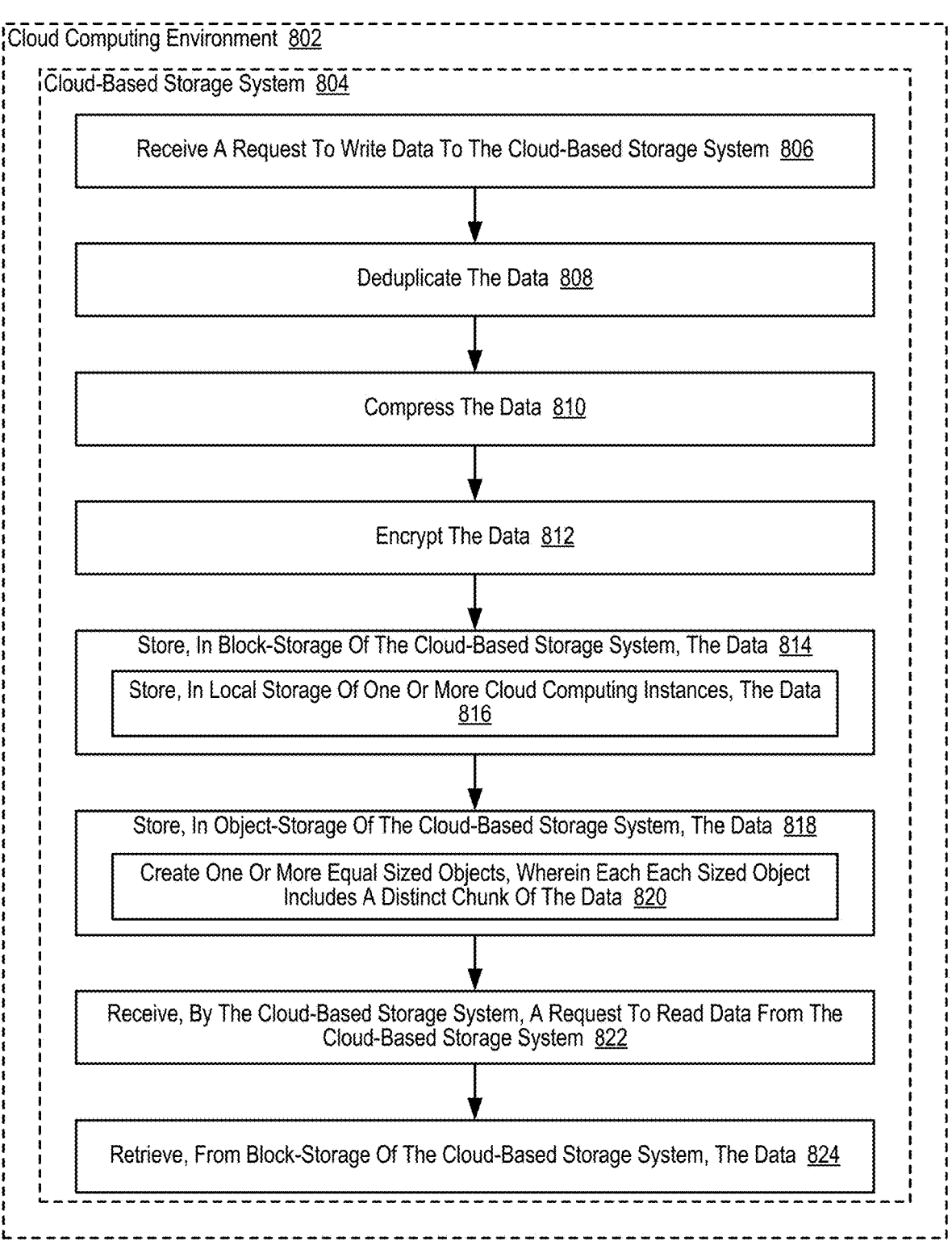
FIG. 8 sets forth a flow chart illustrating an additional example method of servicing I/O operations in a cloud-based storage system.

For further explanation, FIG. 8 sets forth a flow chart illustrating an example method of servicing I/O operations in a cloud-based storage system (804). Although depicted in less detail, the cloud-based storage system (804) depicted in FIG. 8 may be similar to the cloud-based storage systems described above and may be supported by a cloud computing environment (802).

The example method depicted in FIG. 8 includes receiving (806), by the cloud-based storage system (804), a request to write data to the cloud-based storage system (804). The request to write data may be received, for example, from an application executing in the cloud computing environment, by a user of the storage system that is communicatively coupled to the cloud computing environment, and in other ways. In such an example, the request can include the data that is to be written to the cloud-based storage system (804). In other embodiments, the request to write data to the cloud-based storage system (804) may occur at boot-time when the cloud-based storage system (804) is being brought up.

The example method depicted in FIG. 8 also includes deduplicating (808) the data. Data deduplication is a data reduction technique for eliminating duplicate copies of repeating data. The cloud-based storage system (804) may deduplicate (808) the data, for example, by comparing one or more portions of the data to data that is already stored in the cloud-based storage system (804), by comparing a fingerprint for one or more portions of the data to fingerprints for data that is already stored in the cloud-based storage system (804), or in other ways. In such an example, duplicate data may be removed and replaced by a reference to an already existing copy of the data that is already stored in the cloud-based storage system (804).

The example method depicted in FIG. 8 also includes compressing (810) the data. Data compression is a data reduction technique whereby information is encoded using fewer bits than the original representation. The cloud-based storage system (804) may compress (810) the data by applying one or more data compression algorithms to the data, which at this point may not include data that data that is already stored in the cloud-based storage system (804).

The example method depicted in FIG. 8 also includes encrypting (812) the data. Data encryption is a technique that involves the conversion of data from a readable format into an encoded format that can only be read or processed after the data has been decrypted. The cloud-based storage system (804) may encrypt (812) the data, which at this point may have already been deduplicated and compressed, using an encryption key. Readers will appreciate that although the embodiment depicted in FIG. 8 involves deduplicating (808) the data, compressing (810) the data, and encrypting (812) the data, other embodiments exist in which fewer of these steps are performed and embodiment exist in which the same number of steps or fewer are performed in a different order.

The example method depicted in FIG. 8 also includes storing (814), in block storage of the cloud-based storage system (804), the data. Storing (814) the data in block storage of the cloud-based storage system (804) may be carried out, for example, by storing (816) the data in local storage (e.g., SSDs) of one or more cloud computing instances, as described in more detail above. In such an example, the data spread across local storage of multiple cloud computing instances, along with parity data, to implement RAID or RAID-like data redundancy.

The example method depicted in FIG. 8 also includes storing (818), in object storage of the cloud-based storage system (804), the data. Storing (818) the data in object storage of the cloud-based storage system can include creating (820) one or more equal sized objects, wherein each equal sized object includes a distinct chunk of the data, as described in greater detail above.

The example method depicted in FIG. 8 also includes receiving (822), by the cloud-based storage system, a request to read data from the cloud-based storage system (804). The request to read data from the cloud-based storage system (804) may be received, for example, from an application executing in the cloud computing environment, by a user of the storage system that is communicatively coupled to the cloud computing environment, and in other ways. The request can include, for example, a logical address of the data that is to be read from the cloud-based storage system (804).

The example method depicted in FIG. 8 also includes retrieving (824), from block storage of the cloud-based storage system (804), the data. Readers will appreciate that the cloud-based storage system (804) may retrieve (824) the data from block storage of the cloud-based storage system (804), for example, by the storage controller application forwarding the read request to the cloud computing instance that includes the requested data in its local storage. Readers will appreciate that by retrieving (824) the data from block storage of the cloud-based storage system (804), the data may be retrieved more rapidly than if the data were read from cloud-based object storage, even though the cloud-based object storage does include a copy of the data.

Figure 9:
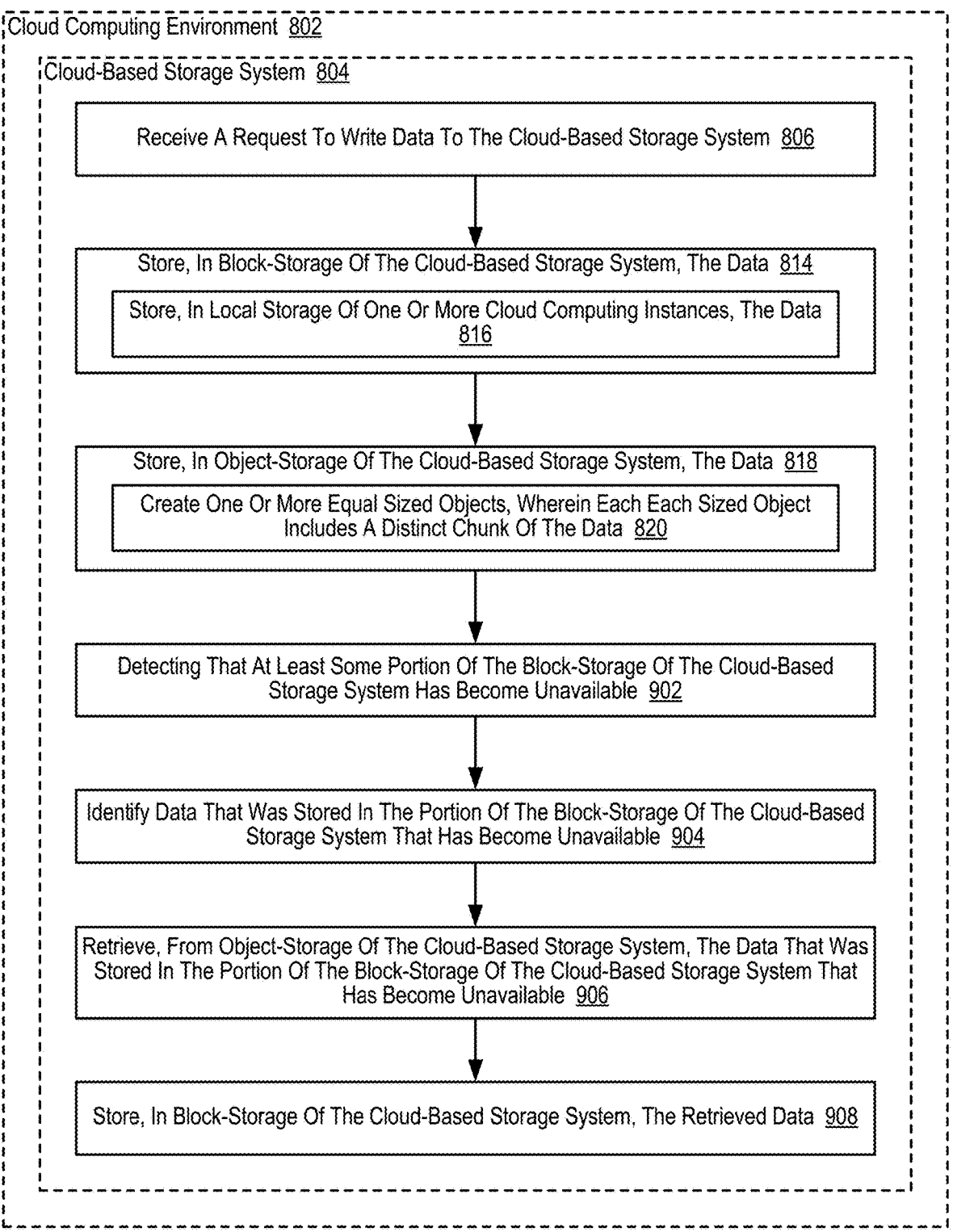
FIG. 9 sets forth a flow chart illustrating an additional example method of servicing I/O operations in a cloud-based storage system.

For further explanation, FIG. 9 sets forth a flow chart illustrating an additional example method of servicing I/O operations in a cloud-based storage system (804). The example method depicted in FIG. 9 is similar to the example method depicted in FIG. 8, as the example method depicted in FIG. 9 also includes receiving (806) a request to write data to the cloud-based storage system (804), storing (814) the data in block storage of the cloud-based storage system (804), and storing (818) the data in object storage of the cloud-based storage system (804).

The example method depicted in FIG. 9 also includes detecting (902) that at least some portion of the block storage of the cloud-based storage system has become unavailable. Detecting (902) that at least some portion of the block storage of the cloud-based storage system has become unavailable may be carried out, for example, by detecting that one or more of the cloud computing instances that includes local storage has become unavailable, as described in greater detail below.

The example method depicted in FIG. 9 also includes identifying (904) data that was stored in the portion of the block storage of the cloud-based storage system that has become unavailable. Identifying (904) data that was stored in the portion of the block storage of the cloud-based storage system that has become unavailable may be carried out, for example, through the use of metadata that maps some identifier of a piece of data (e.g., a sequence number, an address) to the location where the data is stored. Such metadata, or separate metadata, may also map the piece of data to one or more object identifiers that identify objects stored in the object storage of the cloud-based storage system that contain the piece of data.

The example method depicted in FIG. 9 also includes retrieving (906), from object storage of the cloud-based storage system, the data that was stored in the portion of the block storage of the cloud-based storage system that has become unavailable. Retrieving (906) the data that was stored in the portion of the block storage of the cloud-based storage system that has become unavailable from object storage of the cloud-based storage system may be carried out, for example, through the use of metadata described above that maps the data that was stored in the portion of the block storage of the cloud-based storage system that has become unavailable to one or more objects stored in the object storage of the cloud-based storage system that contain the piece of data. In such an example, retrieving (906) the data may be carried out by reading the objects that map to the data from the object storage of the cloud-based storage system.

The example method depicted in FIG. 9 also includes storing (908), in block storage of the cloud-based storage system, the retrieved data. Storing (908) the retrieved data in block storage of the cloud-based storage system may be carried out, for example, by creating replacement cloud computing instances with local storage and storing the data in the local storage of one or more of the replacement cloud computing instances, as described in greater detail above.

Figure 10:
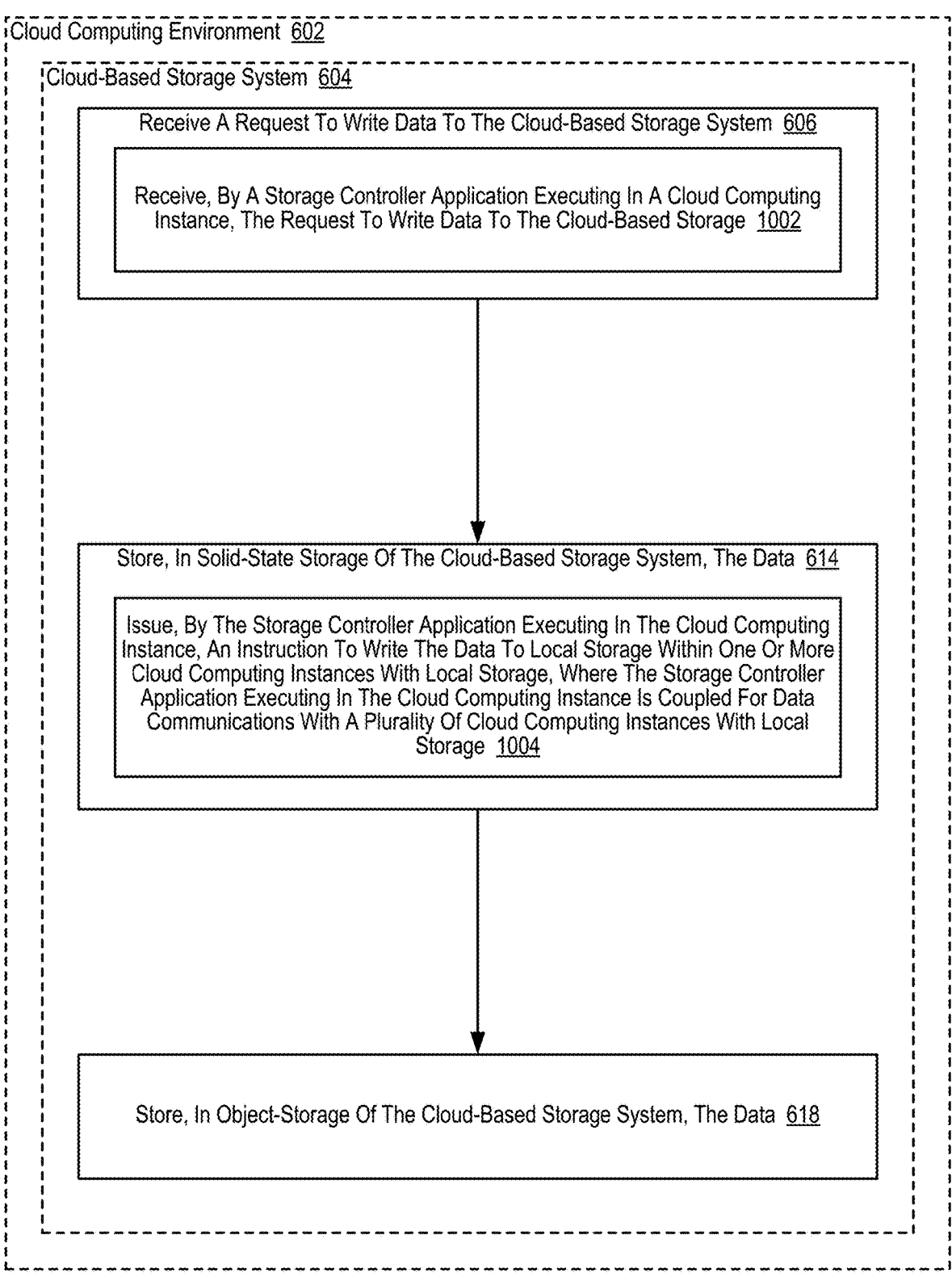
FIG. 10 sets forth a flow chart illustrating an additional example method of servicing I/O operations in a cloud-based storage system.

For further explanation, FIG. 10 sets forth a flow chart illustrating an additional example method of servicing I/O operations in a cloud-based storage system (604). The example method depicted in FIG. 10 is similar to the example method depicted in many of the figures above, as the example method depicted in FIG. 10 also includes receiving (606) a request to write data to the cloud-based storage system (604), storing (614) the data in block storage of the cloud-based storage system (604), and storing (618) the data in object storage of the cloud-based storage system (604).

In the example method depicted in FIG. 10, receiving (606) the request to write data to the cloud-based storage system can include receiving (1002), by a storage controller application executing in a cloud computing instance, the request to write data to the cloud-based storage. The storage controller application that is executing in a cloud computing instance may be similar to the storage controller applications described above and may be executing, for example, in an EC2 instance as described above in greater detail. In fact, the cloud-based storage system (604) may actually include multiple EC2 instances or similar cloud computing instances, where multiple cloud computing instances are each executing the storage controller application.

In the example method depicted in FIG. 10, storing (614), in block storage of the cloud-based storage system, the data can include issuing (1004), by the storage controller application executing in the cloud computing instance, an instruction to write the data to local storage within one or more cloud computing instances with local storage. The one or more cloud computing instances with local storage may be similar to the cloud computing instances with local storage that are described above. In the example method depicted in FIG. 10, the storage controller application executing in the cloud computing instance may be coupled for data communications with a plurality of cloud computing instances with local storage. In such a way, the storage controller application that is executing in the cloud computing instance may treat the plurality of cloud computing instances with local storage as individual storage devices, such that the storage controller application that is executing in the cloud computing instance may issue (1004) an instruction to write the data to local storage within one or more cloud computing instances with local storage by issuing the same set of commands that the storage controller application would issue when writing data to a connected storage device. Readers will appreciate that because the storage controller application that is executing in the cloud computing instance may be coupled for data communications with a plurality of cloud computing instances with local storage, the storage array controller may be connected to multiple sources of block storage, the storage array controller could only be connected to a single EBS volume if the storage array controller were configured to use EBS as its block-storage.

In the example method depicted in FIG. 10, one or more of the plurality of cloud computing instances with local storage may be coupled for data communications with a plurality of cloud computing instances that are each executing the storage controller application. Readers will appreciate that in some embodiments, because there are a plurality of cloud computing instances that are each executing the storage controller application, a storage controller application that is executing on a first cloud computing instance may serve as the primary controller whereas additional storage controller applications that are executing on additional cloud computing instances may serve as the secondary controllers that can take over for the primary controller upon the occurrence of some event (e.g., failure of the primary controller).

Figure 11:
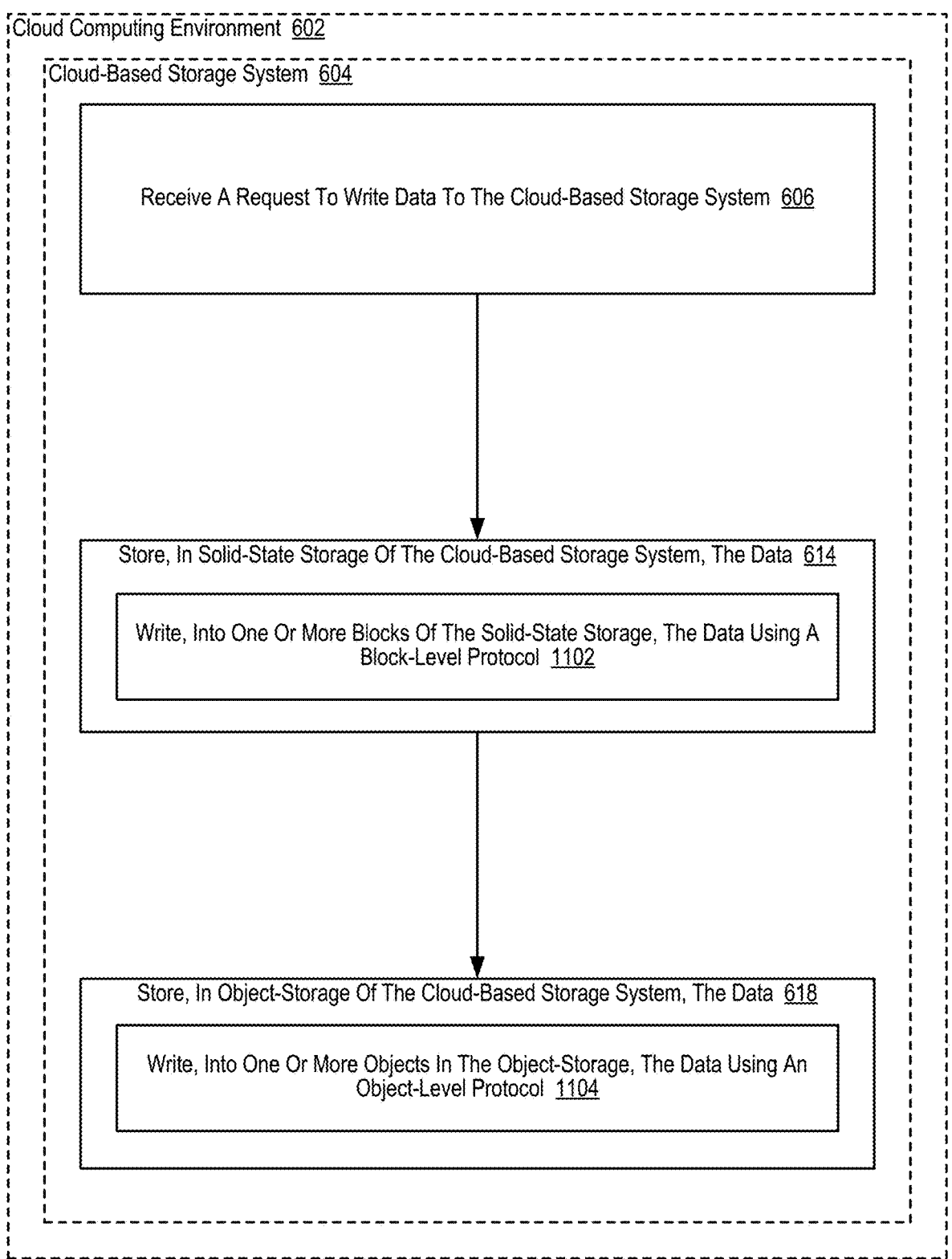
FIG. 11 sets forth a flow chart illustrating an additional example method of servicing I/O operations in a cloud-based storage system.

For further explanation, FIG. 11 sets forth a flow chart illustrating an additional example method of servicing I/O operations in a cloud-based storage system (604). The example method depicted in FIG. 11 is similar to the example method depicted in many of the figures above, as the example method depicted in FIG. 11 also includes receiving (606) a request to write data to the cloud-based storage system (604), storing (614) the data in block storage of the cloud-based storage system (604), and storing (618) the data in object storage of the cloud-based storage system (604).

In the example method depicted in FIG. 11, storing (614), in block storage of the cloud-based storage system, the data can include writing (1102), into one or more blocks of the block storage, the data using a block-level protocol. In the example method depicted in FIG. 11, the block storage may be embodied as one or more block storage devices such as NAND flash memory where data is stored in blocks that can each be used to store data of a maximum size (i.e., a block size). Data may be written (1102) to such storage devices using a block-level protocol such as, for example, iSCSI, Fibre Channel and FCOE (Fibre Channel over Ethernet), and so on. Readers will appreciate that by writing (1102) the data into one or more blocks of the block storage using a block-level protocol, the data that is written to the block storage of the cloud-based storage system is therefore stored in blocks.

In the example method depicted in FIG. 11, storing (618), in object storage of the cloud-based storage system, the data can include writing (1104), into one or more objects in the object storage, the data using an object-level protocol. In the example method depicted in FIG. 11, the object storage may be configured to manage data as objects, as opposed to other storage architectures like file systems which manage data as a file hierarchy, and block storage which manages data as blocks. Such object storage can be implemented at the device level (object storage device), the system level, the interface level, or in some other way. Data may be written (1104) to the object storage using an object-level protocol such as, for example, the SCSI command set for Object Storage Devices, RESTful/HTTP protocols, AWS S3 APIs, the Cloud Data Management Interface for accessing cloud storage, and others. Readers will appreciate that by writing (1104) one or more objects into the object storage using an object-level protocol, the data that is written to the object storage of the cloud-based storage system is therefore stored in objects-rather than blocks as was the case in the preceding paragraph.

In the example method depicted in FIG. 11, for each block of data, the data contained in a particular block may be written into a unique object. Readers will appreciate that each object that is written (1104) to object storage may include includes the data itself, as well as its associated metadata and each object may be associated with a globally unique identifier-rather than a file name and a file path, block number, and so on. As such, the data that is contained in a particular block may be written into a unique object in the sense that the unique object includes the data itself, metadata associated with the data, and a globally unique identifier. In such embodiments, the cloud-based storage system may therefore maintain a mapping from each block of data that is stored in the cloud-based storage system's block storage and each object that is stored in the cloud-based storage system's object storage. In some embodiments, each object may include the data that is contained in multiple blocks, but the data that is contained in multiple blocks need only be stored in a single object.

Figure 12:
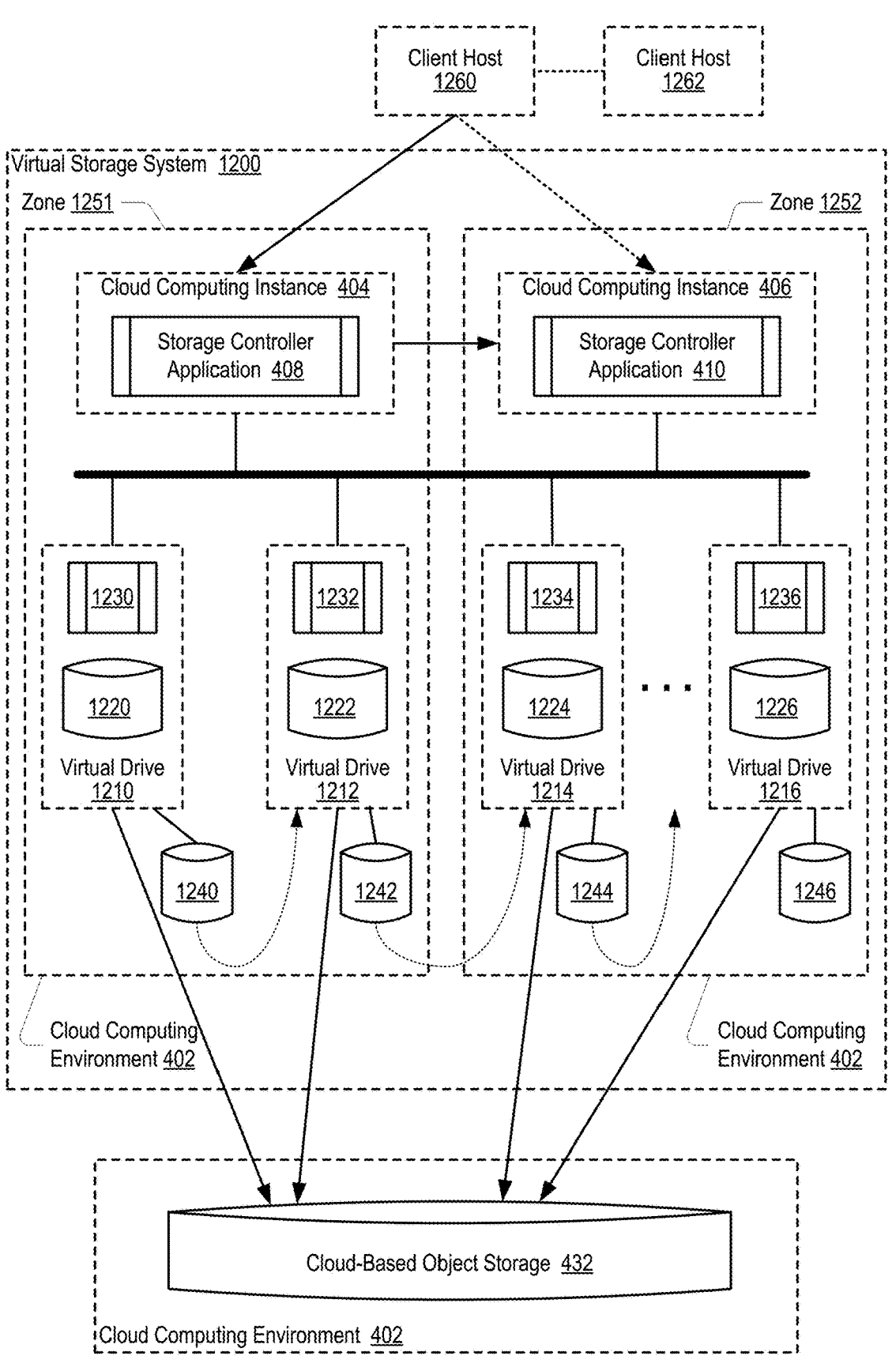
FIG. 12 illustrates an example virtual storage system architecture in accordance with some embodiments of the present disclosure.

For further explanation, FIG. 12 illustrates an example virtual storage system architecture 1200 in accordance with some embodiments. The virtual storage system architecture may include similar cloud-based computing resources as the cloud-based storage systems described above with reference to FIGS. 4-11.

As described above with reference to FIGS. 1A-3E, in some embodiments of a physical storage system, a physical storage system may include one or more controllers providing storage services to one or more hosts, and with the physical storage system including durable storage devices, such as solid state drives or hard disks, and also including some fast durable storage, such as NVRAM. In some examples, the fast durable storage may be used for staging or transactional commits or for speeding up acknowledgement of operation durability to reduce latency for host requests.

Generally, fast durable storage is often used for intent logging, fast completions, or quickly ensuring transactional consistency, where such (and similar) purposes are referred to herein as staging memory. Generally, both physical and virtual storage systems may have one or more controllers, and may have specialized storage components, such as in the case of physical storage devices, specialized storage devices.

Further, in some cases, in physical and virtual storage systems, staging memory may be organized and reorganized in a variety of ways, such as in examples described later. In some examples, in whatever way that memory components or memory devices are constructed, generated, or organized, there may be a set of storage system logic that executes to implement a set of advertised storage services and that stores bulk data for indefinite durations, and there may also be some quantity of staging memory.

In some examples, controller logic that operates a physical storage system, such as physical storage systems 1A-3E, may be carried out within a virtual storage system by providing suitable virtual components to, individually or in the aggregate, serve as substitutes for hardware components in a physical storage system—where the virtual components are configured to operate the controller logic and to interact with other virtual components that are configured to replace physical components other than the controller.

Continuing with this example, virtual components, executing controller logic, may implement and/or adapt high availability models used to keep a virtual storage system operating in case of failures. As another example, virtual components, executing controller logic, may implement protocols to keep the virtual storage system from losing data in the face of transient failures that may exceed what the virtual storage system may tolerate while continuing to operate.

In some implementations, and particularly with regard to the various virtual storage system architectures described with reference to FIGS. 12-17, a computing environment may include a set of available, advertised constructs that are typical to cloud-based infrastructures as service platforms, such as cloud infrastructures provided by Amazon Web Services™, Microsoft Azure™, and/or Google Cloud Platform™. In some implementations, example constructs, and construct characteristics within such cloud platforms may include:

Compute instances, where a compute instance may execute or run as virtual machines flexibly allocated to physical host servers;

Division of computing resources into separate geographic regions, where computing resources may be distributed or divided among separate, geographic regions, such that users within a same region or same zone as a given cloud computing resource may experience faster and/or higher bandwidth access as compared to users in a different region or different zone than computing resources;

Division of resources within geographic regions into "availability" zones with separate availability and survivability in cases of wide-scale data center outages, network failures, power grid failures, administrative mistakes, and so on. Further, in some examples, resources within a particular cloud platform that are in separate availability zones within a same geographic region generally have fairly high bandwidth and reasonably low latency between each other;

Local instance storage, such as hard drives, solid-state drives, rack-local storage, that may provide private storage to a compute instance. Other examples of local instance storage are described above with reference to FIGS. 4-11;

Block stores that are relatively high-speed and durable, and which may be connected to a virtual machine, but whose access may be migrated. Some examples include EBS (Elastic Block Store™) in AWS, Managed Disks in Microsoft Azure™, and Compute Engine persistent disks in Google Cloud Platform™. EBS in AWS operates within a single availability zone, but is otherwise reasonably reliable and available, and intended for long-term use by compute instances, even if those compute instances can move between physical systems and racks;

Object stores, such as Amazon S3™ or an object store using a protocol derived from, compatible with S3, or that has some similar characteristics to S3 (for example, Microsoft's Azure Blob Storage™). Generally, object stores are very durable, surviving widespread outages through inter-availability zone and cross-geography replication;

Cloud platforms, which may support a variety of object stores or other storage types that may vary in their combinations of capacity prices, access prices, expected latency, expected throughput, availability guarantees, or durability guarantees. For example, in AWS™, Standard and Infrequent Access S3 storage classes (referenced herein as standard and write-mostly storage classes) differ in availability (but not durability) as well as in capacity and access prices (with the infrequent access storage tier being less expensive on capacity, but more expensive for retrieval, and with $\frac{1}{10}$th the expected availability). Infrequent Access S3 also supports an even less expensive variant that is not tolerant to complete loss of an availability zone, which is referred to herein as a single-availability-zone durable store. AWS further supports archive tiers such as Glacier™ and Deep Glacier™ that provide their lowest capacity prices, but with very high access latency on the order of minutes to hours for Glacier, and up to 12 hours with limits on retrieval frequency for Deep Glacier. Glacier and Deep Glacier are referred to herein as examples of archive and deep archive storage classes;

Databases, and often multiple different types of databases, including high-scale key-value store databases with reasonable durability (similar to high-speed, durable block stores) and convenient sets of atomic update primitives. Some examples of durable key-value databases include AWS DynamoDB™, Google Cloud Platform Big Table™, and/or Microsoft Azure's CosmoDB™; and Dynamic functions, such as code snippets that can be configured to run dynamically within the cloud platform infrastructure in response to events or actions associated with the configuration. For example, in AWS, these dynamic functions are called AWS Lambdas™, and Microsoft Azure and Google Cloud Platform refers to such dynamic functions as Azure Functions™ and Cloud Functions™, respectively.

In some implementations, local instance storage is not intended to be provisioned for long-term use, and in some examples, local instance storage may not be migrated as virtual machines migrate between host systems. In some cases, local instance storage may also not be shared between virtual machines, and may come with few durability guarantees due to their local nature (likely surviving local power and software faults, but not necessarily more wide spread failures). Further, in some examples, local instance storage, as compared to object storage, may be reasonably inexpensive and may not be billed based on I/Os issued against them, which is often the case with the more durable block storage services.

In some implementations, objects within object stores are easy to create (for example, a web service PUT operation to create an object with a name within some bucket associated with an account) and to retrieve (for example, a web service GET operation), and parallel creates and retrievals across a sufficient number of objects may yield enormous bandwidth. However, in some cases, latency is generally very poor, and modifications or replacement of objects may complete in unpredictable amounts of time, or it may be difficult to determine when an object is fully durable and consistently available across the cloud platform infrastructure. Further, generally, availability, as opposed to durability, of object stores is often low, which is often an issue with many services running in cloud environments.

In some implementations, as an example baseline, a virtual storage system may include one or more of the following virtual components and concepts for constructing, provisioning, and/or defining a virtual storage system built on a cloud platform:

Virtual controller, such as a virtual storage system controller running on a compute instance within a cloud platform's infrastructure or cloud computing environment. In some examples, a virtual controller may run on virtual machines, in containers, or on bare metal servers;

Virtual drives, where a virtual drive may be a specific storage object that is provided to a virtual storage system controller to represent a dataset; for example, a virtual drive may be a volume or an emulated disk drive that within the virtual storage system may serve analogously to a physical storage system "storage device". Further, virtual drives may be provided to virtual storage system controllers by "virtual drive servers";

Virtual drive servers may be implemented by compute instances, where virtual drive servers may present storage, such as virtual drives, out of available components provided by a cloud platform, such as various types of local storage options, and where virtual drive servers implement logic that provides virtual drives to one or more virtual storage system controllers, or in some cases, provides virtual drives to one or more virtual storage systems.

Staging memory, which may be fast and durable, or at least reasonably fast and reasonably durable, where reasonably durable may be specified according to a durability metric, and where reasonably fast may be specified according to a performance metric, such as IOPS;

Virtual storage system dataset, which may be a defined collection of data and metadata that represents coherently managed content that represents a collection of file systems, volumes, objects, and other similar addressable portions of memory;

Object storage, which may provide back-end, durable object storage to the staging memory. As illustrated in FIG. 12, cloud-based object storage 432 may be managed by the virtual drives 1210-1216;

Segments, which may be specified as medium-sized chunks of data. For example, a segment may be defined to be within a range of 1 MB-64 MB, where a segment may hold a combination of data and metadata; and Virtual storage system logic, which may be a set of algorithms running at least on the one or more virtual controllers 408, 410, and in some cases, with some virtual storage system logic also running on one or more virtual drives 1210-1216.

In some implementations, a virtual controller may take in or receive I/O operations and/or configuration requests from client hosts 1260, 1262 (possibly through intermediary servers, not depicted) or from administrative interfaces or tools, and then ensure that I/O requests and other operations run through to completion.

In some examples, virtual controllers may present file systems, block-based volumes, object stores, and/or certain kinds of bulk storage databases or key/value stores, and may provide data services such as snapshots, replication, migration services, provisioning, host connectivity management, deduplication, compression, encryption, secure sharing, and other such storage system services.

In the example virtual storage system 1200 architecture illustrated in FIG. 12, a virtual storage system 1200 includes two virtual controllers, where one virtual controller is running within one time zone, time zone 1251, and another virtual controller is running within another time zone, time zone 1252. In this example, the two virtual controllers are depicted as, respectively, storage controller application 408 running within cloud computing instance 404 and storage controller application 410 running within cloud computing instance 406.

In some implementations, a virtual drive server, as discussed above, may represent to a host something similar to physical storage device, such as a disk drive or a solid-state drive, where the physical storage device is operating within the context of a physical storage system.

However, while in this example, the virtual drive presents similarly to a host as a physical storage device, the virtual drive is implemented by a virtual storage system architecture—where the virtual storage system architecture may be any of those depicted among FIGS. 4-16. Further, in contrast to virtual drives that have as an analog a physical storage device, as implemented within the example virtual storage system architectures, a virtual drive server, may not have an analog within the context of a physical storage system. Specifically, in some examples, a virtual drive server may implement logic that goes beyond what is typical of storage devices in physical storage systems, and may in some cases rely on atypical storage system protocols between the virtual drive server and virtual storage system controllers that do not have an analog in physical storage systems. However, conceptually, a virtual drive server may share similarities to a scale-out shared-nothing or software-defined storage systems.

In some implementations, with reference to FIG. 12, the respective virtual drive servers 1210-1216 may implement respective software applications or daemons 1230-1236 to provide virtual drives whose functionality is similar or even identical to that of a physical storage device-which allows for greater case in porting storage system software or applications that are designed for physical storage systems. For example, they could implement a standard SAS, SCSI or NVMe protocol, or they could implement these protocols but with minor or significant non-standard extensions.

In some implementations, with reference to FIG. 12, staging memory may be implemented by one or more virtual drives 1210-1216, where the one or more virtual drives 1210-1216 store data within respective block-store volumes 1240-1246 and local storage 1220-1226. In this example, the block storage volumes may be AWS EBS volumes that may be attached, one after another, as depicted in FIG. 12, to two or more other virtual drives. As illustrated in FIG. 12, block storage volume 1240 is attached to virtual drive 1212, block storage volume 1242 is attached to virtual drive 1214, and so on.

In some implementations, a segment may be specified to be part of an erasure coded set, such as based on a RAID-style implementation, where a segment may store calculated parity content based on erasure codes (e.g., RAID-5 P and Q data) computed from content of other segments. In some examples, contents of segments may be created once, and after the segment is created and filled in, not modified until the segment is discarded or garbage collected.

In some implementations, virtual storage system logic may also run from other virtual storage system components, such as dynamic functions. Virtual storage system logic may provide a complete implementation of the capabilities and services advertised by the virtual storage system 1200, where the virtual storage system 1200 uses one or more available cloud platform components, such as those described above, to implement these services reliably and with appropriate durability.

While the example virtual storage system 1200 illustrated in FIG. 12 includes two virtual controllers, more generally, other virtual storage system architectures may have more or fewer virtual controllers, as illustrated in FIGS. 13-16. Further, in some implementations, and similar to the physical storage systems described in FIGS. 1A-4, a virtual storage system may include an active virtual controller and one or more passive virtual controllers.

Figure 13:
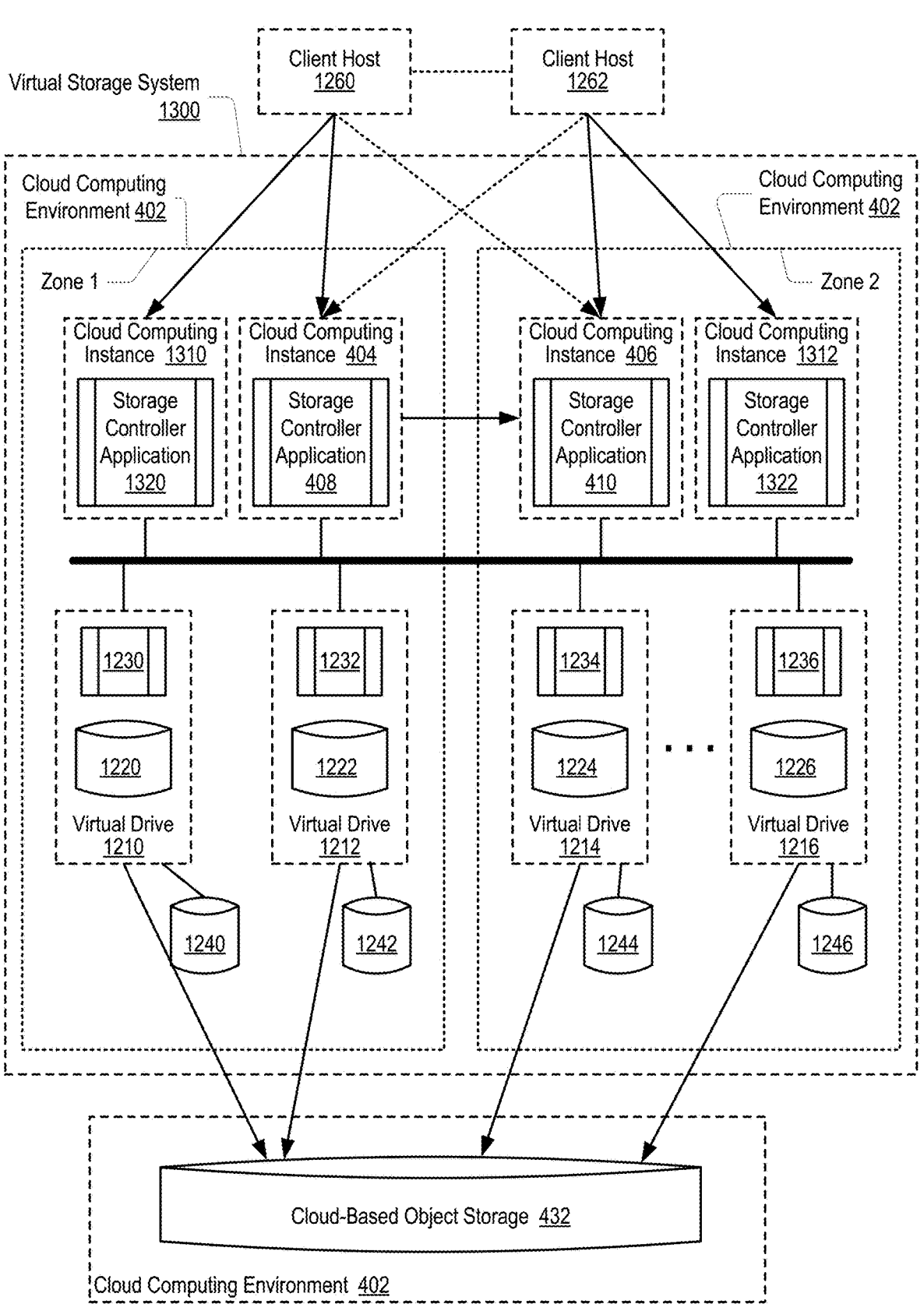
FIG. 13 illustrates an additional example virtual storage system architecture in accordance with some embodiments of the present disclosure.

For further explanation, FIG. 13 illustrates an example virtual storage system architecture 1300 in accordance with some embodiments. The virtual storage system architecture may include similar cloud-based computing resources as the cloud-based storage systems described above with reference to FIGS. 4-12.

In this implementation, a virtual storage system may run virtual storage system logic, as specified above with reference to FIG. 12, concurrently on multiple virtual controllers, such as by dividing up a dataset or by careful implementation of concurrent distributed algorithms. In this example, the multiple virtual controllers 1320, 408, 410, 1322 are implemented within respective cloud computing instances 1310, 404, 406, 1312.

As described above with reference to FIG. 12, in some implementations, a particular set of hosts may be directed preferentially or exclusively to a subset of virtual controllers for a dataset, while a particular different set of hosts may be directed preferentially or exclusively to a different subset of controllers for that same dataset. For example, SCSI ALUA (Asymmetric Logical Unit Access), or NVMe ANA (Asymmetric Namespace Access) or some similar mechanism, could be used to establish preferred (sometimes called "optimized") path preferences from one host to a subset of controllers where traffic is generally directed to the preferred subset of controllers but where, such as in the case of faulted requests or network failures or virtual storage system controller failures, that traffic could be redirected to a different subset of virtual storage system controllers. Alternately, SCSI/NVMe volume advertisements or network restrictions, or some similar alternative mechanism, could force all traffic from a particular set of hosts exclusively to one subset of controllers, or could force traffic from a different particular set of hosts to a different subset of controllers.

As illustrated in FIG. 13, a virtual storage system may preferentially or exclusively direct I/O requests from host 1260 to virtual storage controllers 1320 and 408 with storage controllers 410 and perhaps 1322 potentially being available to host 1260 for use in cases of faulted requests, and may preferentially or exclusively direct I/O requests from host 1262 to virtual storage controllers 410 and 1322 with storage controllers 408 and perhaps 1320 potentially being available to host 12622 for use in cases of faulted requests. In some implementations, a host may be directed to issue I/O requests to one or more virtual storage controllers within the same availability zone as the host, with virtual storage controllers in a different availability zone from the host being available for use in cases of faults.

Figure 14:
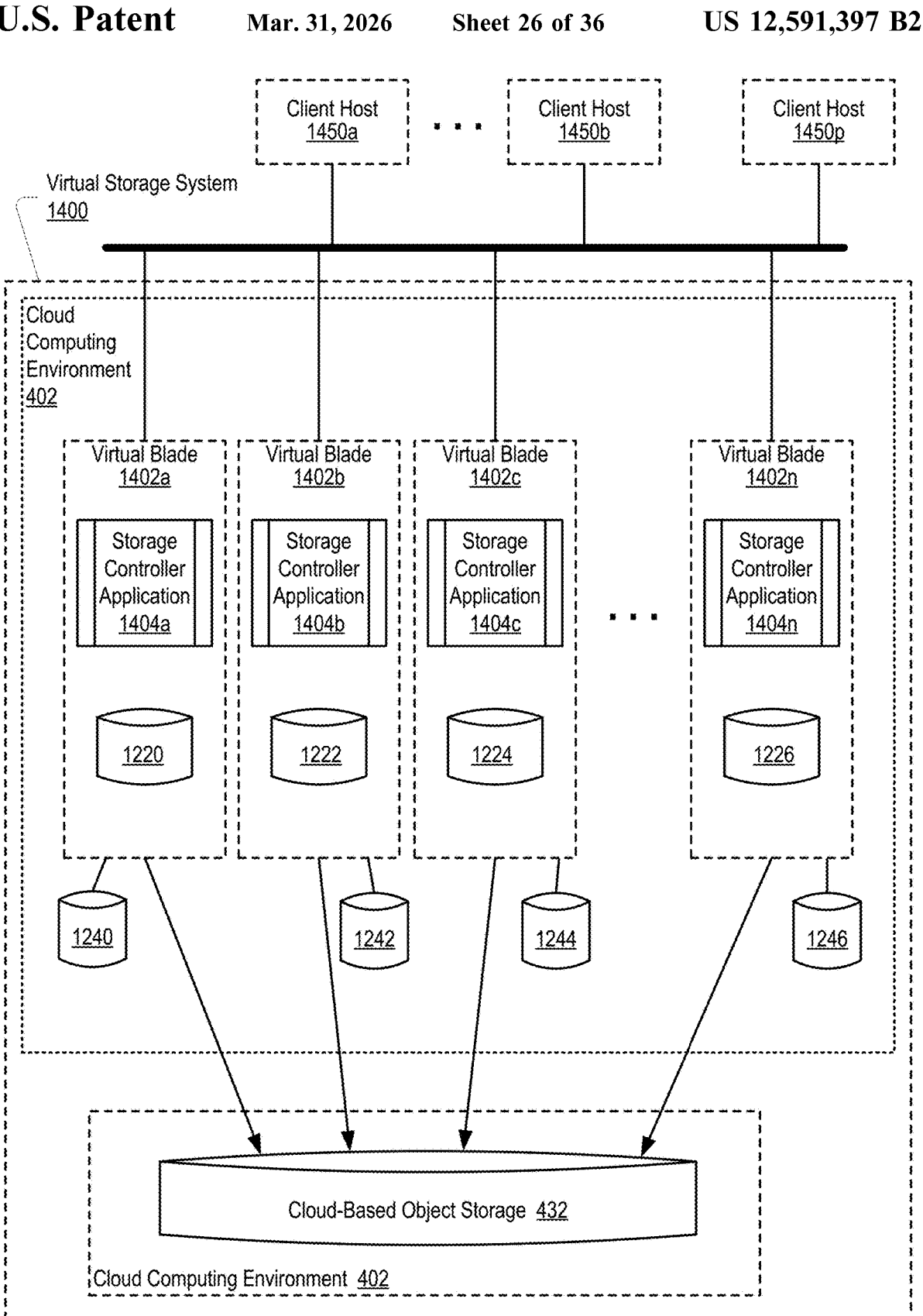
FIG. 14 illustrates an additional example virtual storage system architecture in accordance with some embodiments of the present disclosure.

For further explanation, FIG. 14 illustrates an example virtual storage system architecture 1400 in accordance with some embodiments. The virtual storage system architecture may include similar cloud-based computing resources as the cloud-based storage systems described above with reference to FIGS. 4-13.

In some implementations, boundaries between virtual controllers and virtual drive servers that host virtual drives may be flexible. Further, in some examples, the boundaries between virtual components may not be visible to client hosts 1450a-1450p, and client hosts 1450a-1450p may not detect any distinction between two differently architected virtual storage systems that provides a same set of storage system services.

For example, virtual controllers and virtual drives may be merged into a single virtual entity that may provide similar functionality to a traditional, blade-based scale-out storage system. In this example, virtual storage system 1400 includes n virtual blades, virtual blades 1402a-1402n, where each respective virtual blade 1402a-1402n may include a respective virtual controller 1404a-1404n, and also include respective local storage 1220-1226, 1240-1246, but where the storage function may make use of a platform provided object store as might be the case with virtual drive implementations described previously.

In some implementations, because virtual drive servers support general purpose compute, this virtual storage system architecture supports functions migrating between virtual storage system controllers and virtual drive servers. Further, in other cases, this virtual storage system architecture supports other kinds of optimizations, such as optimizations described above that may be performed within staging memory. Further, virtual blades may be configured with varying levels of processing power, where the performance specifications of a given one or more virtual blades may be based on expected optimizations to be performed.

Figure 15:
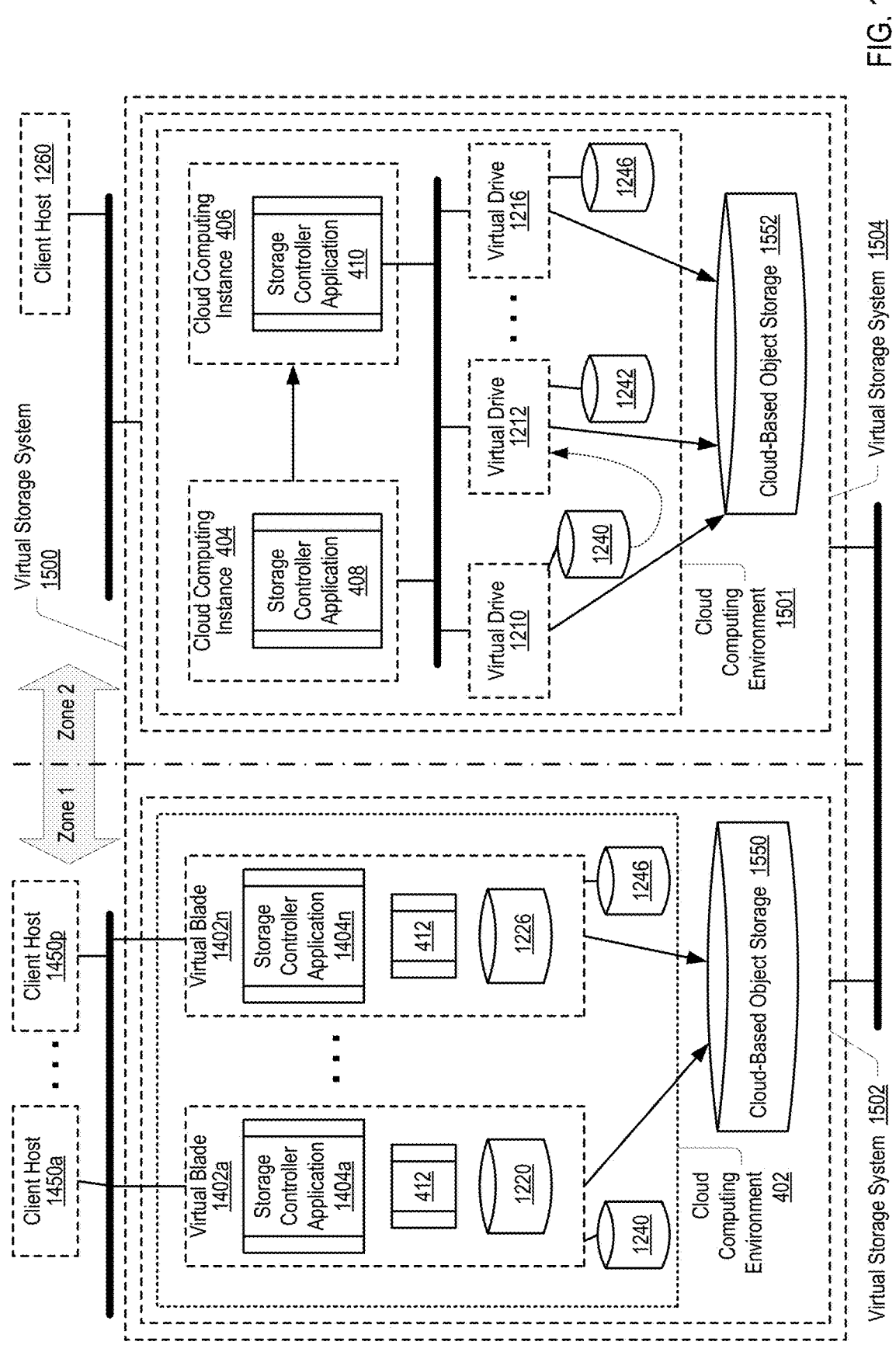
FIG. 15 illustrates an additional example virtual storage system architecture in accordance with some embodiments of the present disclosure.

For further explanation, FIG. 15 illustrates an example virtual storage system architecture 1500 in accordance with some embodiments. The virtual storage system architecture may include similar cloud-based computing resources as the cloud-based storage systems described above with reference to FIGS. 4-14.

In this implementation, a virtual storage system 1500 may be adapted to different availability zones, where such a virtual storage system 1500 may use cross-storage system synchronous replication logic to isolate as many parts of an instance of a virtual storage system as possible within one availability zone. For example, the presented virtual storage system 1500 may be constructed from a first virtual storage system 1502 in one availability zone, zone 1, that synchronously replicates data to a second virtual storage system 1504 in another availability zone, zone 2, such that the presented virtual storage system can continue running and providing its services even in the event of a loss of data or availability in one availability zone or the other. Such an implementation could be further implemented to share use of durable objects, such that the storing of data into the object store is coordinated so that the two virtual storage systems do not duplicate the stored content. Further, in such an implementation, the two synchronously replicating storage systems may synchronously replicate updates to the staging memories and perhaps local instance stores within each of their availability zones, to greatly reduce the chance of data loss, while coordinating updates to object stores as a later asynchronous activity to greatly reduce the cost of capacity stored in the object store.

In this example, virtual storage system 1504 is implemented within cloud computing environments 1501. Further, in this example, virtual storage system 1502 may use cloud-based object storage 1550, and virtual storage system 1504 may use cloud-based storage 1552, where in some cases, such as AWS S3, the different object storages 1550, 1552 may be a same cloud object storage with different buckets.

Continuing with this example, virtual storage system 1502 may, in some cases, synchronously replicate data to other virtual storage systems, or physical storage systems, in other availability zones (not depicted).

In some implementations, the virtual storage system architecture of virtual storage systems 1502 and 1504 may be distinct, and even incompatible—where synchronous replication may depend instead on synchronous replication models being protocol compatible. Synchronous replication is described in greater detail above with reference to FIGS. 3D and 3E.

In some implementations, virtual storage system 1502 may be implemented similarly to virtual storage system 1400, described above with reference to FIG. 14, and virtual storage system 1504 may be implemented similarly to virtual storage system 1200, described above with reference to FIG. 12.

Figure 16:
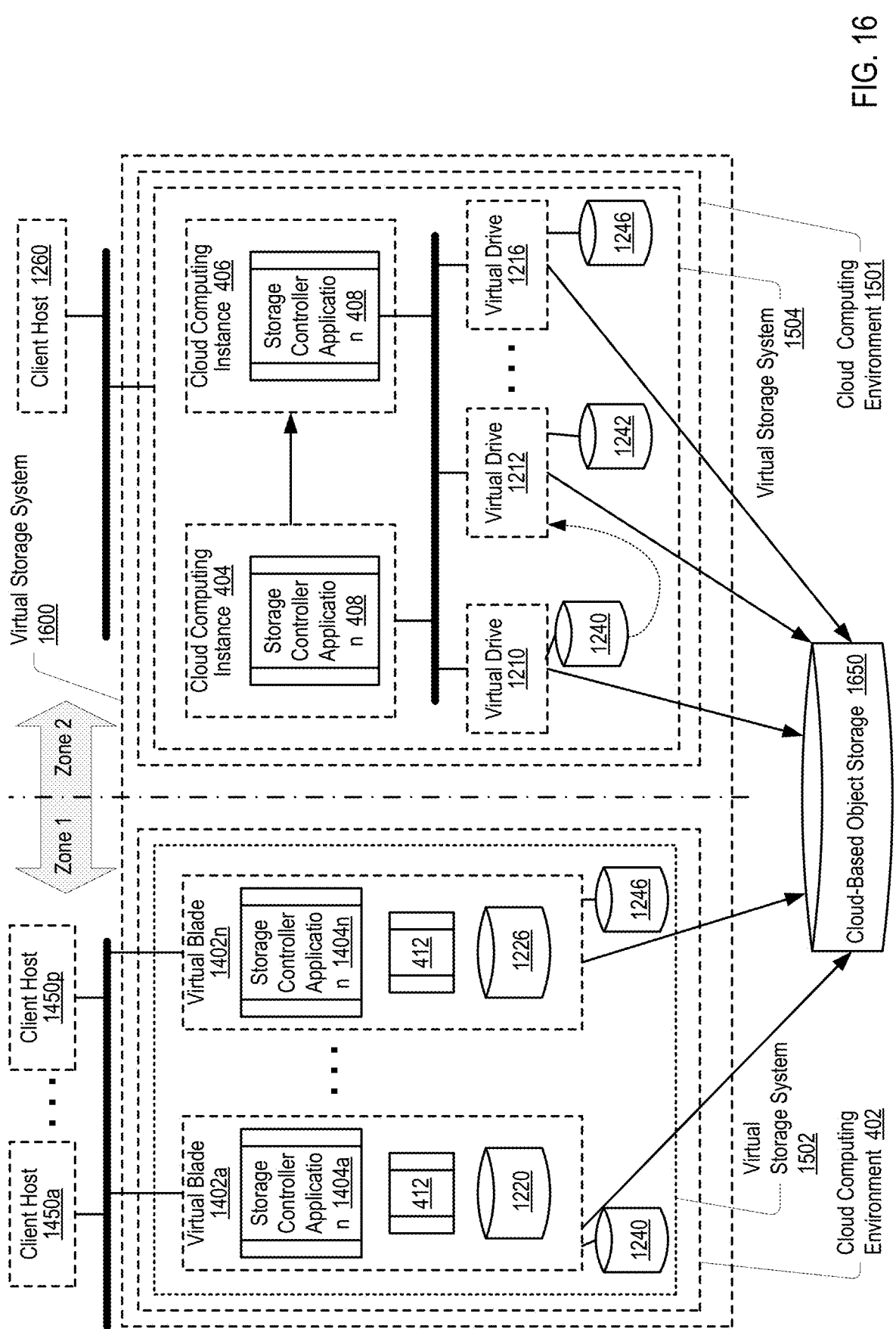
FIG. 16 illustrates an additional example virtual storage system architecture in accordance with some embodiments of the present disclosure.

For further explanation, FIG. 16 illustrates an example virtual storage system architecture 1500 in accordance with some embodiments. The virtual storage system architecture may include similar cloud-based computing resources as the cloud-based storage systems described above with reference to FIGS. 4-15.

In some implementations, similar to the example virtual storage system 1500 described above with reference to FIG. 15, a virtual storage system 1600 may include multiple virtual storage systems 1502, 1504 that coordinate to perform synchronous replication from one virtual storage system to another virtual storage system.

However, in contrast to the example virtual storage system 1500 described above, the virtual storage system 1600 illustrated in FIG. 16 provides a single cloud-based object storage 1650 that is shared among the virtual storage systems 1502, 1504.

In this example, the shared cloud-based object storage 1650 may be treated as an additional data replica target, with delayed updates using mechanisms and logic associated with consistent, but non-synchronous replication models. In this way, a single cloud-based object storage 1650 may be shared consistently between multiple, individual virtual storage systems 1502, 1504 of a virtual storage system 1600.

In each of these example virtual storage systems, virtual storage system logic may generally incorporate distributed programming concepts to carry out the implementation of the core logic of the virtual storage system. In other words, as applied to the virtual storage systems, the virtual system logic may be distributed between virtual storage system controllers, scale-out implementations that combine virtual system controllers and virtual drive servers, and implementations that split or otherwise optimize processing between the virtual storage system controllers and virtual drive servers.

Figure 17:
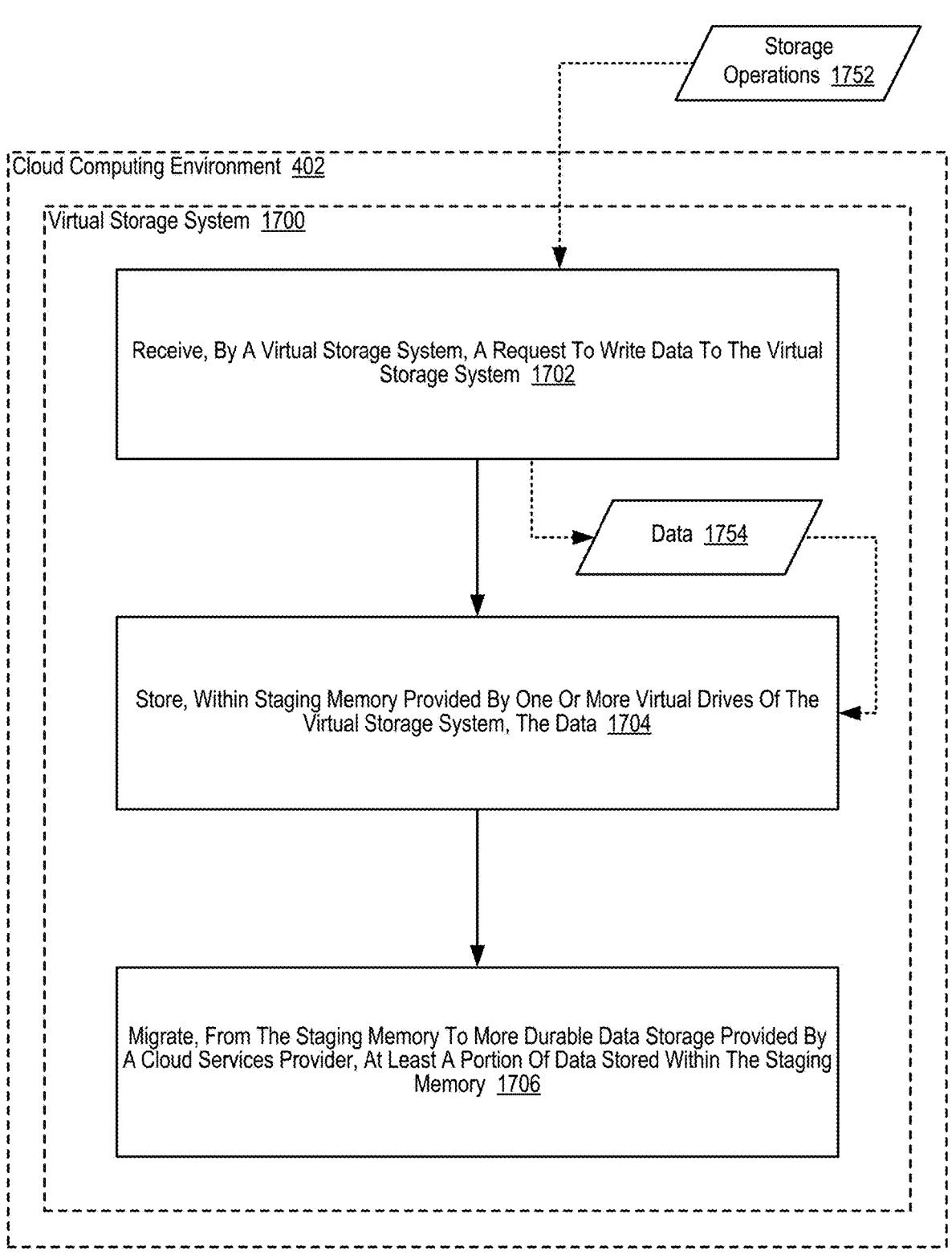
FIG. 17 sets forth a flow chart illustrating an additional example method of servicing I/O operations in a virtual storage system.

For further explanation, FIG. 17 sets forth a flow chart illustrating an example method of data flow within in a virtual storage system 1700. The example method depicted in FIG. 17 may be implemented on any of the virtual storage systems described above with reference to FIGS. 12-16. In other words, virtual storage system 1700 may be implemented by either virtual storage system 1200, 1300, 1400, 1500, or 1600.

As depicted in FIG. 17, the example method includes receiving (1702), by a virtual storage system 1700, a request to write data to the virtual storage system 1700; storing (1704), within staging memory provided by one or more virtual drives of the virtual storage system 1700, the data 1754; and migrating (1706), from the staging memory to more durable data storage provided by a cloud service provider, at least a portion of data stored within the staging memory.

Receiving (1702), by the virtual storage system 1700, the request to write data to the virtual storage system 1700 may be carried out as described above with reference to FIGS. 4-16, where the data may be included within one or more received storage operations 1752, and the request may be received using one or more communication protocols, or one or more API calls provided by a cloud computing environment 402 that is hosting the virtual storage system 1700.

Storing (1704), within staging memory provided by one or more virtual drives of the virtual storage system 1700, the data 1754 may be carried out as described above with reference to virtual storage systems 1200-1600, where a virtual storage system, for example, virtual storage system 1200, receives data from a client host 1260 at a virtual controller 408, 410, and where the virtual controller 408, 410 stores the data among the local storage of the layer of virtual drives 1210-1216. Staging memory provided by virtual drives is described in greater detail above with reference to FIG. 12.

Migrating (1706), from the staging memory to more durable data storage provided by a cloud service provider, at least a portion of data stored within the staging memory may be carried out as described above with reference to FIGS. 4-16, where data is migrated from staging memory to a cloud-based object storage.

Additional examples of receiving data and storing the data within staging memory, and subsequently migrating data from staging memory to more durable storage are described within co-pending patent application Ser. No. 16/524,861, which is incorporated in its entirely for all purposes herein. Specifically, all of the migration techniques described in co-pending patent application Ser. No. 16/524,861, which describe storing data within staging memory, also referred to as a first tier of storage, and optionally processing, modifying, or optimizing the data within the staging memory before, based on a migration event, the staging memory data is migrated to more durable memory, or cloud-based object storage.

Figure 18:
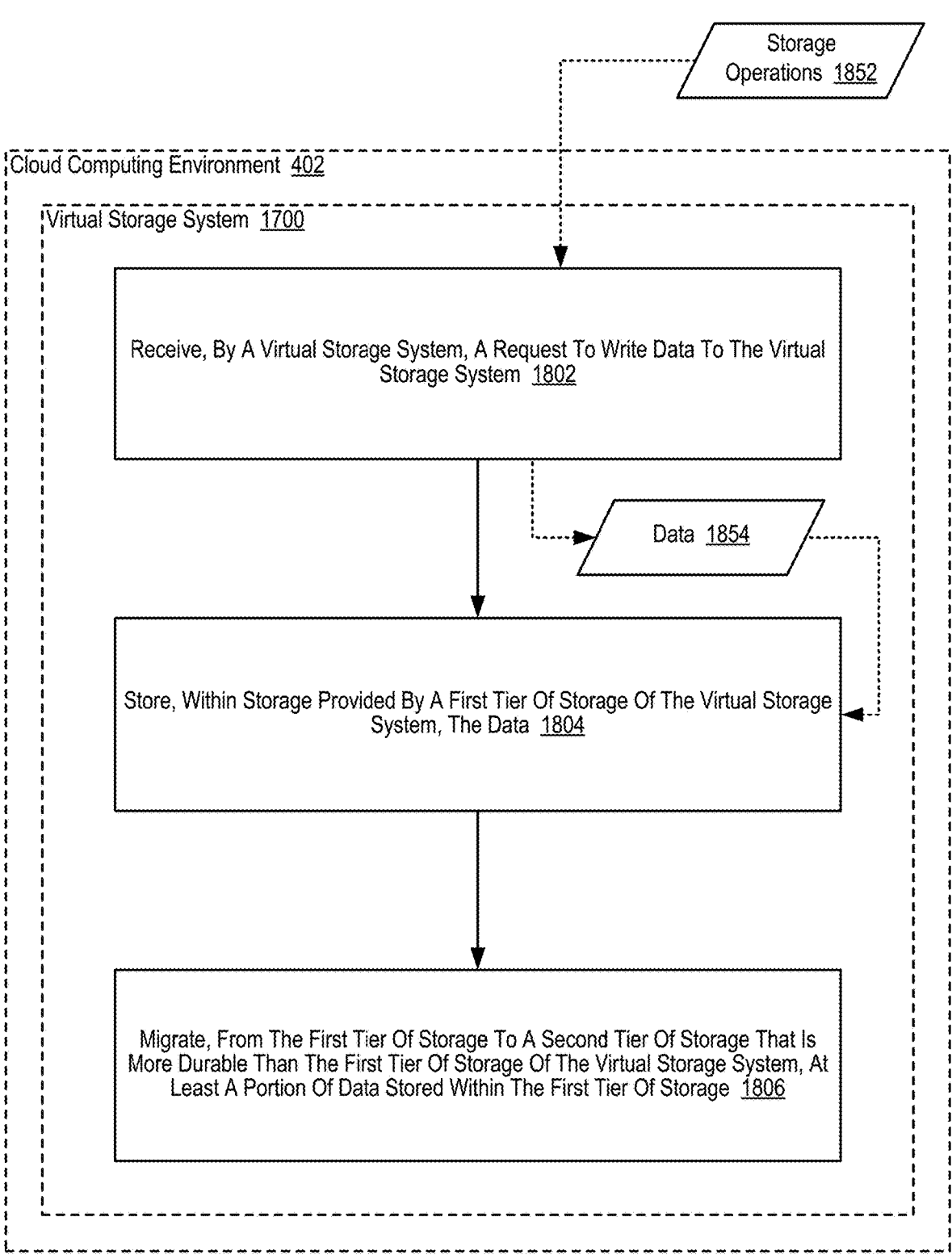
FIG. 18 sets forth a flow chart illustrating an additional example method of servicing I/O operations in a virtual storage system.

For further explanation, FIG. 18 sets forth a flow chart illustrating an example method of data flow within in a virtual storage system 1700. The example method depicted in FIG. 18 may be implemented by one of the virtual storage systems described above with reference to FIGS. 4-16. In other words, virtual storage system 1700 may be implemented at least by either virtual storage system 1200, 1300, 1400, 1500, 1502, 1504, or 1600, either individually or by a combination of individual features.

The above example with regard to FIG. 18 describes an implementation of data flow through storage tiers of a virtual storage system, and more specifically, data flowing from staging memory to more durable object storage. However, more generally, data flow through a virtual storage system may occur in stages between any pair of multiple, different tiers of storage. Specifically, in this example, different tiers of storage may be: (1) virtual controller storage, (2) staging memory for transactional consistency and fast completions, (3) storage within virtual drives provided by virtual drive servers, (4) virtual drive server local instance store(s), and (5) an object store that is provided by a cloud services provider.

As depicted in FIG. 18, the example method includes: receiving (1802), by a virtual storage system 1700, a request to write data to the virtual storage system 1700; storing (1804), within storage provided by a first tier of storage of the virtual storage system 1700, the data 1854; and migrating (1806), from the first tier of storage to a second tier of storage, at least a portion of data stored within the first tier of storage.

Receiving (1802), by the virtual storage system 1700, the request to write data 1854 to the virtual storage system 1700 may be carried out as described above with reference to FIGS. 4-17, where the data may be included within one or more received storage operations 1852 from a host computer or application, and the request may be received using one or more communication protocols, or one or more API calls provided by a cloud computing environment 402 that is hosting the virtual storage system 1700.

Storing (1804), within storage provided by a first tier of storage of the virtual storage system 1700, the data 1854 may be carried out as described above with reference to FIGS. 4-17, where one or more virtual controllers may be configured to receive and handle storage operations 1852, including processing write requests and storing corresponding write data into one or more storage tiers of the virtual storage system 1700. Five example storage tiers of the virtual storage system are described above, with reference to the beginning description for FIG. 18.

Migrating (1806), from the first tier of storage to a second tier of storage, at least a portion of data stored within the first tier of storage may be carried as described above with regard to movement of data through various tiers of storage. Further, in some examples, as described above, data may be transformed in various ways at one or of the storage tiers, including deduplication, overwriting, aggregating into segments, among other transformations, generating recovery metadata or continuous-data-protection metadata, as data flows from the one or more virtual controllers through the virtual storage system 1700 into backend storage, including one or more of object storage and any of the storage class options described below.

A virtual storage system may dynamically adjust cloud platform resource usage in response to changes in cost requirements based upon cloud platform pricing structures, as described in greater detail below.

Under various conditions, budgets, capacities, usage and/ or performance needs may change, and a user may be presented with cost projections and a variety of costing scenarios that may include increasing a number of server or storage components, the available types of components, the platforms that may provide suitable components, and/or models for both how alternatives to a current setup might work and cost in the future. In some examples, such cost projections may include costs of migrating between alternatives given that network transfers incur a cost, where migrations tend to include administrative overhead, and for a duration of a transfer of data between types of storage or vendors, additional total capacity may be needed until necessary services are fully operational.

Further, in some implementations, instead of pricing out what is being used and providing options for configurations based on potential costs, a user may, instead, provide a budget, or otherwise specify an expense threshold, and the storage system service may generate a virtual storage system configuration with specified resource usage such that the storage system service operates within the budget or expense threshold.

Continuing with this example of a storage system service operating within a budget or expense threshold—with regard to compute resources, while limiting compute resources limits performance, costs may be managed based on modifying configurations of virtual application servers, virtual storage system controllers, and other virtual storage system components by adding, removing, or replacing with faster or slower virtual storage system components. In some examples, if costs or budgets are considered over given lengths of time, such as monthly, quarterly, or yearly billing, then by ratcheting down the cost of virtual compute resources in response to lowered workloads, more compute resources may be available in response to increases in workloads.

Further, in some examples, in response to determining that given workloads may be executed at flexible times, those workloads may be scheduled to execute during periods of time that are less expensive to operate or initiate compute resources within the virtual storage system. In some examples, costs and usage may be monitored over the course of a billing period to determine whether usage earlier in the billing period may affect the ability to run at expected or acceptable performance levels later in the billing period, or whether lower than expected usage during parts of a billing period suggest there is sufficient budget remaining to run optional work or to suggest that renegotiating terms would reduce costs.

Continuing with this example, such a model of dynamic adjustments to a virtual storage system in response to cost or resource constraints may be extend from compute resources to also include storage resources. However, a different consideration for storage resources is that storage resources have less elastic costs than compute resources because stored data continues to occupy storage resources over a given period of time.

Further, in some examples, there may be transfer costs within cloud platforms associated with migrating data between storage services that have different capacity and transfer prices. Each of these costs of maintaining virtual storage system resources must be considered and may serve as a basis for configuring, deploying, and modifying compute and/or storage resources within a virtual storage system.

In some cases, the virtual storage system may adjust in response to storage costs based on cost projections that may include comparing continuing storage costs using existing resources as compared to a combination of transfer costs of the storage content and storage costs of less expensive storage resources (such as storage provided by a different cloud platform, or to or from storage hardware in customer-managed data centers, or to or from customer-managed hardware kept in a collocated shared management data center). In this way, over a given time span that is long enough to support data transfers, and in some cases based on predictable use patterns, a budget limit-based virtual storage system model may adjust in response to different cost or budget constraints or requirements.

In some implementations, as capacity grows in response to an accumulation of stored data, and as workloads, over a period of time, fluctuate around some average or trend line, a dynamically configurable virtual storage system may calculate whether a cost of transferring an amount of data to some less expensive type of storage class or less expensive location of storage may be possible within a given budget or within a given budget change. In some examples, the virtual storage system may determine storage transfers based on costs over a period of time that includes a billing cycle or multiple billing cycles, and in this way, preventing a budget or cost from being exceeded in a subsequent billing cycle.

In some implementations, a cost managed or cost constrained virtual storage system, in other words, a virtual storage system that reconfigures itself in response to cost constraints or other resource constraints, may also make use of write-mostly, archive, or deep archive storage classes that are available from cloud infrastructure providers. Further, in some cases, the virtual storage system may operate in accordance with the models and limitations described elsewhere with regard to implementing a storage system to work with differently behaving storage classes.

For example, a virtual storage system may make automatic use of a write-mostly storage class based on a determination that a cost or budget may be saved and reused for other purposes if data that is determined to have a low likelihood of access is consolidated, such as into segments that consolidate data with similar access patterns or similar access likelihood characteristics.

Further, in some cases, consolidated segments of data may then be migrated to a write-mostly storage class, or other lower cost storage class. In some examples, use of local instance stores on virtual drives may result in cost reductions that allow virtual storage system resource adjustments that result in reducing costs to satisfy cost or budget change constraints. In some cases, the local instance stores may use write-mostly object stores as a backend, and because read load is often taken up entirely by the local instance stores, the local instance stores may operate mostly as a cache rather than storing complete copies of a current dataset.

In some examples, a single-availability, durable store may also be used if a dataset may be identified that is not required or expected to survive loss of an availability zone, and such use may serve as a cost savings basis in dynamically reconfiguring a virtual storage system. In some cases, use of a single-availability zone for a dataset may include an explicit designation of the dataset, or indirect designation through some storage policy.

Further, the designation or storage policy may also include an association with a specific availability zone; however, in some cases, the specific availability zone may be determined by a dataset association with, for example, host systems that are accessing a virtual storage system from within a particular availability zone. In other words, in this example, the specific availability zone may be determined to be a same availability zone that includes a host system.

In some implementations, a virtual storage system may base a dynamic reconfiguration on use of archive or deep archive storage classes, if the virtual storage system is able to provide or satisfy performance requirements while storage operations are limited by the constraints of archive and/or deep archive storage classes. Further, in some cases, transfer of old snapshot or continuous data protection datasets, or other datasets that are no longer active, may be enabled to be transferred to archive storage classes based on a storage policy specifying a data transfer in response to a particular activity level, or based on a storage policy specify a data transfer in response to data not being accessed for a specified period of time. In other examples, the virtual storage system may transfer data to an archive storage class in response to a specific user request.

Further, given that retrieval from an archive storage class may take minutes, hours, or days, users of the particular dataset being stored in an archive or deep archive storage class may be requested by the virtual storage system to provide specific approval of the time required to retrieve the dataset. In some examples, in the case of using deep archive storage classes, there may also be limits on how frequently data access is allowed, which may put further constraints on the circumstances in which the dataset may be stored in archive or deep archive storage classes.

Implementing a virtual storage system to work with differently behaving storage classes may be carried out using a variety of techniques, as described in greater detail below.

In various implementations, some types of storage, such as a write-mostly storage class may have lower prices for storing and keeping data than for accessing and retrieving data. In some examples, if data may be identified or determined to be rarely retrieved, or retrieved below a specified threshold frequency, then costs may be reduced by storing the data within a write-mostly storage class. In some cases, such a write-mostly storage class may become an additional tier of storage that may be used by virtual storage systems with access to one or more cloud infrastructures that provide such storage classes.

For example, a storage policy may specify that a write-mostly storage class, or other archive storage class, may be used for storing segments of data from snapshots, checkpoints, or historical continuous data protection datasets that have been overwritten or deleted from recent instances of the datasets they track. Further, in some cases, these segments may be transferred based on exceeding a time limit without being accessed, where the time limit may be specified in a storage policy, and where the time limit corresponds to a low likelihood of retrieval-outside of inadvertent deletion or corruption that may require access to an older historical copy of a dataset, or a fault or larger-scale disaster that may require some forensic investigation, a criminal event, an administrative error such as inadvertently deleting more recent data or the encryption or deletion or a combination of parts or all of a dataset and its more recent snapshots, clones, or continuous data protection tracking images as part of a ransomware attack.

In some implementations, use of a cloud-platform write-mostly storage class may create cost savings that may then be used to provision compute resources to improve performance of the virtual storage system. In some examples, if a virtual storage system tracks and maintains storage access information, such as using an age and snapshot/clone/continuous-data-protection-aware garbage collector or segment consolidation and/or migration algorithm, then the virtual storage system may use a segment model as part of establishing efficient metadata references while minimizing an amount of data transferred to the mostly-write storage class.

Further, in some implementations, a virtual storage system that integrates snapshots, clones, or continuous-data-protection tracking information may also reduce an amount of data that may be read back from a write-mostly storage repository as data already resident in less expensive storage classes, such as local instance stores on virtual drives or objects stored in a cloud platform's standard storage class, may be used for data that is still available from these local storage sources and has not been overwritten or deleted since the time of a snapshot, clone, or continuous-data-protection recovery point having been written to write-mostly storage. Further, in some examples, data retrieved from a write-mostly storage class may be written into some other storage class, such as virtual drive local instance stores, for further use, and in some cases, to avoid being charged again for retrieval.

In some implementations, an additional level of recoverable content may be provided based on the methods and techniques described above with regard to recovering from loss of staging memory content, where the additional level of recoverable content may be used to provide reliability back to some consistent points in the past entirely from data stored in one of these secondary stores including objects stored in these other storage classes.

Further, in this example, recoverability may be based on recording the information necessary to roll back to some consistent point, such as a snapshot or checkpoint, using information that is held entirely within that storage class. In some examples, such an implementation may be based on a storage class including a complete past image of a dataset instead of only data that has been overwritten or deleted, where overwriting or deleting may prevent data from being present in more recent content from the dataset. While this example implementation may increase costs, as a result, the virtual storage system may provide a valuable service such as recovery from a ransomware attack, where protection from a ransomware attack may be based on requiring additional levels of permission or access that restrict objects stored in the given storage class from being deleted or overwritten.

In some implementations, in addition to or instead of using a write-mostly storage class, a virtual storage system may also use archive storage classes and/or deep archive storage classes for content that is-relative to write-mostly storage classes-even less likely to be accessed or that may only be needed in the event of disasters that are expected to be rare, but for which a high expense is worth the ability to retrieve the content. Examples of such low access content may include historical versions of a dataset, or snapshots, or clones that may, for example, be needed in rare instances, such as a discovery phase in litigation or some other similar disaster, particularly if another party may be expected to pay for retrieval.

However, as noted above, keeping historical versions of a dataset, or snapshots, or clones in the event of a ransomware attack may be another example. In some examples, such as the event of litigation, and to reduce an amount of data stored, a virtual storage system may only store prior versions of data within datasets that have been overwritten or deleted. In other examples, such as in the event of ransomware or disaster recovery, as described above, a virtual storage system may store a complete dataset in archive or deep archive storage class, in addition to storing controls to eliminate the likelihood of unauthorized deletions or overwrites of the objects stored in the given archive or deep archive storage class, including storing any data needed to recover a consistent dataset from at least a few different points in time.

In some implementations, a difference between how a virtual storage system makes use of: (a) objects stored in a write-mostly storage class and (b) objects stored in archive or deep archive storage classes, may include accessing a snapshot, clone, or continuous-data-protection checkpoint that accesses a given storage class. In the example of a write-mostly storage class, objects may be retrieved with a similar, or perhaps identical, latency to objects stored in a standard storage class provided by the virtual storage system cloud platform, where the cost for storage in the write-mostly storage class may be higher than the standard storage class.

In some examples, a virtual storage system may implement use of the write-mostly storage class as a minor variant of a regular model for accessing content that correspond to segments only currently available from objects in the standard storage class. In particular, in this example, data may be retrieved when some operation is reading that data, such as by reading from a logical offset of a snapshot of a tracking volume. In some cases, a virtual storage system may request agreement from a user to pay extra fees for any such retrievals at the time access to the snapshot, or other type of stored image, is requested, and the retrieved data may be stored into local instance stores associated with a virtual drive or copied (or converted) into objects in a standard storage class to avoid continuing to pay higher storage retrieval fees using the other storage class that is not included within the architecture of the virtual storage system.

In some implementations, in contrast to the negligible latencies in write-mostly storage classes discussed above, latencies or procedures associated with retrieving objects from archive or deep archive storage classes may make implementation impractical. In some cases, if it requires hours or days to retrieve objects from an archive or deep archive storage class, then an alternative procedure may be implemented. For example, a user may request access to a snapshot that is known to require at least some segments stored in objects stored in an archive or deep archive storage class, and in response, instead of reading any such segments on demand, the virtual storage system may determine a list of segments that include the requested dataset (or snapshot, clone, or continuous data protection recovery point) and that are stored into objects in the archive or deep archive storage.

In this way, in this example, the virtual storage system may request that the segments in the determined list of segments be retrieved to be copied into, say, objects in a standard storage class or into virtual drives to be stored in local instance stores. In this example, the retrieval of the list of segments may take hours or days, but from a performance and cost basis, it is preferable to request the entire list of segments at once instead of making individual requests on demand. Finishing with this example, after the list of segments has been retrieved from the archive or deep archive storage, then access may be provided to the retrieved snapshot, clone, or continuous data protection recovery point.

Readers will appreciate that although the embodiments described above relate to embodiments in which data that was stored in the portion of the block storage of the cloud-based storage system that has become unavailable is essentially brought back into the block-storage layer of the cloud-based storage system by retrieving the data from the object storage layer of the cloud-based storage system, other embodiments are within the scope of the present disclosure. For example, because data may be distributed across the local storage of multiple cloud computing instances using data redundancy techniques such as RAID, in some embodiments the lost data may be brought back into the block-storage layer of the cloud-based storage system through a RAID rebuild.

Readers will further appreciate that although the preceding paragraphs describe cloud-based storage systems and the operation thereof, the cloud-based storage systems described above may be used to offer block storage as-a-service as the cloud-based storage systems may be spun up and utilized to provide block service in an on-demand, as-needed fashion. In such an example, providing block storage as a service in a cloud computing environment, can include: receiving, from a user, a request for block storage services; creating a volume for use by the user; receiving I/O operations directed to the volume; and forwarding the I/O operations to a storage system that is co-located with hardware resources for the cloud computing environment.

Figure 19:
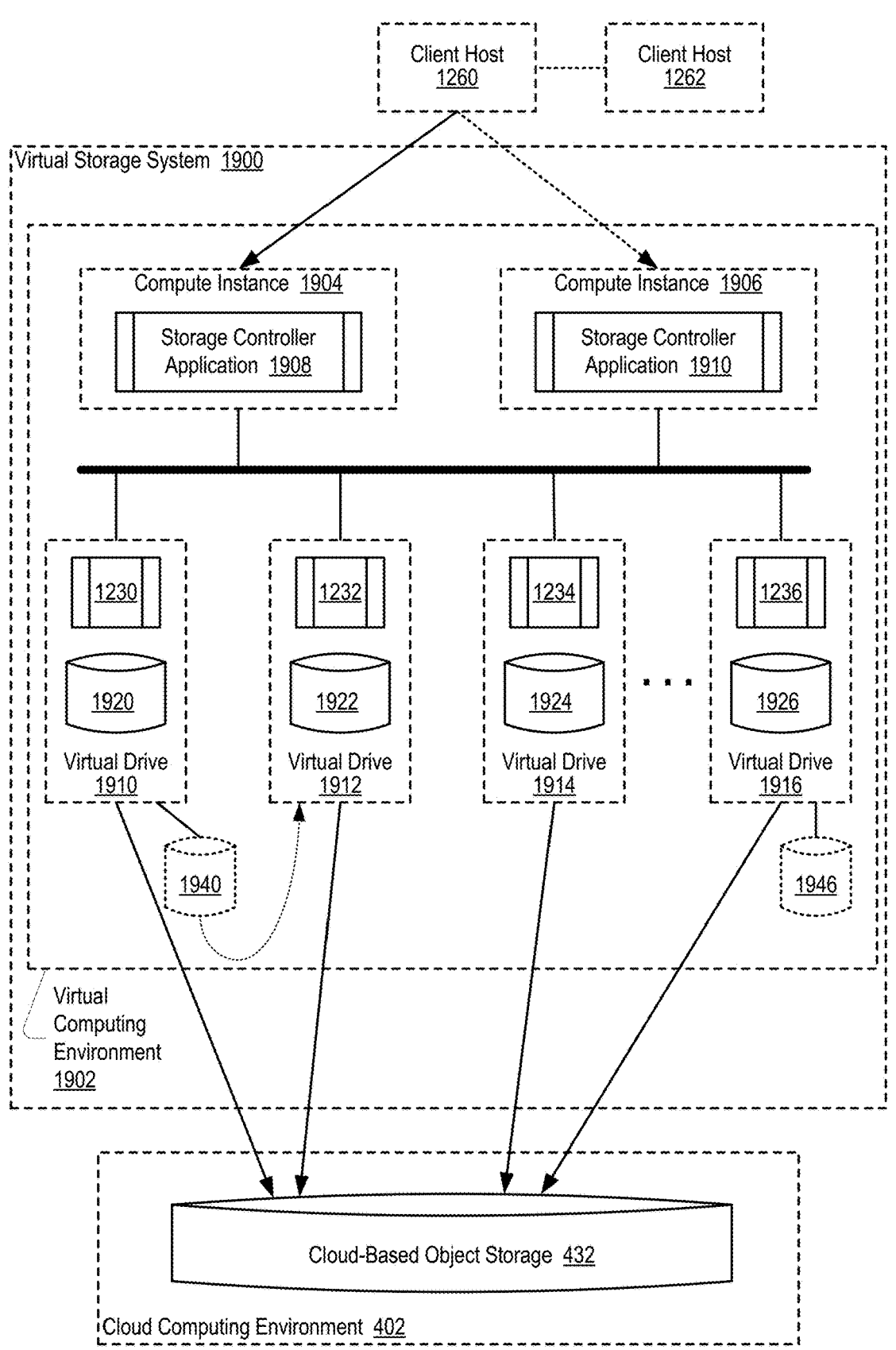
FIG. 19 illustrates an additional example virtual storage system architecture in accordance with some embodiments of the present disclosure.

For further explanation, FIG. 19 illustrates an example virtual storage system 1900 architecture in accordance with some embodiments. The virtual storage system architecture may include similar virtual components and architectures as the cloud-based storage systems described above with reference to FIGS. 4-18. However, the virtual storage system 1900 architecture depicted in FIG. 19 is an on-premises virtual storage system provisioned in a virtual environment 1902 supported by on-premises physical storage resources. Here, "on-premises" refers to physical storage resources owned or leased by an enterprise or organization and located in a private data center, as opposed to cloud-based storage resources provided in a public cloud infrastructure by a cloud services provider. While an on-premises virtual storage system is distinguishable from a cloud-based virtual storage system in that the configuration of the underlying physical storage resources may be serviced, managed, and administered by the enterprise personnel, the virtual environment 1902 may itself be a cloud computing environment such as a private cloud platform that presents an abstraction of the on-premises physical resources. Accordingly, the management and configuration of storage services provided by the on-premises virtual storage system 1900 may be divorced from the management and configuration of the physical on-premises resources that host the virtual storage system 1900, thus allowing the on-premises virtual storage system to be administered in the same manner and using the same interfaces as it would be if it were provisioned on resources provided by a cloud service provider. As will be explained in greater detail below, the virtual environment 1902 hosted on on-premises resources allows the virtual components of the virtual storage system 1900 to be replicated to or reconstructed in the cloud computing environment (or the reverse), for example, to facilitate scale-out of the virtual storage system, migration of the virtual storage system, and movement of a virtual storage system dataset between an on-premises virtual storage system and a cloud-based virtual storage system.

In the example depicted in FIG. 19, the virtual storage system 1900 includes one or more virtual controllers that are implemented in one or more compute instances, where a compute instance may execute or run as virtual machines flexibly allocated to on-premises physical host servers. Like the virtual controllers 408, 406, a virtual controller may take in or receive I/O operations and/or configuration requests from client hosts 1260, 1262 (possibly through intermediary servers, not depicted) or from administrative interfaces or tools, and then ensure that I/O requests and other operations run through to completion. In some examples, virtual controllers may present file systems, block-based volumes, object stores, and/or certain kinds of bulk storage databases or key/value stores, and may provide data services such as snapshots, replication, migration services, provisioning, host connectivity management, deduplication, compression, encryption, secure sharing, and other such storage system services.

In the example depicted in FIG. 19, two virtual controllers are depicted as, respectively, storage controller application 1908 running within compute instance 1904 and storage controller application 1910 running within compute instance 1906. The compute instances 1904, 1906 may execute on virtual machines within the virtual environment 1902 that hosted on the on-premises physical resources. For example, multiple compute instances running the storage controller application may be hosted on disparate servers within one or more data centers, such that, in the event of a fault in one server, the storage controller application in a compute instance hosted on a different server may continue to service storage operations directed to the virtual storage system.

In the example depicted in FIG. 19, the virtual storage system 1900 includes one or more virtual drives 1910-1916 that are implemented in one or more compute instances, where a compute instance may execute or run as virtual machines flexibly allocated to on-premises physical host servers. Analogous to the virtual drives 1210-1216, the virtual drives 1910-1916 provide persistent storage (e.g., block-level storage, object storage) to virtual controllers such as the storage controller applications 1908, 1910. In some implementations, staging memory may be implemented by one or more virtual drives 1910-1916, where the one or more virtual drives 1910-1916 store data, for example, within and local storage 1920-1926. In some examples, the local storage 1920-1926 may be one or more SSDs of the respective on-premises physical resource hosting the compute instance in which the virtual drive is implemented, or as other forms of storage devices such as one or more direct flash modules. In some implementations the contents of the local storage 1920-1926 of one or more virtual drives 1910-1916 may be replicated or mirrored across multiple virtual drives for data recovery and high availability of data. In additional implementations, data in the local storage 1920-1926 of one or more virtual drives 1910-1916 may be striped across multiple virtual drives 1910-1916 in a RAID configuration.

In some implementations, staging memory implemented by one or more virtual drives (e.g., virtual drives 1910 and 1916 may store data with respective block-store volumes 1940 and 1946. Readers will appreciate that although the remainder of the description of FIG. 19 relates to embodiments in which the virtual drives 1910 and 1916 store data within block-store volumes 1940 and 1946, such a description is included only for case of explanation and does not represent a limitation as to the type of storage (e.g., block storage, object storage, file storage) that may be offered by the virtual drives 1910-1916. Readers will also appreciate that virtual drives may or may not include block-store volumes. In some implementations, the block storage volumes 1940 and 1946 may be block storage volumes in one or more on-premises physical storage systems. The physical storage systems may operate as described above. For example, the physical storage systems may implement synchronous replication such that one or more of the block storage volumes 1940 and 1946 may be synchronously replicated across multiple physical storage systems. In some implementations, the location and provisioning of block storage volumes 1940 and 1946 within the on-premises resources is not visible to the host application or an administrator of the storage services provided by the virtual storage system, such that the block storage volumes 1940 and 1946 may behave like cloud-based block storage volumes (e.g., an Amazon EBS volume). The block storage volumes may be attached, one after another, as depicted in FIG. 12, to two or more other virtual drives. In some implementations, the block storage volume may be a cloud-based block storage volume provided by a cloud services provider (e.g., an AWS EBS volume).

In the example depicted in FIG. 19, the virtual drives 1910-1916 are coupled to an object store, such as cloud-based object storage 432, that provides provide back-end, durable object storage. As illustrated in FIG. 19, committing data to the cloud-based object storage 432 may be managed by the virtual drives 1910-1916. In some implementations, a software daemon 1230-1236 or some other module of computer program instructions that is executing on the virtual drive instance 1910-1916 may be configured to not only write the data to its own local storage 1920-1926 resources and any appropriate block storage 1940 and 1946 that are offered by the virtual computing environment 1902, but the software daemon 1230-1236 or some other module of computer program instructions that is executing on the particular virtual drive 1910-1916 may also be configured to write the data to cloud-based object storage 432 that is attached to the particular virtual drive. For example, data written to the storage resources of the virtual drives 1910-1916 hosted on-premises may be automatically replicated to the cloud-based object storage, as previously discussed.

Readers will appreciate the on-premises virtual storage system 1900 constructed utilizing the architecture set forth above allows a host application or administrator to treat the on-premises virtual storage system 1900 as if it were a cloud-based virtual storage system, such that the virtual storage system 1900 allows a user to provision storage resources from multiple storage tiers based on performance and durability characteristics while remaining agnostic to the configuration of the on-premises physical resources that are utilized to support the virtual storage system. Readers will also appreciate that the on-premises virtual storage system 1900 can provide a set of storage services and interfaces that are similar, if not identical, to a cloud-based virtual storage system, thus facilitating interoperability between the on-premises storage resources and cloud-native applications. For example, the on-premises virtual storage system 1900 provides the same set of virtual controllers, drive instances, block level storage services, object storage services, and interfaces as those provided by the cloud-based virtual storage systems depicted in FIG. 4-18. In one example, the same API used to construct the on-premises virtual storage system 1900 may be used to construct the cloud-based virtual storage systems depicted in FIG. 4-18. Readers will also appreciate that the on-premises virtual storage system 1900 may be easily scaled out to a cloud computing environment or migrated to and from the cloud computing environment; for example, in accordance with a cost model. For example, a virtual storage system service may spin up an instance of the virtual controller and/or an instance of a virtual drive in the cloud computing environment and connect those instances to the on-premises virtual storage system 1900.

In some implementations, the on-premises virtual storage system 1900 may be provided to a customer as a "cloud in a box" that includes the virtual environment, hardware infrastructure, and storage resources for hosting the on-premises virtual storage system 1900. In this example, the on-premises virtual storage system 1900 may include VM templates for creating the virtual machines that host the virtual controllers and virtual drives. Likewise, the on-premises virtual storage system 1900 may include a preinstalled storage controller application that is compatible with a storage controller application used to manage other on-premises physical resources such as an NFS or storage array. By implementing a storage controller application that may be hosted on a cloud-based virtual storage system or an on-premises virtual storage system, and that is compatible with a storage controller application for physical storage resources, a unified data experience may be provided to the customer. Moreover, by providing on-premises virtual storage system utilizing the customer's on-premises physical resources, the customer may allow its personnel to configure virtual storage systems as if they were cloud-based storage systems (e.g., by setting quotas, creating volumes and other storage components, monitoring performance, defining access control, applying policies), while leaving the administration of the physical environment (e.g., provisioning virtual storage systems, moving virtual storage systems across physical infrastructure, load balancing, replication policies) to the customer's or provider's technical personnel.

Figure 20:
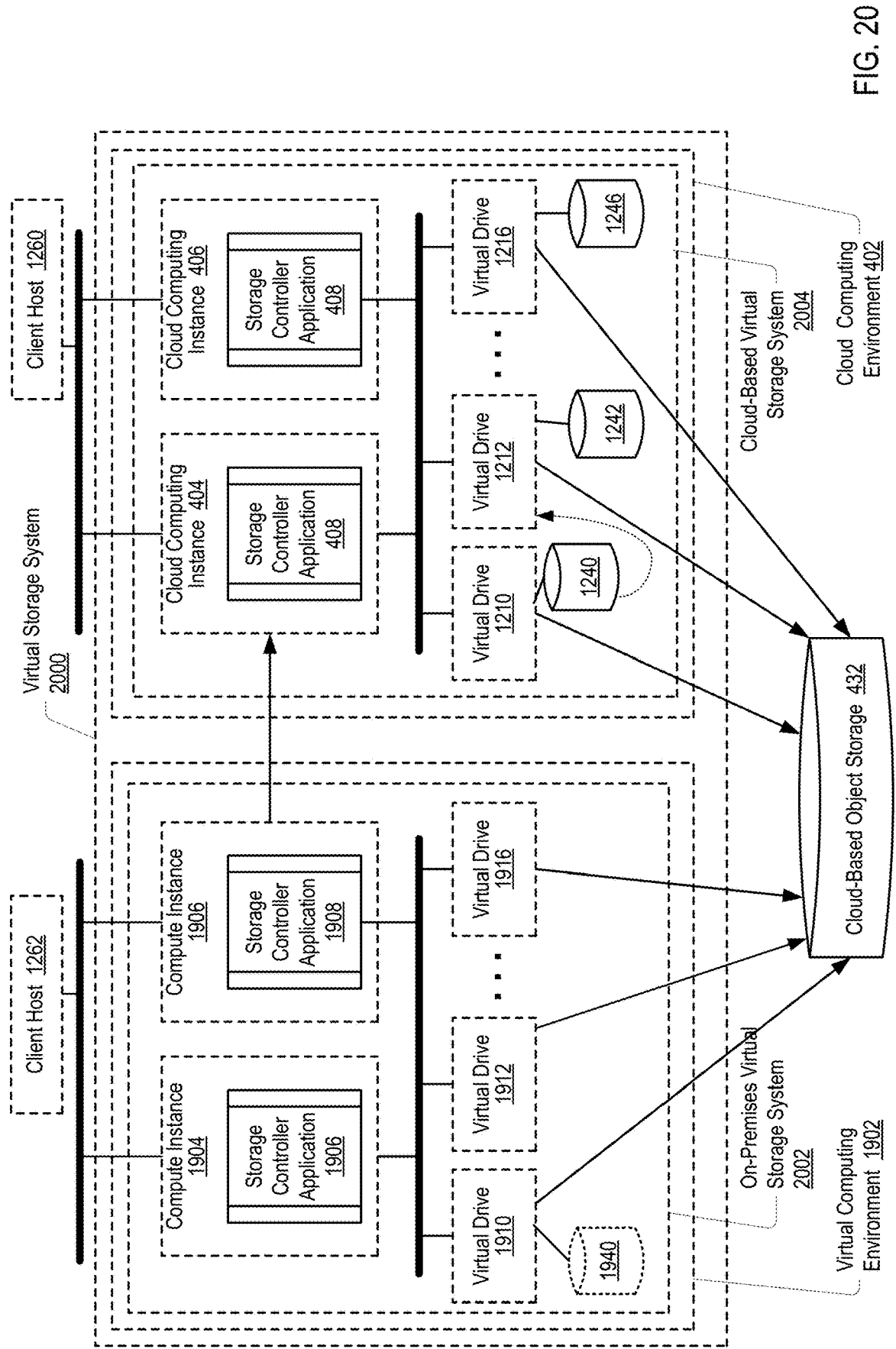
FIG. 20 illustrates an additional example virtual storage system architecture in accordance with some embodiments of the present disclosure.

For further explanation, FIG. 20 illustrates an example virtual storage system 2000 architecture in accordance with some embodiments. The virtual storage system architecture may include similar virtual components as the cloud-based virtual storage systems and on-premises virtual storage systems described above with reference to FIG. 4-19.

In this implementation, a virtual storage system 2000 includes an instance of on-premises virtual storage system 2002 and an instance of cloud-based virtual storage system 2004. In some examples, the virtual storage system 2000 is constructed by reconstructing the on-premises virtual storage system 2002 in the cloud computing environment 402 to create the cloud-based virtual storage system 2004, for example, as part of a scale out operation or migration of a virtual storage system dataset to the cloud computing environment 402. In some examples, the virtual storage system 2000 is constructed by reconstructing the cloud-based virtual storage system 2004 in the virtual computing environment 1902 to create the on-premises virtual storage system 2002, for example, to reduce latency by moving the virtual storage system closer to the physical storage resources in a data center on-premises. In some examples, the on-premises virtual storage system 2002 and the cloud-based virtual storage system 2004 may be configured to synchronously replicate data between the two virtual storage systems, such that the presented virtual storage system 2000 can continue running and providing its services even in the event of a loss of data or availability in cither virtual storage system instance. In the example depicted in FIG. 20, the on-premises virtual storage system 2002 and the cloud-based virtual storage system 2004 share the cloud-based object storage 432 as durable back-end storage, also it will be appreciated that in some implementations the on-premises virtual storage system 2002 and the cloud-based virtual storage system 2004 may be attached to respective object stores or respective buckets in an object store.

Consider an example where a dataset or portion thereof is migrated from the on-premises virtual storage system 2002 to the cloud-based virtual storage system 2004, for example, in response to a user request or detection of a fault. Virtual storage system logic may spin up instances of the virtual controllers and virtual drives of the on-premises virtual storage system 2002 in cloud computing instances of the cloud computing environment (e.g., by implementing a virtual controller in an AWS EC2 instance and a virtual drive in an AWS EC2 instance with local instance store). Virtual storage system logic may then migrate the data in the local storage and/or block storage volume of the on-premises virtual storage system 2002 to the local storage and block storage volume of the cloud computing environment (e.g., by copying data to the AWS EC2 instance with local storage and an attached EBS volume). In the event of a fault in the on-premises virtual storage system 2002, the local storage and block storage volume of the cloud-based virtual storage system 2004 may be rehydrated with data from the shared cloud-based object storage. Further, the virtual storage system logic may apply the same connectivity, policies, and other configurations of the on-premises virtual storage system 2002 to the cloud-based virtual storage system 2004. The process may be reversed, for example, by creating compute instances in the virtual environment 1902 and migrating the virtual controller and virtual drives from cloud-computing instances to the compute instances of the virtual environment 1902, and copying the data from the local storage and block storage of the cloud-based virtual storage system 2004 to the on-premises virtual storage system 2002. In some examples, the compute instances 1904, 1910 and drive instances 1910-1916 may be AWS EC2 instances that are hosted in the virtual environment 1902 of the on-premises physical resources.

In some examples, the on-premises virtual storage system 2002 and the cloud-based virtual storage system 2004 may be configured to synchronously replicate data between the two virtual storage systems, such that the presented virtual storage system 2000 can continue running and providing its services even in the event of a loss of data or availability in either virtual storage system instance. Such an implementation could be further implemented to share use of durable objects, such that the storing of data into the object store is coordinated so that the two virtual storage systems 2002, 2004 do not duplicate the stored content. Further, in such an implementation, the two synchronously replicating virtual storage systems 2002, 2004 may synchronously replicate updates to the staging memories and perhaps local instance stores, to greatly reduce the chance of data loss, while coordinating updates to object stores as a later asynchronous activity to greatly reduce the cost of capacity stored in the object store.

Figure 21:
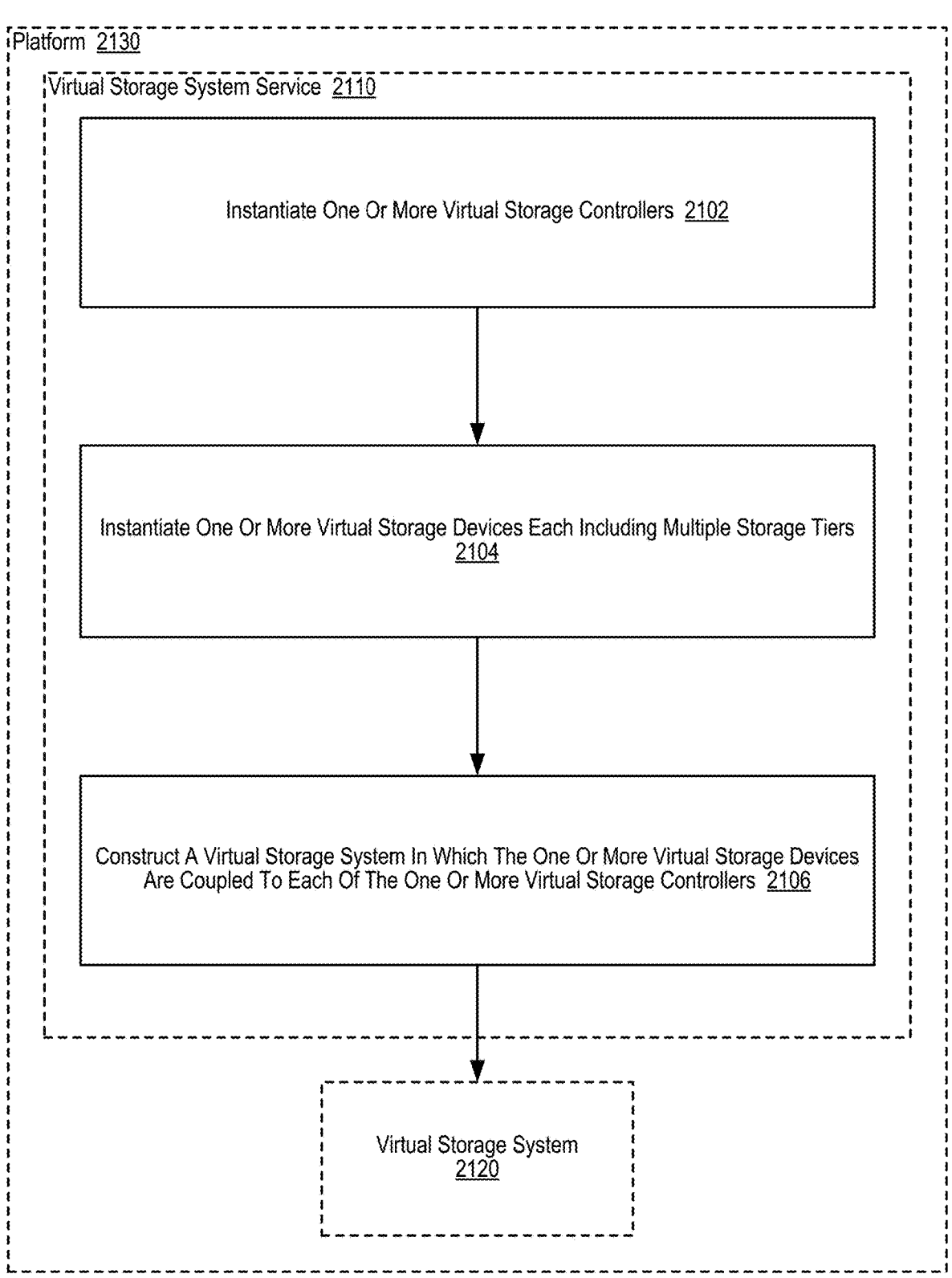
FIG. 21 sets forth a flow chart illustrating an example method of creating a virtual storage system.

For further explanation, FIG. 21 sets forth a flow chart illustrating an example method of creating a virtual storage system 2100. The example method depicted in FIG. 21 may be implemented on any of the virtual storage systems described above with reference to FIGS. 12-20. In other words, the example method may implement either virtual storage system 1200, 1300, 1400, 1500, 1600, 1700, 1800, 1900, or 2000. Accordingly, the example method depicted in FIG. 21 may include creating a cloud-based virtual storage systems, an on-premises virtual storage systems, or combinations thereof.

In some implementations, creating virtual storage system 2100 may be performed on a virtual platform 2130 such as the cloud computing environment 402 or the virtual computing environment 1902. In some examples, creating virtual storage system 2100 may be carried out by a virtual storage system service 2110. Such a virtual storage system service may be defined as a service that can dynamically create virtual storage systems within and across a variety of local and cloud platforms, and that may be able to use a variety virtual components made available in the variety of local or cloud-based platforms to provide storage services backed by multiple classes of storage, including local and cloud-based block storage, object storage, file system storage, and other classes discussed above, thereby enabling the presentation of such a service to customers that provides choices of local and cloud platforms and various selectable storage classes.

As depicted in FIG. 21, the example method includes instantiating (2102) one or more virtual storage controllers. Instantiating (2102) one or more virtual storage controllers may be carried out creating the any of the virtual storage controllers or storage controller application discussed above with respect to the storage system architectures depicted in FIG. 4-20. In some examples, instantiating (2102) one or more virtual storage controllers is carried out by creating one or more computing instances that host a storage controller application. In one example, a virtual controller may be instantiated in a cloud computing environment 402, using services offered by a cloud-services provider, by creating a cloud computing instance 404, 406 to host a storage controller application 408, 410. In another example, a virtual controller may be instantiated in a virtual computing environment 1902 hosted on on-premises physical resources by creating a compute instance 1904, 1906 to host a storage controller application 408, 410. Instantiating (2102) one or more virtual storage controllers may be carried out via API calls, for example, to the virtual storage system service (2110).

The example method depicted in FIG. 21 also includes instantiating (2104) one or more virtual storage devices each including multiple storage tiers. Instantiating (2104) one or more virtual storage devices each including multiple storage tiers may be carried out as discussed above with respect to the storage system architectures depicted in FIG. 4-20. In some implementations, instantiating (2104) one or more virtual storage devices each including multiple storage tiers may be carried out by creating a one or more computing instances that host a virtual storage device. In various examples, the virtual storage device may be a virtual drive, virtual service, or virtual blade, as discussed above, that includes attached local storage, an attached block storage volume, and an attached object storage (e.g., cloud-based object storage 432). In one example, a virtual storage device may be instantiated in a cloud computing environment 402, using services offered by a cloud-services provider, by creating a virtual drive cloud computing instance (e.g., virtual drives 1210-1216) or virtual blade cloud computing instance (e.g., virtual blades 1410-1416) with an attached local storage (e.g., local storage 1220-1226) and cloud-based block storage (e.g., block storage volumes 1240-1246). In another example, a virtual storage device may be instantiated in a virtual environment 1902 hosted on on-premises physical resources by creating a virtual drive (e.g., virtual drives 1910-1916) with an attached local storage (e.g., local storage 1920-1926) and, in some implementations, block storage (e.g., block storage volume 1940). In these examples the virtual storage device provides access to tiers and classes of storage that differ in their bandwidth, capacity, durability, availability, and write frequency. In one example, instantiating (2104) one or more virtual storage devices each including multiple storage tiers may be carried out via API calls, for example, to the virtual storage system service 2110.

The example method depicted in FIG. 21 also includes constructing (2106) a virtual storage system 2100 in which the one or more virtual storage devices are coupled to each of the one or more virtual storage controllers. Constructing (2106) a virtual storage system 2100 in which the one or more virtual storage devices are coupled to each of the one or more virtual storage controllers may be carried out by implementing any of the virtual storage system architectures described above. In some implementations, constructing (2106) a virtual storage system 2100 in which the one or more virtual storage devices are coupled to each of the one or more virtual storage controllers is carried out by attaching the virtual storage devices (e.g., virtual drives 1210-1216) to the virtual controllers (e.g., storage controller applications 408, 410) and presenting storage services to a client host with a namespace as if the virtual storage system were a physical storage system. In some implementations, constructing (2106) a virtual storage system 2100 in which the one or more virtual storage devices are coupled to each of the one or more virtual storage controllers is further carried out by attaching a block storage volume to each virtual storage device. In some implementations, constructing (2106) a virtual storage system 2100 in which the one or more virtual storage devices are coupled to each of the one or more virtual storage controllers is further carried out by attaching cloud-based object storage to each virtual storage device. In one example, constructing (2106) a virtual storage system 2100 in which the one or more virtual storage devices are coupled to each of the one or more virtual storage controllers may be carried out by API calls, for example to the virtual storage system service 2110.

For further explanation, FIG. 22 sets forth a flow chart illustrating an additional example method of creating a virtual storage system in accordance with some embodiments of the present disclosure. The example method depicted in FIG. 22 is similar to the example method depicted in FIG. 21, as the example method depicted in FIG. 22 also includes instantiating (2102) one or more virtual storage controllers; instantiating (2104) one or more virtual storage devices each including multiple storage tiers; and constructing (2016) a virtual storage system in which the one or more virtual storage devices are coupled to each of the one or more virtual storage controllers.

The example method depicted in FIG. 22 includes migrating (2202) a dataset from the virtual storage system to another virtual storage system, wherein at least one of the virtual storage systems is an on-premises virtual storage system utilizing on-premises physical storage resources. Migrating (2202) a dataset from the virtual storage system to another virtual storage system, wherein at least one of the virtual storage systems is an on-premises virtual storage system utilizing on-premises physical storage resources may be carried out as discussed above, for example, with respect to the example depicted in FIG. 20. In some implementations, migrating a dataset from an on-premises virtual storage system is carried out by spinning up cloud computing instances to replace the virtual components of the on-premises virtual storage system and migrating data from the on-premises virtual storage system to the cloud-based virtual storage system by designating the cloud-based virtual storage system as the replication target. In some implementations, migrating a dataset from to an on-premises virtual storage system is carried out by spinning up computes instances in the hosted virtual environment to replace the virtual components of the cloud-based virtual storage system and migrating data from the cloud-based virtual storage system to the on-premises virtual storage system by designating the on-premises virtual storage system as the replication target.

While components, data, and policies of a virtual storage system in a public cloud infrastructure may be easily grouped together by an account, there is no analog for a physical on-premises storage system. Accordingly, an on-premises virtual storage system may embody an administrative unit representing volumes, file systems, object stores, analytic stores, snapshots, policies, connectivity and other administrative entities that are related by the virtual storage system, where administrative changes (e.g., moving the administrative unit across storage systems, moving the administrative unit between storage classes) made to the administrative unit operate on each administrative entity in the administrative unit. In some implementations, membership in the administrative unit may be defined by a user (e.g., an administrator) selecting or creating entities for inclusion in the administrative unit. In some implementations, membership in the administrative unit may be determined based on a set of affinity rules. Using a set of affinity rules, membership may be inferred based on, for example, a commonality of stored datasets, policies, replication or synchronization cohorts, host attachment, physical location and other shared characteristics. In some implementations, membership in the administrative unit may be determined based on a set of anti-affinity rules. Using a set of anti-affinity rules, membership may be inferred based on, for example, an incongruence of stored datasets, policies, replication or synchronization cohorts, host attachment, physical location, and other characteristics that are not shared or, in some cases, incompatible or unlikely to be shared.

Readers will appreciate that migrating a dataset from an on-premises virtual storage system to another virtual or physical storage system includes migrating policies, metadata, and connectivity for the dataset, such that the virtual storage system may be reconstructed in the replication target.

For further explanation, FIG. 23 sets forth a flow chart illustrating an additional example method of creating a virtual storage system in accordance with some embodiments of the present disclosure. The example method depicted in FIG. 23 is similar to the example method depicted in FIG. 21, as the example method depicted in FIG. 23 also includes instantiating (2102) one or more virtual storage controllers; instantiating (2104) one or more virtual storage devices each including multiple storage tiers; and constructing (2016) a virtual storage system in which the one or more virtual storage devices are coupled to each of the one or more virtual storage controllers.

The example method depicted in FIG. 23 also includes migrating (2302) a dataset from an on-premises virtual storage system to a native environment executing on a physical storage system. Migrating (2302) a dataset from an on-premises virtual storage system to a native environment executing on a physical storage system may be carried out by reconstructing the on-premises virtual storage system (e.g., the on-premises virtual storage system 1900 depicted in FIG. 19) using storage controller resources native to the physical storage system and storage resources available in the physical storage system (e.g., storage systems depicted in FIGS. 1A-1D, FIGS. 2A-2G, FIGS. 3A-3B); and migrating data in the virtual storage system to the physical storage system. In some implementations, the virtual storage controller may implement the same storage controller application that is hosted in the physical storage environment. In this example, a storage controller application of the native operating environment, such as a storage operating system, may be configured as the storage controller of the migration target. In one example, a virtual storage device in the virtual storage system, characterized by performance, capacity, durability, and other metrics, is approximated using physical storage resources available in the physical environment. In this example, the connectivity among the storage controllers and physical storage resources is also recreated. For example, the virtual storage system may operate as a testing and development model before deploying the storage system in a physical storage array.

For further explanation, FIG. 24 sets forth a flow chart illustrating an additional example method of creating a virtual storage system in accordance with some embodiments of the present disclosure. The example method depicted in FIG. 24 is similar to the example method depicted in FIG. 21, as the example method depicted in FIG. 24 also includes instantiating (2102) one or more virtual storage controllers; instantiating (2104) one or more virtual storage devices each including multiple storage tiers; and constructing (2016) a virtual storage system in which the one or more virtual storage devices are coupled to each of the one or more virtual storage controllers.

The example method depicted in FIG. 24 also includes exposing (2404) a first set of interfaces to a first role for the virtual storage system, wherein the first set of interfaces configure a physical environment hosting the virtual storage system. In some examples, exposing (2404) a first set of interfaces to a first role in the virtual storage system, wherein the second set of interfaces configure a physical environment hosting the virtual storage system, is carried out by exposing APIs for provisioning a virtual storage system on physical storage resources such that an infrastructure administrator may access these APIs. In these examples, an infrastructure administrator role administers the physical storage environment that supports the virtual storage system, such as capacities for virtual storage system consumption; hardware failures; network connectivity and topology; protection policies (e.g., snapshot and replication policies); load balancing virtual storage system movement across a physical infrastructure; physical system wide performance reserves and trends; physical system wide storage capacities and reserves; replication state to other zones, and virtual storage system-level replication and protection policies. The infrastructure administrator is responsible for creating and mapping virtual storage system administrators to virtual storage systems, defining virtual storage system quotas and other virtual storage system-level limits, cloning virtual storage systems to new virtual storage systems; creating deduplication reports across virtual storage system, arrays, and zone.

In the example of FIG. 24, a virtual storage system infrastructure may expose services and APIs for creating and managing the infrastructure supporting the virtual storage system. In one implementation, a set of APIs available to infrastructure administrator may include interfaces to create virtual storage system; define administrators for virtual storage system; define replication relationship for virtual storage system; increase a logical quota to virtual storage system, recover virtual storage system from a snapshot; create a replication link for a volume; move a volume between virtual storage system; set QoS targets for a virtual storage system; query volume size and deduplication efficiency.

The example method depicted in FIG. 24 also includes exposing (2402) a second set of interfaces to a second role for the virtual storage system, wherein the second set of interfaces configure virtual components in the virtual storage system. In some examples, exposing (2402) a second set of interfaces to a second role for the virtual storage system, wherein the second set of interfaces configure virtual components in the virtual storage system, is carried out by exposing virtual computing environment APIs or cloud computing environment APIs such that a system administrator of the virtual storage system may access these APIs to configure virtual components. In these examples, the system administrator role configures and maintains the virtual storage system for use by an application, including tasks such as such managing the virtual storage system dataset including creating volumes, buckets, file systems, and other addressable portions of memory within the virtual storage system; attaching logical limits (e.g., quotas or sizes) virtual storage system components; defining access control lists for virtual storage resources; monitoring logical space consumption of the virtual storage system and its components; monitoring the performance of the virtual storage system and its performance; monitoring connectivity performance within the virtual storage system and to external application hosts; defining snapshot policies.

In the example of FIG. 24, a virtual storage system may expose services and APIs for configuring and administering the virtual storage system. In one implementation, a set of APIs available to the system administrator may include interfaces to provision a volume; take snapshot of a virtual storage system, dataset, or volume; connect to a host; create a virtual storage system snapshot schedule; manually delete snapshots; create a manual snapshots; add a host to a connection policy; drop a volume; grow a volume; shrink a volume; recover a volume from a snapshot; set QoS targets for a volume; query volume connectivity state; query volume performance statistics; query volume access points.

Readers will appreciate that the management of the virtual storage system may be separately performed by the system administrator role and the infrastructure administrator role, such that the system administrator role is provided with interfaces to configure the virtual storage system without configuring the underlying infrastructure or even any knowledge of the physical hardware. This aspect is particularly advantageous with respect to on-premises virtual storage systems, where the system administrator of the virtual storage system administers storage services that are abstracted from the physical hardware. Unlike cloud services provided by a cloud services provider, where the consumer of storage resources cannot configure the hardware infrastructure, in an on-premises virtual storage system the underlying physical infrastructure is configured to host the virtual storage system by, for example, an infrastructure administrator.

Readers will appreciate that, whereas the on-premises virtual storage system must be provisioned on the on-premises hardware resources based on some awareness of the available resources, a system administrator of the virtual storage system may configure storage services and storage components without this awareness. In this way, the system administrator of the virtual storage system may administer storage systems using infrastructure-agnostic interfaces such as those provided in a cloud-based platform; for example, by selecting configurations and policies for the virtual storage system based on desired performance (e.g., bandwidth, capacity), reliability (e.g., durability, availability), and data characteristics. In some implementations, set of APIs for configuring and maintaining the on-premises virtual storage system are exclusively available to the system administrator role, whereas the set of APIs for configuring and administering the infrastructure supporting the on-premises virtual storage system are exclusively available to the infrastructure administrator role, such that the system administrator role is distinct from the infrastructure administrator role.

Example embodiments are described largely in the context of a fully functional computer system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Advantages and features of the present disclosure can be further described by the following statements:

Statement 1. A method of servicing I/O operations in a virtual storage system, the method comprising: receiving, by the virtual storage system, a request to write data to the virtual storage system; storing, within storage provided by a first tier of storage of the virtual storage system, the data; and migrating, from the first tier of storage to a second tier of storage that is more durable than the first tier of storage of the virtual storage system, at least a portion of data stored within the first tier of storage.

Statement 2. The method of statement 1, wherein migrating the at least the portion of data stored within the staging memory is responsive to detecting a condition for transferring data between the staging memory to the durable data storage provided by the cloud services provider.

Statement 3. The method of statement 2 or statement 1, wherein the staging memory includes multiple virtual drive servers.

Statement 4. The method of statement 3, statement 2, or statement 1, wherein the multiple virtual drive servers include respective local storage.

Statement 5. The method of statement 4, statement 3, statement 2, or statement 1, wherein the multiple virtual drive servers provide virtual drives as block-type data storage.

Statement 6. The method of statement 5, statement 4, statement 3, statement 2, or statement 1, wherein the request to write data to the virtual storage system is received by one or more virtual controllers running within a virtual machine, a container, or a bare metal server.

Statement 7. The method of statement 6, statement 5, statement 4, statement 3, statement 2, or statement 1, wherein staging memory is provided by multiple virtual drive servers that respectively include a both virtual controller and local memory.

Statement 8. The method of statement 7, statement 6, statement 5, statement 4, statement 3, statement 2, or statement 1, wherein the at least the portion of the data stored within the staging memory is deduplicated, encrypted, or compressed prior to migration from the staging memory to the durable data storage.

Statement 9. The method of statement 8, statement 7, statement 6, statement 5, statement 4, statement 3, statement 2, or statement 1, wherein the staging memory of the virtual storage system is characterized by a low read latency relative to the durable data storage provided by the cloud services provider.

Statement 10. The method of statement 9, statement 8, statement 7, statement 6, statement 5, statement 4, statement 3, statement 2, or statement 1, wherein the first tier of storage includes staging memory that provides transactional consistency and write acknowledgments, and wherein the second tier of storage includes virtual drives provided by virtual drive servers of the virtual storage system.

Statement 11. The method of statement 10, statement 9, statement 8, statement 7, statement 6, statement 5, statement 4, statement 3, statement 2, or statement 1, wherein the first tier of storage includes the virtual drives provided by virtual drive servers of the virtual storage system, and wherein the second tier includes object storage provided by a cloud services provider that provides object storage independent of the virtual storage system.

Advantages and features of the present disclosure can be further described by the following statements:

Statement 1. A virtual storage system contained in a cloud computing environment, the cloud-based storage system including: one or more virtual drives providing a staging memory for storage operations; and one or more virtual controllers, each virtual controller executing in a cloud computing instance, wherein the one or more virtual controllers are configured to: receive, by the virtual storage system, a request to write data to the virtual storage system; store, within storage provided by a first tier of storage of the virtual storage system, the data; and migrate, from the first tier of storage to a second tier of storage that is more durable than the first tier of storage of the virtual storage system, at least a portion of data stored within the staging memory.

Statement 2. The virtual storage system of statement 1, wherein local storage for a given virtual drive is connected to one or more other virtual drives.

Statement 3. The virtual storage system of statement 2 or statement 1, wherein a first subset of virtual controllers is located within a first availability zone, and wherein a second subset of virtual controllers is located within a second availability zone.

Statement 4. The virtual storage system of statement 3, statement 2, or statement 1, wherein a first subset of virtual drives is located within a first availability zone, and wherein a second subset of virtual drivers is located within a second availability zone.

Statement 5. The virtual storage system of statement 4, statement 3, statement 2, or statement 1, wherein both the first subset of virtual drives in the first availability zone and the second subset of virtual drives in the second availability zone use a same cloud-based object storage.

Statement 6. The virtual storage system of statement 5, statement 4, statement 3, statement 2, or statement 1, wherein migrating the at least the portion of data stored within the staging memory is responsive to detecting a condition for transferring data between the staging memory to the durable data storage provided by the cloud services provider.

Statement 7. The virtual storage system of statement 6, statement 5, statement 4, statement 3, statement 2, or statement 1, wherein the staging memory includes multiple virtual drive servers.

Statement 8. The virtual storage system of statement 7, statement 6, statement 5, statement 4, statement 3, statement 2, or statement 1, wherein the respective virtual drives include both a respective virtual controller and respective local storage.

Statement 9. The virtual storage system of statement 8, statement 7, statement 6, statement 5, statement 4, statement 3, statement 2, or statement 1, wherein staging memory is provided by multiple virtual drive servers that respectively include a both virtual controller and local memory.

Statement 10. The virtual storage system of statement 9, statement 8, statement 7, statement 6, statement 5, statement 4, statement 3, statement 2, or statement 1, wherein the virtual storage system synchronously replicates the data with one or more other virtual storage systems.

Statement 11. The virtual storage system of statement 10, statement 9, statement 8, statement 7, statement 6, statement 5, statement 4, statement 3, statement 2, or statement 1, wherein a virtual storage system architecture implementing the virtual storage system is distinct from a virtual storage system architecture implementing at least one virtual storage system among the one or more other virtual storage systems.

What is claimed is:

1. A method comprising:

instantiating one or more virtual storage controllers, wherein the one or more virtual storage controllers are coupled to different components in different virtual storage systems including on-premises virtual storage systems utilizing on-premises physical storage resources and cloud-based virtual storage systems that are created using services offered within a cloud platform environment; and constructing at least one storage system using the one or more virtual storage controllers.

2. The method of claim 1, further comprising:

constructing one or more of the different virtual storage systems with virtual drive servers that are implemented using compute instances, wherein the compute instances include cloud-computing instances.

3. The method of claim 1, further comprising:

instantiating the one or more virtual storage controllers as containerized storage controller applications.

4. The method of claim 1, further comprising:

constructing the cloud-based virtual storage systems using resources provided by one or more cloud computing environments; and processing, by the one or more virtual storage controllers, one or more I/O operations using the cloud-based virtual storage systems constructed using the resources provided by the one or more cloud computing environments.

5. The method of claim 4, wherein the one or more virtual storage controllers are implemented in respective cloud computing instances of a cloud platform; and wherein one or more virtual storage devices are implemented in respective cloud computing instances of the cloud platform.

6. The method of claim 1, wherein the different virtual storage systems include an on-premises virtual storage system created in a virtual environment supported by on-premises physical storage resources.

7. The method of claim 1, further comprising:

migrating a dataset from a virtual storage system to another virtual storage system, wherein at least one of the virtual storage systems is an on-premises virtual storage system utilizing on-premises physical storage resources.

8. The method of claim 1, further comprising:

migrating a dataset from an on-premises virtual storage system to a native environment executing on a physical storage system.

9. The method of claim 1 further comprising:

instantiating the one or more virtual storage controllers; and instantiating one or more virtual storage devices each including multiple storage tiers.

10. The method of claim 1, further comprising:

migrating a dataset from an on-premises virtual storage system to a native environment executing on a physical storage system.

11. The method of claim 1, further comprising:

for a virtual storage system of the different virtual storage systems, exposing a first set of interfaces to a first role for the virtual storage system, wherein the first set of interfaces configure a physical environment hosting the virtual storage system; and exposing a second set of interfaces to a second role for the virtual storage system, wherein the second set of interfaces configure virtual components in the virtual storage system.

12. An apparatus comprising:

a memory;

a processing device operably coupled to the memory, configured to:

instantiate one or more virtual storage controllers, wherein the one or more virtual storage controllers are coupled to different components in different virtual storage systems including on-premises virtual storage systems utilizing on-premises physical storage resources and cloud-based virtual storage systems that are created using services offered within a cloud platform environment; and construct at least one storage system using the one or more virtual storage controllers.

13. The apparatus of claim 12, wherein the processing device is further configured to:

construct one or more of the different virtual storage systems with virtual drive servers that are implemented using compute instances, wherein the compute instances include cloud-computing instances.

14. The apparatus of claim 12, wherein the processing device is further configured to:

instant the one or more virtual storage controllers as containerized storage controller applications.

15. The apparatus of claim 12, wherein the processing device is further configured to:

construct the cloud-based virtual storage systems using resources provided by one or more cloud computing environments; and process, by the virtual storage controllers, one or more I/O operations using the cloud-based virtual storage systems constructed using the resources provided by the one or more cloud computing environments.

16. The apparatus of claim 12, wherein the processing device is further configured to:

replicate a dataset from an on-premises virtual storage system to a native environment executing on a physical storage system.

17. The apparatus of claim 12, wherein the processing device is further configured to:

for a virtual storage system of the different virtual storage systems, expose a first set of interfaces to a first role for the virtual storage system, wherein the first set of interfaces configure a physical environment hosting the virtual storage system; and expose a second set of interfaces to a second role for the virtual storage system, wherein the second set of interfaces configure virtual components in the virtual storage system.

18. A non-transitory computer readable storage medium storing instructions that:

instantiate one or more virtual storage controllers, wherein the one or more virtual storage controllers are coupled to different components in different virtual storage systems including on-premises virtual storage systems utilizing on-premises physical storage resources and cloud-based virtual storage systems that are created using services offered within a cloud platform environment; and construct at least one storage system using the one or more virtual storage controllers.

19. The non-transitory computer readable storage medium of claim 18, wherein the processing device is further configured to:

construct one or more of the different virtual storage systems with virtual drive servers that are implemented using compute instances, wherein the compute instances include cloud-computing instances.

20. The non-transitory computer readable storage medium of claim 18, wherein the processing device is further configured to:

instantiate the one or more virtual storage controllers as containerized storage controller applications.

*    *    *    *    *